United States Patent [19]
Horiuchi et al.

[11] Patent Number: 5,426,726
[45] Date of Patent: Jun. 20, 1995

[54] CHARACTER DRAWING AND DISPLAYING APPARATUS WITH DRAWING SPEED CONTROL

[75] Inventors: Kaoru Horiuchi; Toshihiko Hata; Toshiharu Nozawa; Satoru Tomita, all of Hyogo, Japan

[73] Assignee: Mitsubishi Denki Kabushiki Kaisha, Tokyo, Japan

[21] Appl. No.: 529,423

[22] Filed: May 29, 1990

[30] Foreign Application Priority Data

| May 31, 1989 | [JP] | Japan | 1-137961 |
| Aug. 9, 1989 | [JP] | Japan | 1-206062 |
| Aug. 9, 1989 | [JP] | Japan | 1-206063 |
| Aug. 9, 1989 | [JP] | Japan | 1-206064 |
| Aug. 9, 1989 | [JP] | Japan | 1-206065 |
| Mar. 28, 1990 | [JP] | Japan | 2-79488 |

[51] Int. Cl.[6] .......................... G06F 15/62
[52] U.S. Cl. .................................. 395/150
[58] Field of Search ............ 395/150, 152; 340/735, 340/790, 723; 400/124, 157

[56] References Cited

U.S. PATENT DOCUMENTS

| 3,740,743 | 6/1973 | Baron | 340/723 X |
| 4,372,696 | 2/1983 | Pou | 400/124 |
| 4,737,044 | 4/1988 | Puschnus et al. | 400/157.3 |

*Primary Examiner*—Mark K. Zimmerman
*Attorney, Agent, or Firm*—Rothwell, Figg, Ernst & Kurz

[57] ABSTRACT

A character drawing apparatus makes reference to character drawing time data to carry out a pattern drawing process at drawing speeds controlled on the basis of the character drawing time data. Character drawing time intervals required respectively for drawing a plurality of characters can be changed simply by changing the character drawing time data so that the different characters are drawn respectively at different drawing speeds. Thus, the character drawing apparatus attracts effectively the attention of persons looking at characters being drawn and impresses effectively on such persons the information expressed by the characters being drawn.

10 Claims, 57 Drawing Sheets

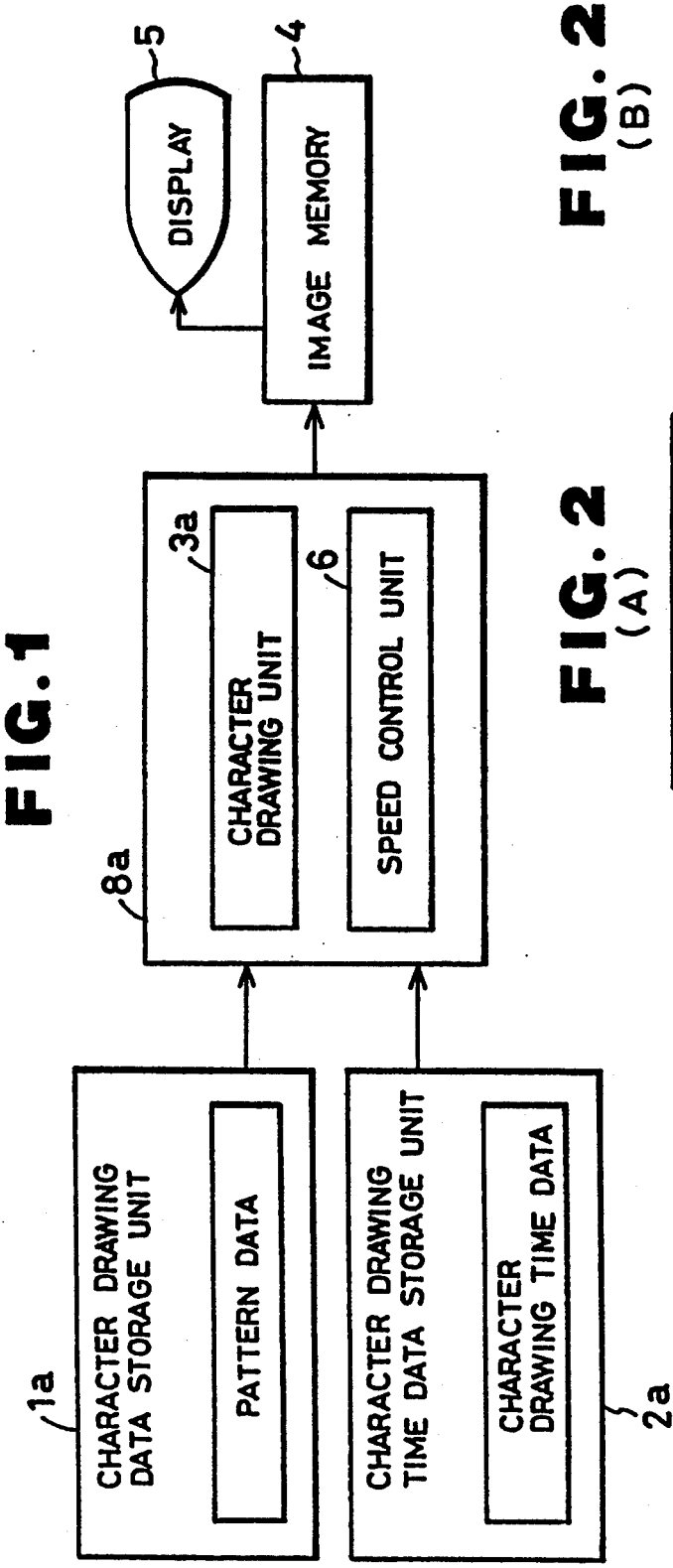
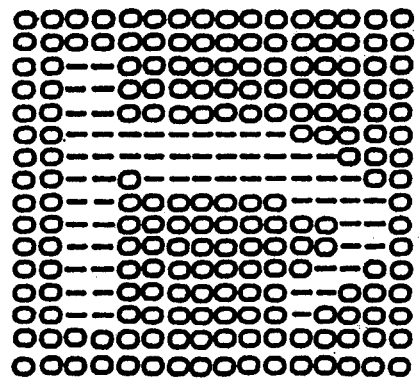
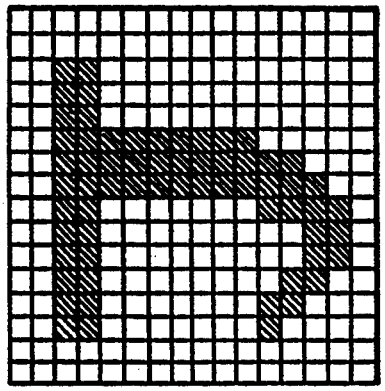

FIG. 3
| | |
|---|---|
| PATTERN DATA | 0 0 0 0<br>0 0 0 0<br>3 F 0 C<br>3 F F C<br>0 F F 0<br>0 0 E E 0<br>0 0 E E 0<br>0 0 E E 0<br>0 0 E E 0<br>0 0 E E 0<br>3 1 9 C C<br>1 0 F C 8<br>0 0 7 0<br>0 0 0 0 |
| CHARACTER DRAWING TIME DATA | 1 sec |
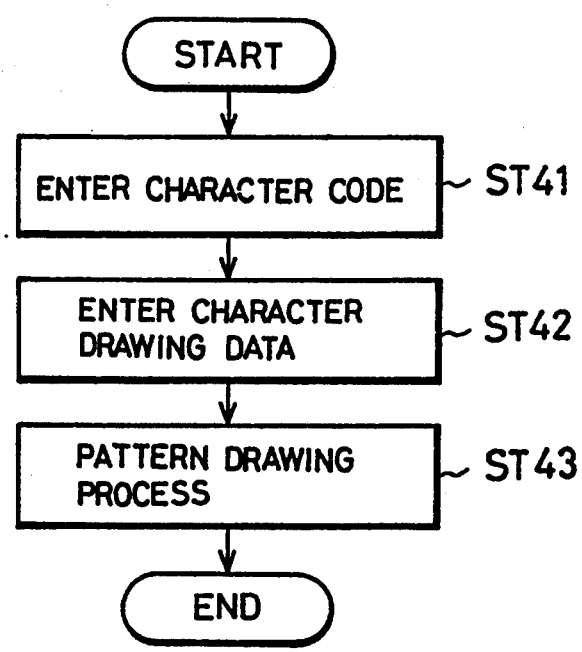
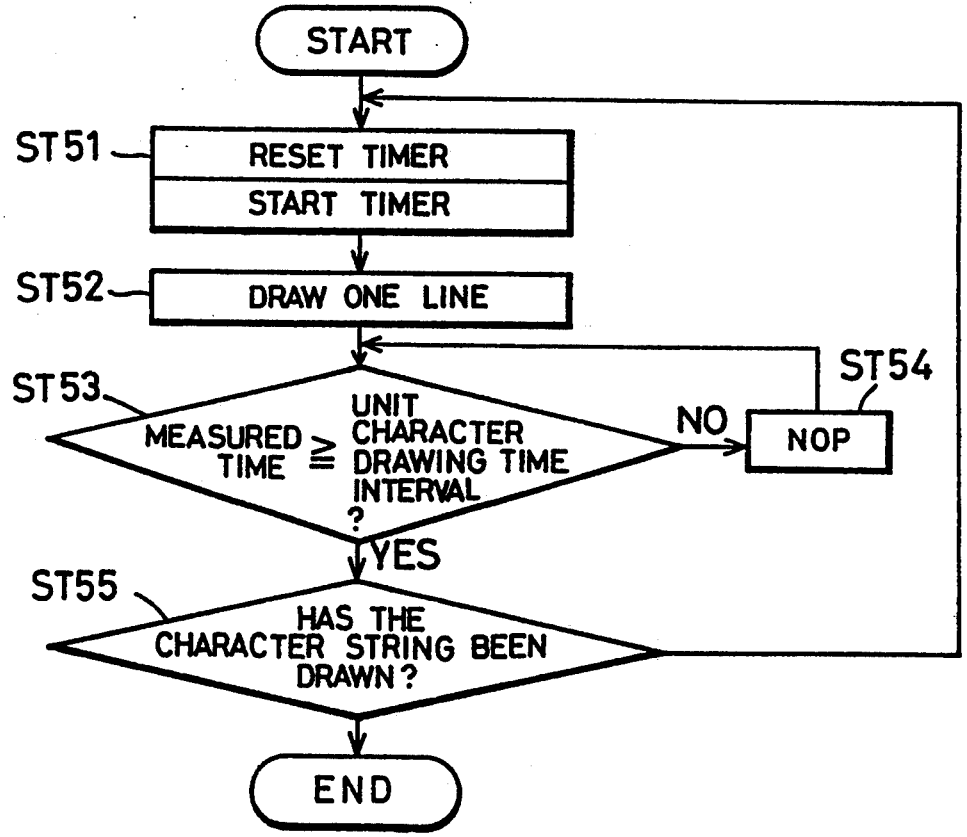

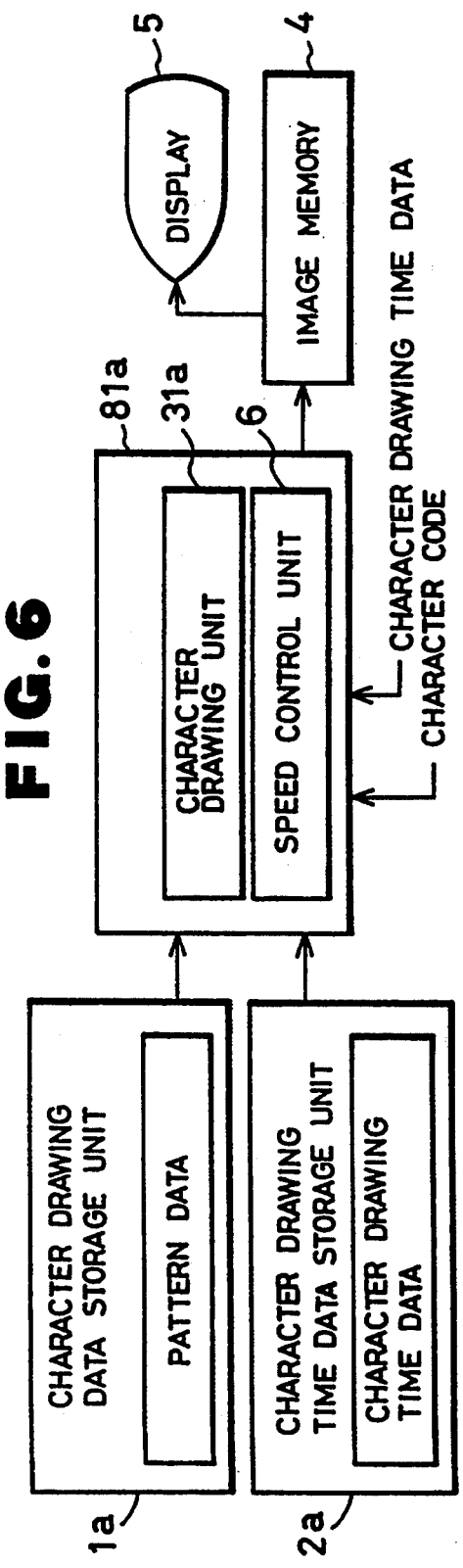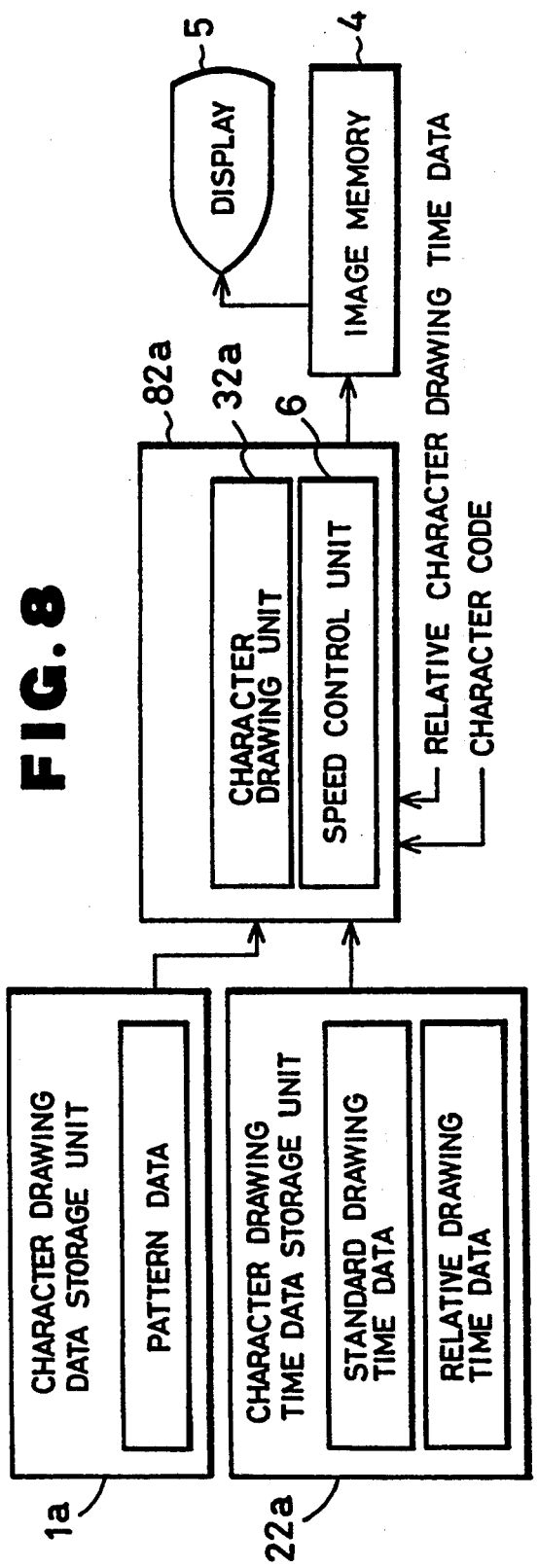

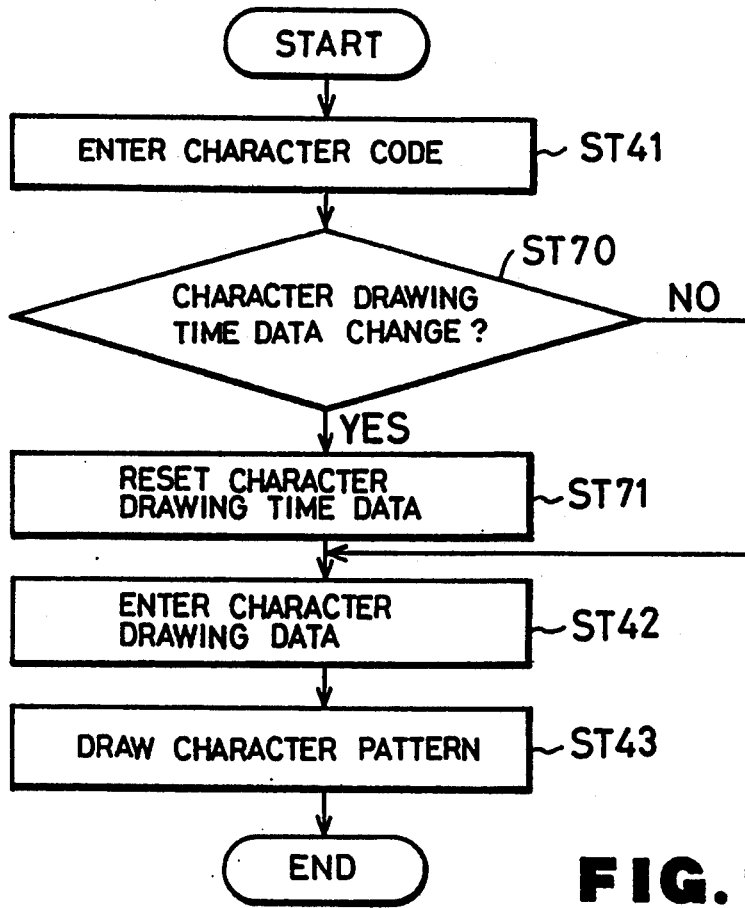
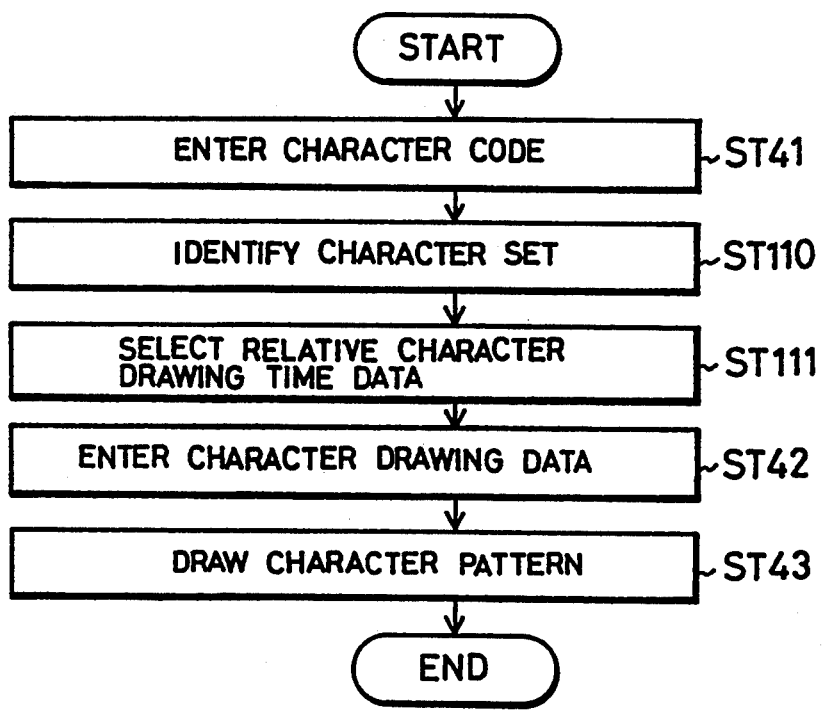

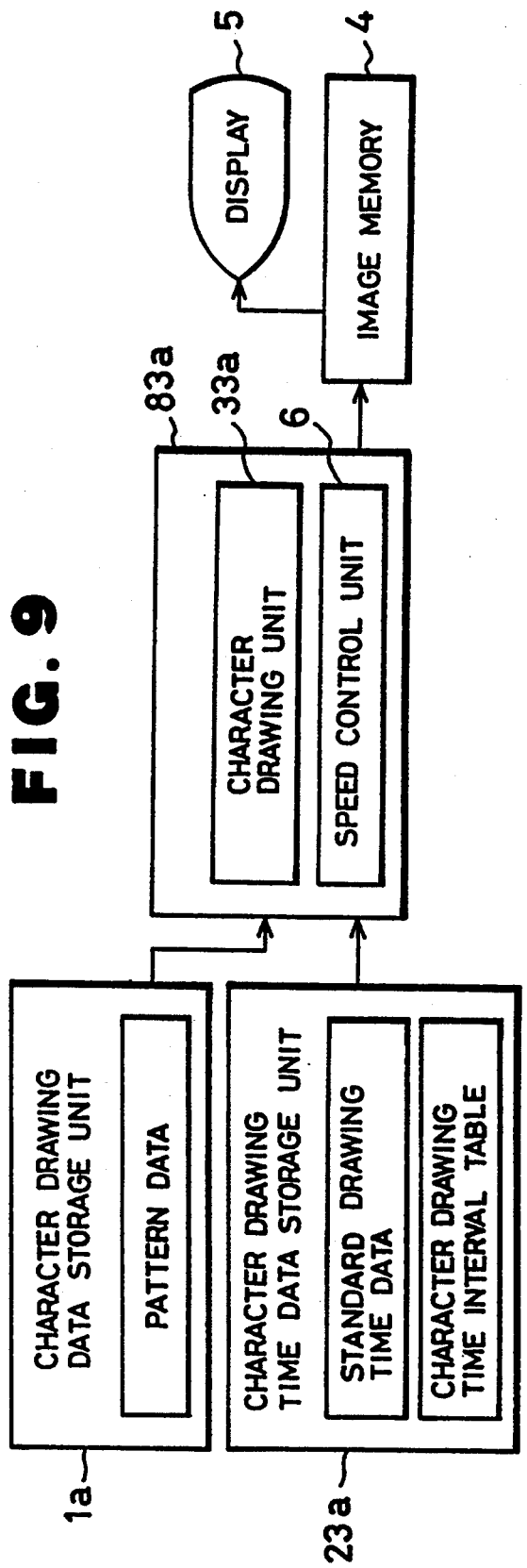

FIG. 13 (B)

| |
|---|
| VECTOR DATA FOR THE OUTLINE OF FIRST STROKE |
| STRAIGHT LINE CODE |
|     COORDINATES OF STARTING POINT ($x_1, y_1$) |
|     COORDINATES OF END POINT ($x_2, y_2$) |
| STRAIGHT LINE CODE |
|     COORDINATES OF STARTING POINT ($x_2, y_2$) |
|     COORDINATES OF END POINT ($x_3, y_3$) |
| STRAIGHT LINE CODE<br>⋮ |
| VECTOR DATA FOR THE OUTLINE OF SECOND STROKE |
| STRAIGHT LINE CODE |
|     COORDINATES OF STARTING POINT ($x_5, y_5$) |
|     COORDINATES OF END POINT ($x_6, y_6$) |
| STRAIGHT LINE CODE |
|     COORDINATES OF STARTING POINT ($x_6, y_6$) |
|     COORDINATES OF END POINT ($x_7, y_7$) |
| CIRCULAR ARC CODE |
|     COORDINATES OF FIRST POINT ($x_7, y_7$) |
|     COORDINATES OF SECOND POINT ($x_8, y_8$) |
|     COORDINATES OF THIRD POINT ($x_9, y_9$) |
| STRAIGHT LINE CODE<br>⋮ |

FIG.14 (B)

| FIRST STROKE | COORDINATES OF STARTING POINT (x21,y21) |
| --- | --- |
| | STROKE SPEED 1 |
| | STROKE DIRECTION 0,0,0;...... |
| | COORDINATES OF SPEED CHANGE POINT (x22,y22) |
| | STROKE SPEED 3 |
| | STROKE DIRECTION 0,0,0;...... |
| | COORDINATES OF SPEED CHANGE POINT (x23,y23) |
| | STROKE SPEED 1 |
| | STROKE DIRECTION 0,0,0;...... |
| | COORDINATES OF END POINT (x24,y24) |
| | CHARACTER PAUSE TIME INTERVAL 3 |

| SECOND STROKE | COORDINATES OF STARTING POINT (x25,y25) |
| --- | --- |
| | STROKE SPEED 1 |
| | STROKE DIRECTION 2,2,2;...... |
| | COORDINATES OF SPEED CHANGE POINT (x26,y26) |
| | STROKE SPEED 3 |
| | STROKE DIRECTION 2,2,2;...... |
| | COORDINATES OF SPEED CHANGE POINT (x27,y27) |
| | STROKE SPEED 2 |
| | STROKE DIRECTION 2,3,2,3;...... |
| | COORDINATES OF END POINT (x28,y28) |
| | CHARACTER PAUSE TIME INTERVAL 3 |

FIG.14 (C)

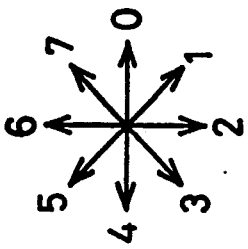

FIG. 19 (B)

| FIRST STROKE | COORDINATES OF STARTING POINT (x21, y21) | STRAIGHT LINE CODE | COORDINATES OF END POINT (x22, y22) | DIVIDING NUMBER 10 | STRAIGHT LINE CODE | COORDINATES OF END POINT (x23, y23) | DIVIDING NUMBER 10 | STRAIGHT LINE CODE | COORDINATES OF END POINT (x24, y24) | DIVIDING NUMBER 10 | STROKE DRAWING TIME INTERVAL 3 |
|---|---|---|---|---|---|---|---|---|---|---|---|

| SECOND STROKE | COORDINATES OF STARTING POINT (x25, y25) | STRAIGHT LINE CODE | COORDINATES OF END POINT (x26, y26) | DIVIDING NUMBER 10 | STRAIGHT LINE CODE | COORDINATES OF END POINT (x27, y27) | DIVIDING NUMBER 10 | CURVE CODE | COORDINATES OF INTERMEDIATE POINT (x28, y28) | COORDINATES OF END POINT (x29, y29) | DIVIDING NUMBER 20 | STROKE DRAWING TIME INTERVAL 3 |
|---|---|---|---|---|---|---|---|---|---|---|---|---|

FIG. 20
FIRST STROKE
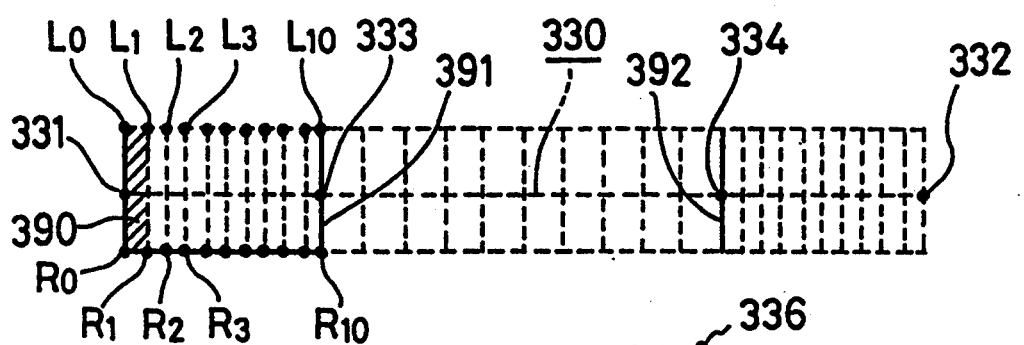
SECOND STROKE
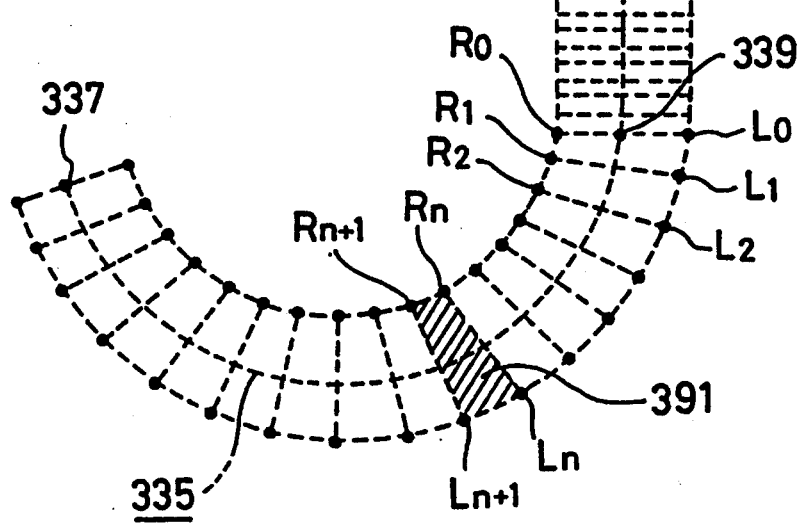

FIG. 25 (A-1)

| VECTOR DATA OF FIRST STROKE OUTLINE |
|---|
| STRAIGHT LINE CODE |
| COORDINATES OF STARTING POINT ($x1, y1$) |
| COORDINATES OF END POINT ($x2, y2$) |
| STRAIGHT LINE CODE |
| COORDINATES OF STARTING POINT ($x2, y2$) |
| COORDINATES OF END POINT ($x3, y3$) |
| STRAIGHT LINE CODE |
| ⋮ |
| VECTOR DATA OF SECOND STROKE OUTLINE |
| STRAIGHT LINE CODE |
| COORDINATES OF STARTING POINT ($x5, y5$) |
| COORDINATES OF END POINT ($x6, y6$) |
| STRAIGHT LINE CODE |
| COORDINATES OF STARTING POINT ($x6, y6$) |
| COORDINATES OF END POINT ($x7, y7$) |
| CIRCULAR ARC CODE |
| COORDINATES OF FIRST POINT ($x7, y7$) |
| COORDINATES OF SECOND POINT ($x8, y8$) |
| COORDINATES OF THIRD POINT ($x9, y9$) |
| STRAIGHT LINE CODE |
| ⋮ |

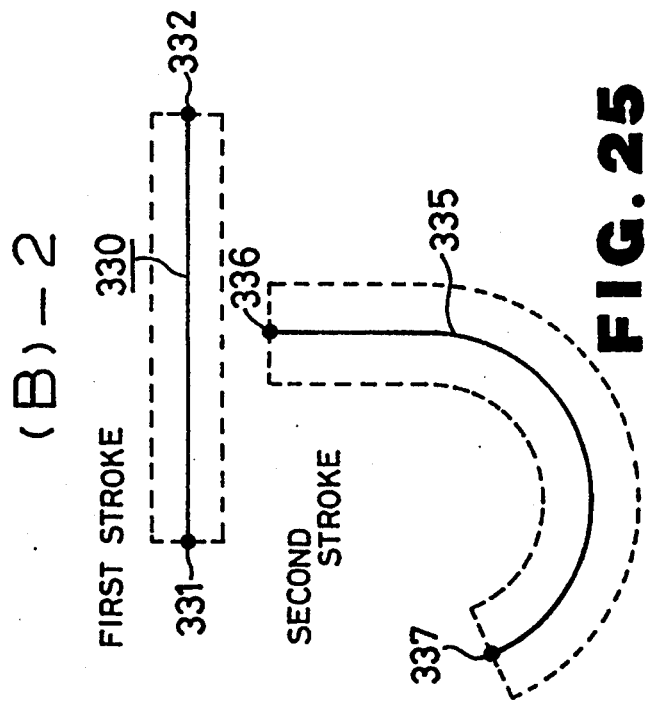
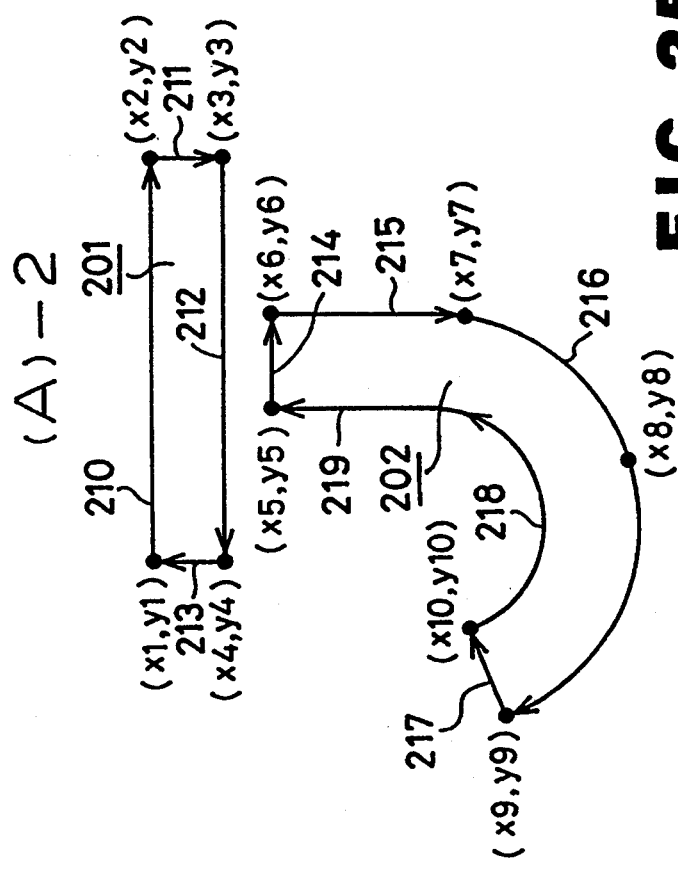
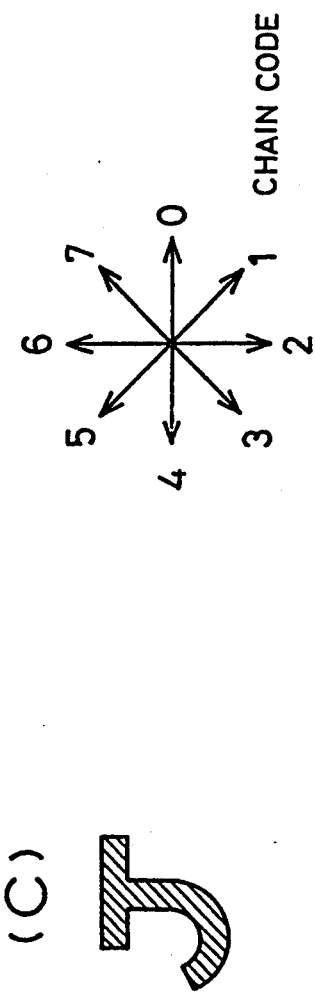
FIG. 25 (A)-2
FIG. 25 (B)-2
FIG. 25 (C)
FIG. 25 (D)

| STROKE ORDER | FIRST STROKE | SECOND STROKE |
|---|---|---|
| STARTING POINT | (x, y) | (x, y) |
| STROKE LINE CHAIN CODE STRING | 0<br>0<br>0<br>⋮ | 2<br>2<br>2<br>⋮ |
| END POINT | (x, y) | (x, y) |
| DISTANCE OF DIVISION | $\ell$ | $\ell$ |

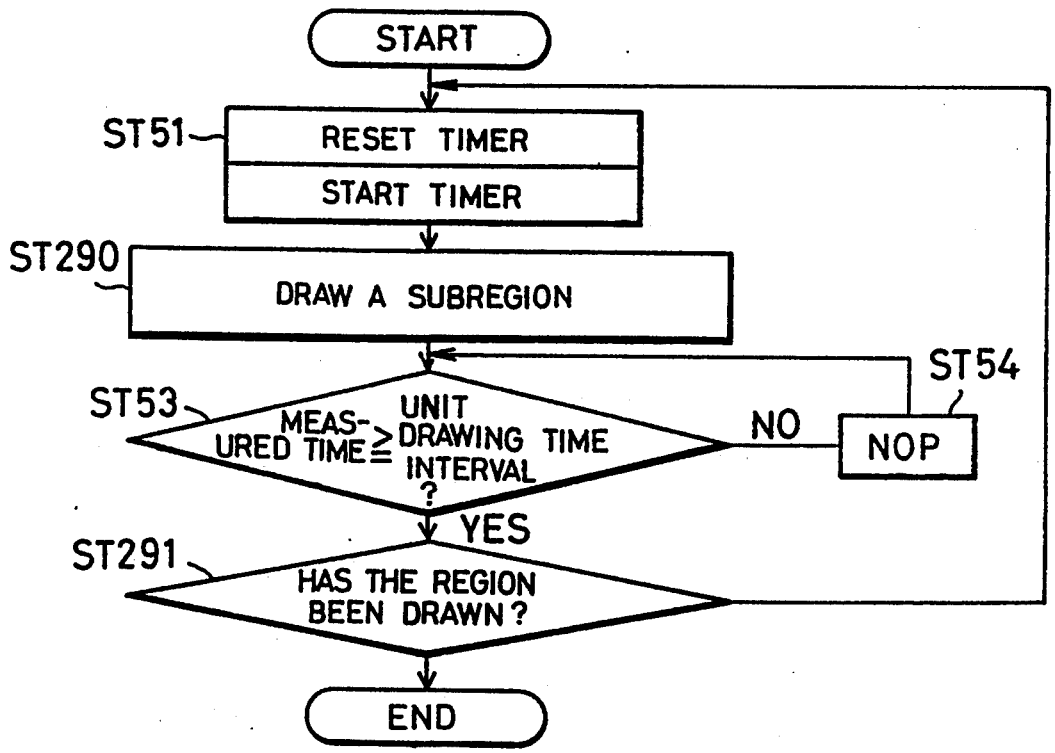
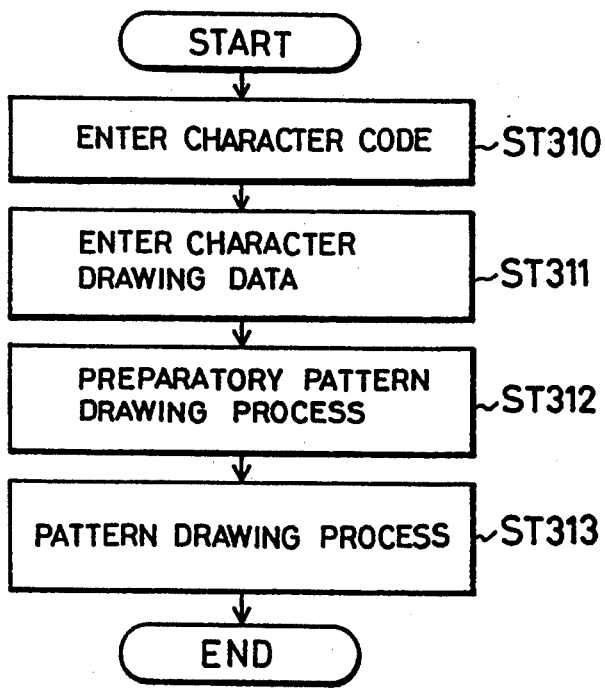
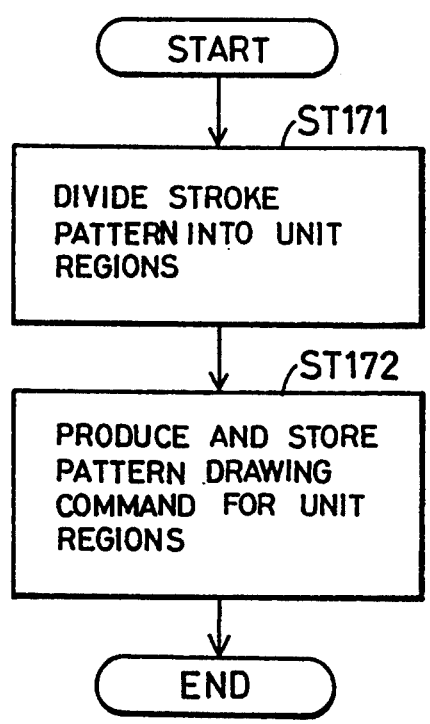

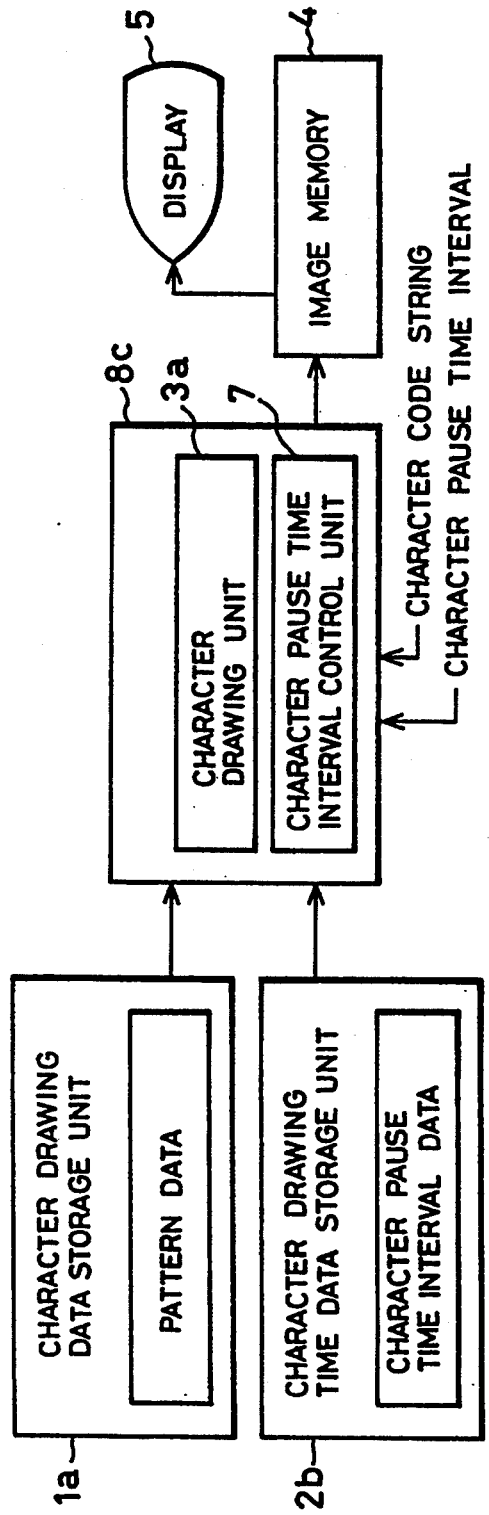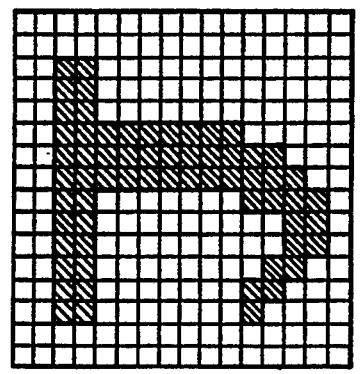

FIG. 36
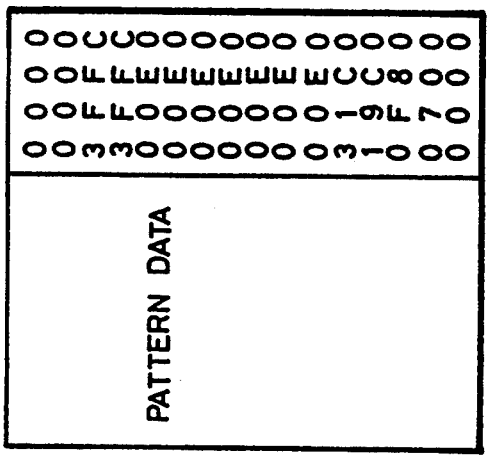
PATTERN DATA
FIG. 37
| CHARACTER CODE (JIS) | CHARACTER PAUSE TIME INTERVAL |
|---|---|
| 3B30 |  |
| 4929 | 2 |
| 4545 | 2 |
| 3521 | 1 |
| 9999 |  |
FIG. 39
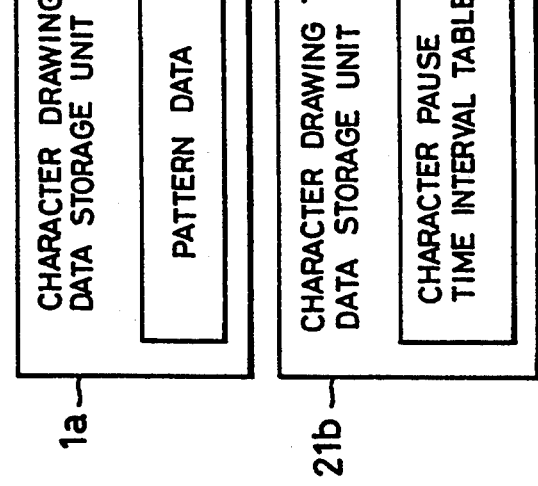

| | CHARACTER CODE | CHARACTER PAUSE TIME INTERVAL |
|---|---|---|
| SYMBOL SET | 2120 ~ 222F | 1 |
| ALPHANUMERIC CHARACTER SET | 2330 ~ 237F | 1 |
| HIRAGANA CHARACTER SET | 2420 ~ 247F | 3 |
| KATAKANA CHARACTER SET | 2520 ~ 257F | 3 |
| GREEK CHARACTER SET | 2620 ~ 2650 | 2 |
| RUSSIAN CHARACTER SET | 2720 ~ 277F | 2 |
| CHINESE CHARACTER SET | 3020 ~ 737F | 5 |

FIG. 45

| CHARACTER CODE (JIS) | CHARACTER DRAWING TIME INTERVAL | CHARACTER PAUSE TIME INTERVAL |
|---|---|---|
| 3B30 | 5 | 2 |
| 4929 | 5 | 2 |
| 4545 | 3 | |
| 3521 | 3 | 1 |
| 9999 | | |

FIG. 48

| | CHARACTER CODE | CHARACTER DRAWING TIME INTERVAL | CHARACTER PAUSE TIME INTERVAL |
|---|---|---|---|
| SYMBOL SET | 2120~222F | 3 | 1 |
| ALPHANUMERIC CHARACTER SET | 2330~237F | 3 | 1 |
| HIRAGANA CHARACTER SET | 2420~247F | 5 | 3 |
| KATAKANA CHARACTER SET | 2520~257F | 5 | 3 |
| GREEK CHARACTER SET | 2620~2650 | 4 | 2 |
| RUSSIAN CHARACTER SET | 2720~277F | 4 | 2 |
| CHINESE CHARACTER SET | 3020~737F | 7 | 5 |

| STROKE ORDER | FIRST STROKE | SECOND STROKE |
|---|---|---|
| STARTING POINT | (x, y) | (x, y) |
| STROKE LINE CHAIN CODE STRING | 0<br>0<br>0<br>- - - - - | 2<br>2<br>2<br>- - - - - |
| END POINT | (x, y) | (x, y) |
| DISTANCE OF DIVISION | $\ell$ | $\ell$ |

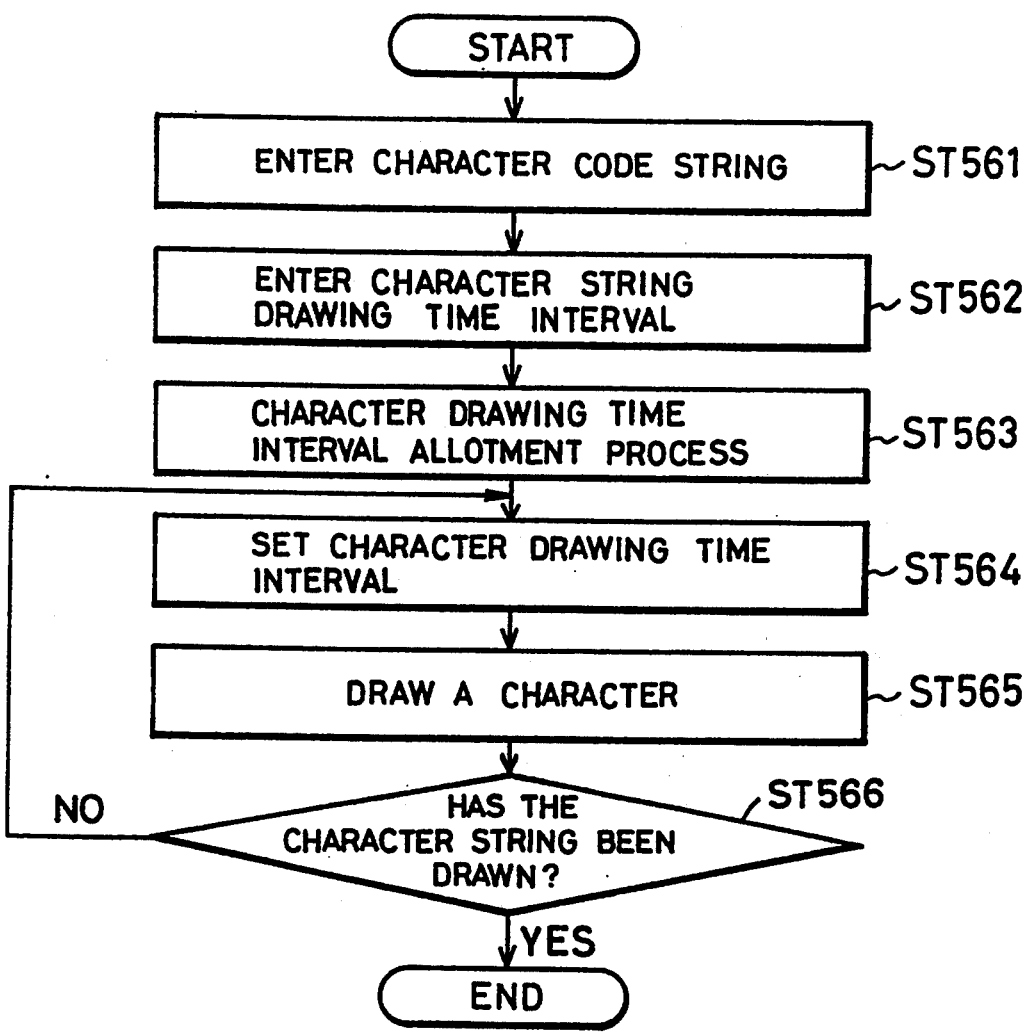

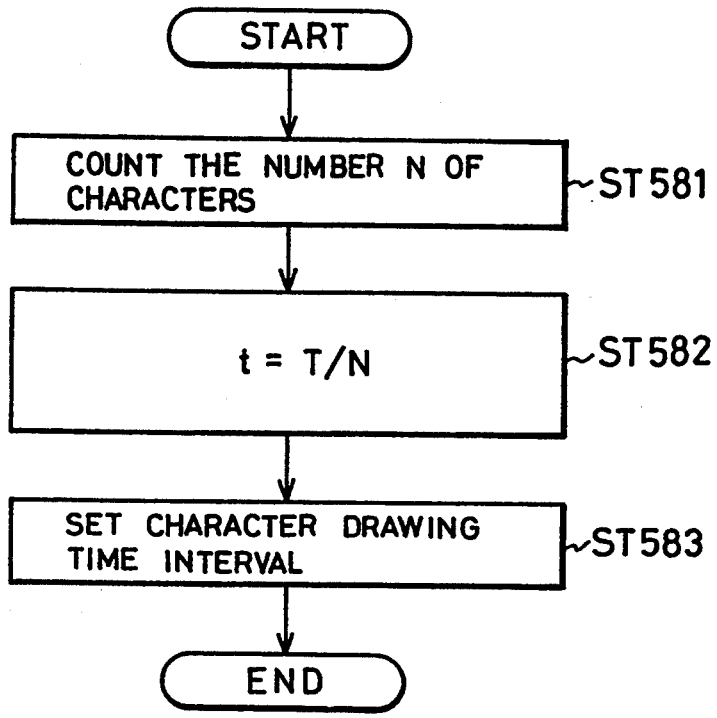

FIG. 59 (A)

RULE 2: ALLOT WEIGHTED CHARACTER DRAWING TIME INTERVALS TO CHARACTERS

FIG. 59 (B)

START → ST581 COUNT THE NUMBER N OF CHARACTERS → ST592 CALCULATE CHARACTER DRAWING TIME INTERVALS → ST583 SET CHARACTER DRAWING TIME INTERVALS → END

FIG. 59 (C)

| CHARACTER CODE | 3B30 | 4929 | 2545 | 2121 | 9999 |
|---|---|---|---|---|---|
| CHARACTER DRAWING TIME INTERVAL | 5x | 5x | 3x | 1x | |

FIG. 59 (D)

| | CHARACTER CODE | RELATIVE DRAWING TIME DATA |
|---|---|---|
| SYMBOL SET | 2120~222F | 1 |
| ALPHANUMERIC CHARACTER SET | 2330~237F | 1 |
| HIRAGANA CHARACTER SET | 2420~247F | 3 |
| KATAKANA CHARACTER SET | 2520~257F | 3 |
| GREEK CHARACTER SET | 2620~2650 | 2 |
| RUSSIAN CHARACTER SET | 2720~277F | 2 |
| CHINESE CHARACTER SET | 3020~737F | 5 |

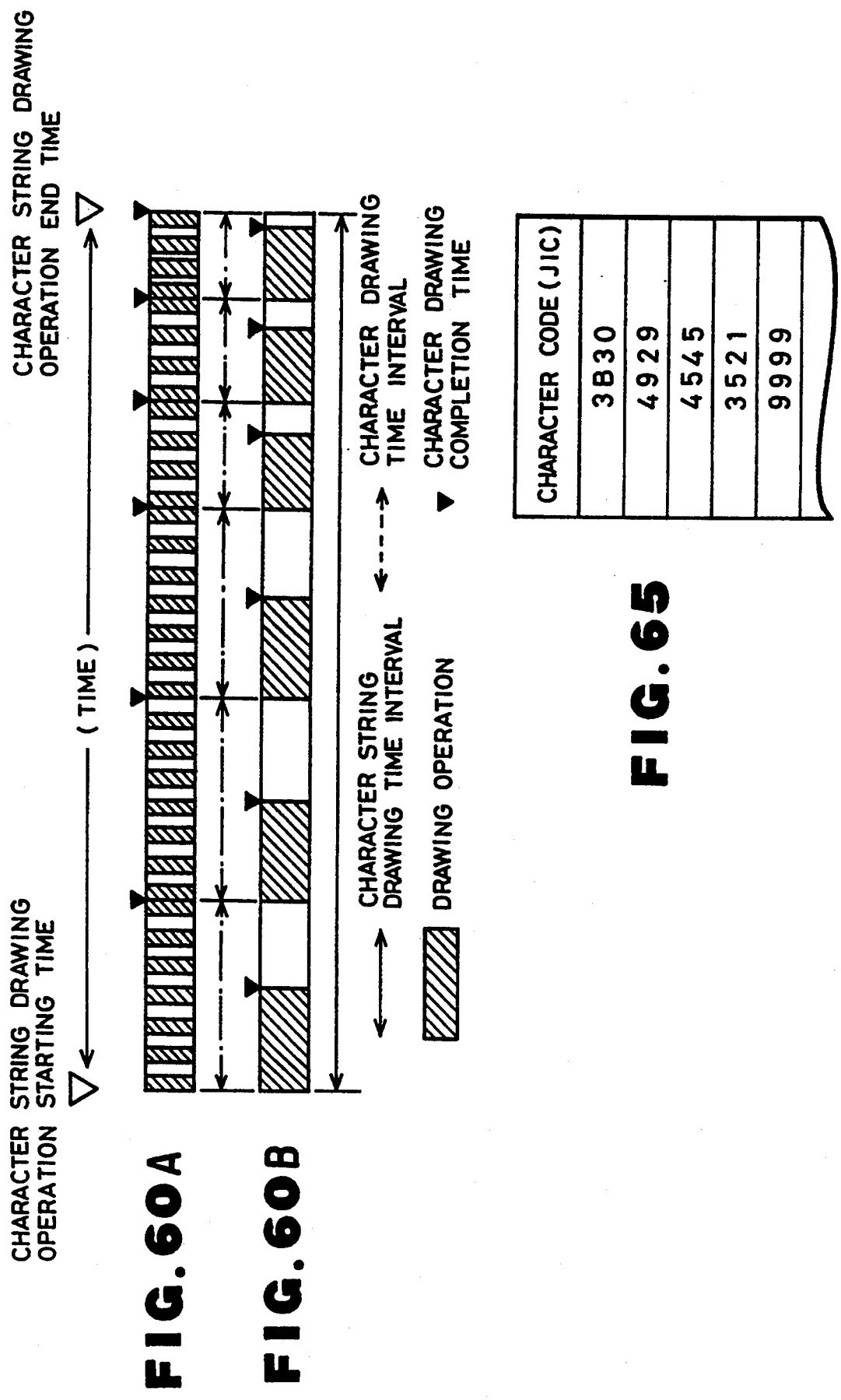

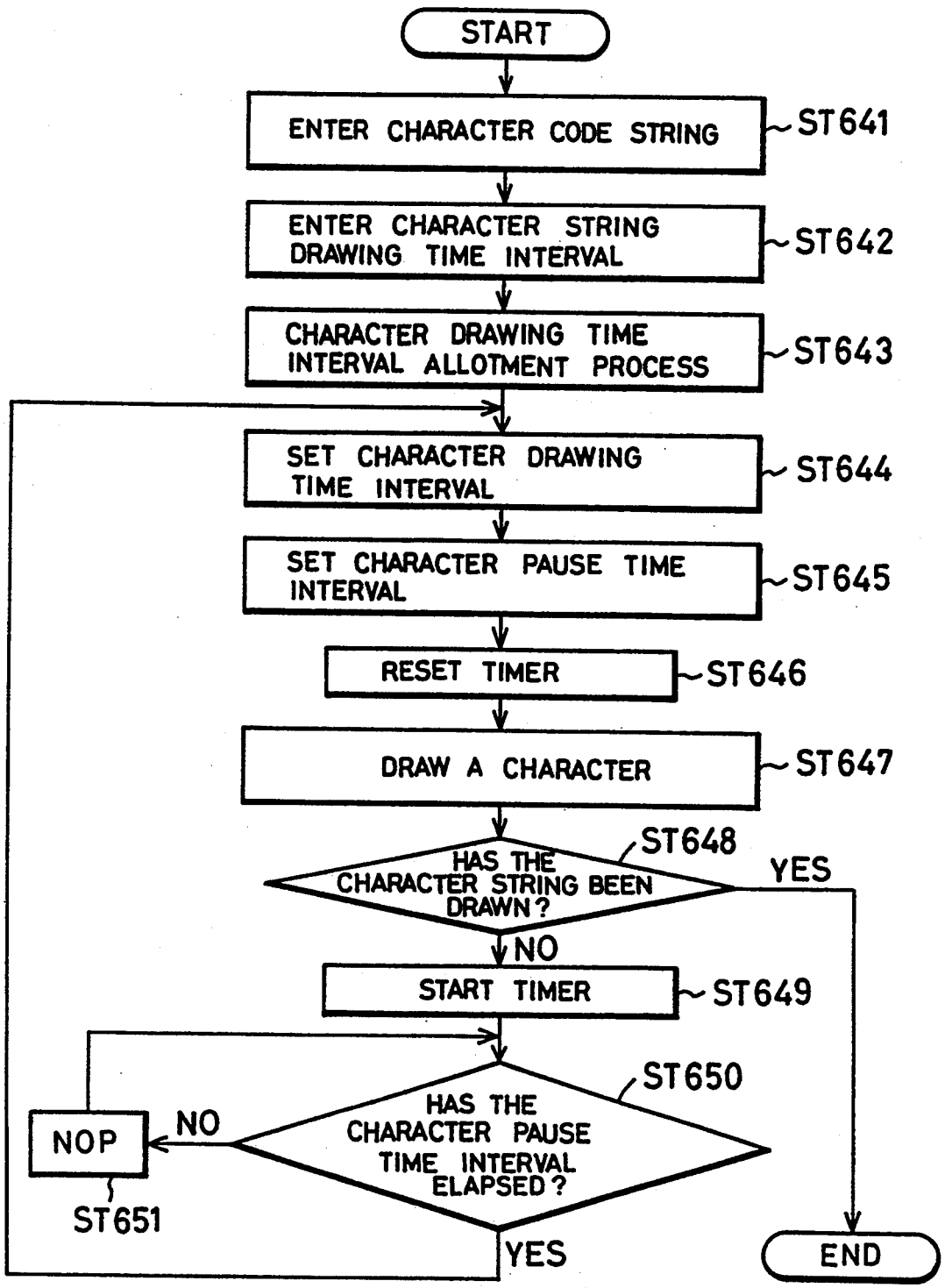

FIG. 66 (A)

RULE 1: SET ALL THE CHARACTER PAUSE TIME INTERVALS TO b SECONDS, AND ALLOT EQUAL CHARACTER DRAWING TIME INTERVALS TO THE CHARACTERS

FIG. 66 (B)

START

COUNT THE NUMBER N OF CHARACTERS — ST661

$B = (N-1) \cdot b$ — ST662

$t = (T-B)/N$ — ST663

END

FIG. 66 (C)

| CHARACTER CODE | 3B30 | 4929 | 4545 | 3521 | 9999 |
|---|---|---|---|---|---|
| CHARACTER DRAWING TIME INTERVAL | t | t | t | t | |
| CHARACTER PAUSE TIME INTERVAL | ▨ | b | b | b | |

FIG. 67 (A)

RULE 2: THE CHARACTER DRAWING TIME INTERVAL IS a TIMES THE CHARACTER PAUSE TIME INTERVAL, AND EQUAL CHARACTER DRAWING TIME INTERVALS AND EQUAL CHARACTER PAUSE TIME INTERVALS ARE TO BE ALLOTTED TO CHARACTERS

FIG. 67 (B)

START → COUNT THE NUMBER N OF CHARACTERS ~ST661

$b = T/(aN+N-1)$ ~ST672

$t = ab$ ~ST673

END

FIG. 67 (C)

| CHARACTER CODE | 3B30 | 4929 | 4545 | 3521 | 9999 |
|---|---|---|---|---|---|
| CHARACTER DRAWING TIME INTERVAL | ab | ab | ab | ab | |
| CHARACTER PAUSE TIME INTERVAL | ░ | b | b | b | |

FIG. 68 (A)

RULE 3: ASSIGN a CHARACTER PAUSE TIME INTERVAL b SECONDS TO CHARACTERS, AND ALLOT CHARACTER DRAWING TIME INTERVALS WEIGHTED BY FACTORS SPECIFIED IN THE TABLE 1 TO CHARACTERS

FIG. 68 (B)

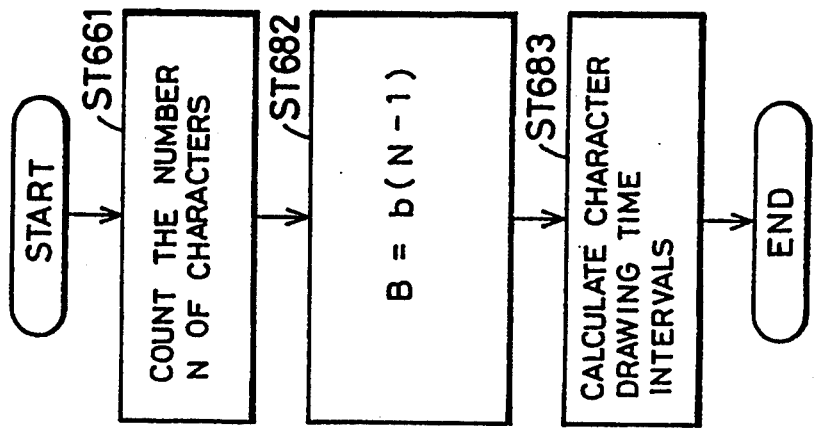

FIG. 68 (C)

| CHARACTER CODE | 3B30 | 4929 | 2545 | 2121 | 9999 |
|---|---|---|---|---|---|
| CHARACTER DRAWING TIME INTERVAL | 5x | 5x | 3x | 1x | |
| CHARACTER PAUSE TIME INTERVAL | b | b | b | | |

FIG. 68 (D)

| SYMBOL CODE | CHARACTER CODE | RELATIVE DRAWING TIME DATA |
|---|---|---|
| ALPHANUMERIC CHARACTER SET | 2120~222F | 1 |
| HIRAGANA CHARACTER SET | 2330~237F | 1 |
| KATAKANA CHARACTER SET | 2420~247F | 3 |
| GREEK CHARACTER SET | 2520~257F | 3 |
| RUSSIAN CHARACTER SET | 2620~2650 | 2 |
| CHINESE CHARACTER SET | 2720~277F | 2 |
| | 3020~737F | 5 |

CHARACTER DRAWING AND DISPLAYING APPARATUS WITH DRAWING SPEED CONTROL

BACKGROUND OF THE INVENTION

1. Field of the Invention

The present invention relates to a character drawing apparatus for use in combination with various information display to draw a character pattern represented by a character code or a character code string.

2. Description of the Prior Art

Character drawing apparatus are classified roughly into dot type character drawing apparatus which store and reproduce character patterns in dot patterns, and vector type character drawing apparatus which store character patterns in vector data and convert the vector data into dot patterns in reproducing characters. A vector type character drawing apparatus, such as a character pattern generator disclosed in Japanese Patent Laid-open (Kokai) No. 62-251983, stores a character in vector data representing the character outline and reproduces the character in a high quality by solidifying the space enclosed by the character outline. Storing a character pattern in vector data has an advantage that the character pattern can easily be enlarged or reduced. Researches have been made to develop a method of drawing a character pattern written with a writing brush (hereinafter referred to as "brush-written character pattern") by a computer by writing a brush-written character along the strokes. Such a method is disclosed in "Generation of Brush-written Chinese Characters by Computer", Denshi Tsushin Gakkai Ronbun-shi, Vol. J-67-D, No. 5, pp. 599–606, May, 1984.

A conventional vector type character drawing apparatus disclosed in Japanese Patent Laid-open (Kokai) No. 62-251983 will be described hereinafter by way of example. Referring to FIG. 71 the vector type character drawing apparatus comprises a stroke memory 181 storing stroke data corresponding to character codes, a stroke drawing operation control unit 182 for converting stroke data read from the stroke memory 181 into a corresponding dot pattern, a dot pattern memory 183 for storing the dot pattern produced by the stroke drawing control unit 182, a solidification control unit 184 for solidifying a closed region enclosed by the character outline of the character pattern read from the dot pattern memory 183, and a main control unit 185 for controlling the general operation of the character drawing apparatus.

The operation of the character drawing apparatus will be described hereinafter. FIG. 72 is an illustration of assistance in explaining exemplary stroke data for the case of the letter J by way of example. When a character code representing the letter J is entered by an external device into the character drawing apparatus, a series of stroke data 121 to 130 of the letter J is read from the stroke memory 181 and the stroke data 121 to 130 are transferred to the stroke drawing control unit 182. Then, the stroke drawing operation control unit 182 writes dots at points in the dot pattern memory 183 respectively corresponding to the stroke data 121 to 130. After the dot patterns of all the stroke data 121 to 130 have been drawn on the dot pattern memory 183, the character outline of the letter J as shown in FIG. 72 is loaded into the dot pattern memory 183. Then, the solidification control unit 184 reads the character outline of the character pattern of the letter J from the dot pattern memory 183 and solidifies a region enclosed by the character outline to provide a dot character output. These steps are controlled sequentially by the main control unit 185. Storage of a character pattern in vectors representing the strokes of the character pattern facilitates enlargement and reduction of the character pattern.

The conventional character drawing apparatus thus constructed draws a character only on the bases of the character drawing data representing the morphology of the character, the character drawing apparatus is unable to control a time interval necessary for drawing a character. A vector type character drawing apparatus draws the character outline of a character first, and then solidifies a closed region enclosed by the character outline to draw the character, and the outline drawing speed and the closed region solidifying speed are dependent on the processing algorithm and drawing speed of the character drawing unit. On the other hand, the dot type character drawing apparatus scans the dot pattern stored in the memory and transfers the dot pattern to the image memory to draw the corresponding character. Accordingly, the character is displayed gradually on the display in order of scanning cycles, and the displaying speed is dependent on the data transfer speed of the character drawing unit.

Therefore, stroke speed is different from that of handwriting and the drawing point shifts to the starting position of the next stroke and the drawing point starts drawing the next stroke immediately after the completion of a stroke. Since the speed and timing of drawing are considerably different from those of handwriting, the conventional character drawing apparatus makes a person observing the drawing process disagreeable.

It is effective for making a person interested in a character string displayed on the display and for making the person understand correctly the information expressed by the character string to display the characters of the character string in a mode resembling that of handwriting. For example, a time interval allowed to the person for concentrating attention on a character string to be emphasized will be extended and hence the information expressed by the character string will surely remain in his memory if the characters of the character string are drawn slowly. In handwriting a character string, a short time interval is required to move the point of the pen from the end point of the last stroke of a character to the starting point of the first stroke of the next character. This short time interval allows the person to shift the visual point from the preceding character position to the succeeding character position, so that the person is able to read the character string easily and is able to concentrate attention on reading the character string. However, drawing time cannot intentionally be varied because the conventional character drawing apparatus is unable to control drawing time, and the conventional character drawing apparatus is unable to display character strings so that character strings can readily be recognized.

SUMMARY OF THE INVENTION

The present invention has been made to eliminate the foregoing drawbacks of the conventional character drawing apparatus and it is therefore an object of the present invention to provide a character drawing apparatus capable of drawing character patterns at a drawing speed conforming to stroke speed information included additionally in character drawing data.

It is another object of the present invention to provide a character drawing apparatus capable of controlling the time interval between the end of drawing a character and the start of drawing the next character to a set character pause time interval in drawing a character string.

It is a further object of the present invention to provide a character drawing apparatus capable of automatically calculating and determining a character drawing time interval for drawing each component character of a character string and a character pause time interval between the two successive component characters of the character string according to a predetermined procedure on the basis input information representing the character string and input information representing a character string drawing time interval, and capable of drawing the character string in the calculated character drawing time interval with the calculated character pause time interval between the two successive component characters.

In a first aspect of the present invention, a character drawing apparatus comprises:

(a) a character drawing data storage unit storing at least pattern data representing character patterns;

(b) a character drawing time data storage unit for storing character drawing time data representing time intervals respectively for drawing characters;

(c) a character drawing unit for loading character patterns represented by pattern data read from the character data storage unit into an image memory in dot patterns;

(d) a drawing speed control unit for regulating the drawing speed of the character drawing unit according to the character drawing time data in loading a character into the image memory in a dot pattern; and (e) a display for displaying the contents of the image memory.

In a second aspect of the present invention, a character drawing apparatus according to the present invention comprise:

(a) a character drawing data storage unit storing pattern data representing the shape of each stroke of characters, stroke order data representing stroke displaying order, stroke direction data representing directions of the strokes of characters, and stroke speed data representing stroke speed;

(b) a variable-speed character drawing unit for loading the strokes of a character represented by pattern data read from the character drawing data storage unit into a image memory in order of stroke represented by the stroke order data, in stroke directions represented by the stroke direction data and at a stroke speed represented by the stroke speed data read from the character drawing data storage unit; and (c) a display for displaying the contents of the image memory.

In a third aspect of the present invention, a character drawing apparatus comprises:

(a) a character drawing data storage unit storing at least pattern data representing character patterns;

(b) a drawing time data storage unit storing character pause time data representing time intervals each between the two successive characters;

(c) a character drawing unit for loading character patterns represented by pattern data read from the character drawing data storage unit into an image memory in dot patterns;

(d) a character pause time interval control unit for forbidding the operation of the character drawing unit for a character pause time interval represented by the character pause time data stored in the drawing time data storage unit after the completion of loading a character into the image memory in a dot pattern by the character drawing unit; and (e) a display for displaying the contents of the image memory.

In a fourth aspect of the present invention, a character drawing apparatus comprises:

(a) a character drawing data storage unit storing at least pattern data representing character patterns;

(b) a drawing time data storage unit storing character pause time data representing character pause time intervals each between the two successive characters, and character drawing time data representing character drawing time intervals required respectively for drawing characters;

(c) a character drawing unit for loading character patterns of the component characters of a character string represented by pattern data read from the character drawing data storage unit into an image memory;

(d) a character pause time interval control unit for forbidding the operation of the character drawing unit for a character pause time interval represented by the character pause time data stored in the drawing time data storage unit after the completion of loading a character into the image memory in a dot pattern by the character drawing unit;

(e) a drawing speed control unit for regulating the drawing speed of the character drawing unit according to the character drawing time data in loading a character into the image memory in a dot pattern; and (f) a display for displaying the contents of the image memory.

In a fifth aspect of the present invention, a character drawing apparatus comprises:

(a) a character drawing data storage unit storing at least pattern data representing the shape of each stroke of characters, stroke order data representing stroke displaying order, stroke direction data representing directions of the strokes of characters and stroke speed data representing stroke speed;

(b) a variable-speed character drawing unit for loading the strokes of a character represented by pattern data read from the character drawing data storage unit into an image memory in order of stroke represented by the stroke order data, in stroke directions represented by the stroke direction data and at a stroke speed represented by the stroke speed data read from the character drawing data storage unit;

(c) a drawing time data storage unit storing character pause time data representing character pause time intervals each between the two successive characters;

(d) a character pause time interval control unit for forbidding the operation of the variable-speed character drawing unit for a character pause time interval represented by the character pause time data stored in the drawing time data storage unit after the completion of loading a character into the image memory in a dot pattern by the variable-speed character drawing unit; and (e) a display for displaying the contents of the image memory.

In a sixth aspect of the present invention, a character drawing apparatus comprises:

(a) a character drawing data storage unit storing at least pattern data representing the shape of each stroke of characters, stroke order data representing stroke displaying order, stroke direction data representing directions of the strokes of characters and stroke speed data representing stroke speed;

(b) a variable-speed character drawing unit for loading the strokes of a character represented by pattern data read from the character drawing data storage unit into an image memory in order of stroke represented by the stroke order data, in stroke directions represented by the stroke direction data and at a stroke speed represented by the stroke speed data read from the character drawing data storage unit;

(c) a drawing time data storage unit storing character pause time data representing character pause time intervals each between the two successive characters, and character drawing time data representing time intervals respectively for drawing characters;

(d) a character pause time interval control unit for forbidding the operation of the variable-speed character drawing unit for a character pause time interval represented by the character pause time data stored in the drawing time data storage unit after the completion of loading a character into the image memory in a dot pattern by the variable-speed character drawing unit;

(e) a drawing speed control unit for regulating the drawing speed of the variable-speed character drawing unit according to the character drawing time data in loading a character into the image memory in a dot pattern; and (f) a display for displaying the contents of the image memory.

In a seventh aspect of the present invention, a character drawing apparatus comprises:

(a) a character string storage unit for storing character strings;

(b) a character string drawing time data storage unit for storing character string drawing time data representing a time interval for drawing each character string;

(c) a character drawing time data storage unit for storing character drawing time data representing a time interval for drawing each character;

(d) a character drawing data storage unit storing character patterns;

(e) a drawing time allocation processing unit for calculating a character drawing time interval for each component character of the character string stored in the character string storage unit by using the character string stored in the character string storage unit, and the time data stored in the character string drawing time data storage unit, and for storing the calculated character drawing time interval in the character drawing time data storage unit;

(f) a character drawing unit for loading character patterns represented by the pattern data read from the character drawing data storage unit into an image memory in dot patterns;

(g) a drawing speed control unit for regulating the drawing speed of the character drawing unit according to the character drawing time data in loading a character into the image memory in a dot pattern; and (h) a display for displaying the contents of the image memory.

In an eighth aspect of the present invention, a character drawing apparatus comprises:

(a) a character string storage unit for storing character strings;

(b) a character string drawing time data storage unit for storing character string drawing time data representing a time interval for drawing each character string;

(c) a character drawing time data storage unit for storing character drawing time data representing a time interval for drawing each character, and storing character pause time data representing character pause time intervals each between the two successive characters;

(d) a character drawing data storage unit storing pattern data representing character patterns;

(e) a drawing time allocation processing unit for calculating a character drawing time interval for each component character of the character string stored in the character string storage unit by using the character string stored in the character string storage unit, and the time data stored in the character string drawing time data storage unit, and for storing the calculated character drawing time interval in the character drawing time data storage unit;

(f) a character drawing unit for loading characters represented by the pattern data read from the character drawing data storage unit into an image memory in dot patterns;

(g) a character pause time interval control unit for forbidding the operation of the character drawing unit for a character pause time interval represented by the character pause time data stored in the drawing time data storage unit after the completion of loading a character into the image memory in a dot pattern by the character drawing unit;

(h) a drawing speed control unit for regulating the drawing speed of the character drawing unit according to the character drawing time data in loading a character into the image memory in a dot pattern; and (i) a display for displaying the contents of the image memory.

In a ninth aspect of the present invention, a character drawing apparatus comprises:

(a) a character string storage unit for storing character strings;

(b) a character string drawing time data storage unit for storing a character string drawing time data for drawing a character string;

(c) a character drawing time data storage unit for storing a character drawing time data for drawing a character;

(d) a character drawing data storage unit storing at least pattern data representing the shape of each stroke of characters, stroke order data representing stroke displaying order, stroke direction data representing directions of the strokes of characters and stroke speed data representing stroke speed;

(e) a variable-speed character drawing unit for loading the strokes of a character represented by pattern data read from the character drawing data storage unit into an image memory in order of stroke represented by stroke order data, in stroke directions represented by stroke direction data and at a stroke speed represented by the stroke speed data read from the character drawing data storage unit;

(f) a drawing time allocation processing unit for calculating a character drawing time interval for each component character of a character string stored in the character string storage unit by using the character string stored in the character string storage unit, and the time data stored in the character string drawing time storage unit, and for storing the calculated character drawing time interval in the character drawing time data storage unit;

(g) a drawing speed control unit for regulating the drawing speed of the variable-speed character drawing unit according to the character drawing time data in loading a character into the image memory in a dot pattern; and (h) a display for displaying the contents of the image memory.

In a tenth aspect of the present invention, a character drawing apparatus comprises:

(a) a character string storage unit for storing character strings;

(b) a character string drawing time data storage unit for storing character string drawing time data representing a time interval for drawing each character string;

(c) a character drawing time data storage unit for storing character drawing time data representing a time interval for drawing each character, and for storing character pause time data representing character pause time intervals each between the two successive characters;

(d) a character drawing data storage unit storing at least pattern data representing the shape of each stroke of characters, stroke order data representing stroke displaying order, stroke direction data representing directions of the strokes of characters and stroke speed data representing stroke speed;

(e) a variable-speed character drawing unit for loading the strokes of a character represented by pattern data read from the character drawing data storage unit into a image memory in order of stroke represented by the stroke order data, in stroke directions represented by the stroke direction data and at a stroke speed represented by the stroke speed data read from the character drawing data storage unit;

(f) a drawing time allocation processing unit for calculating a character drawing time interval for each component character of the character string stored in the character string storage unit by using the character string stored in the character string storage unit, and the time data stored in the character string drawing time storage unit, and for storing the calculated character drawing time interval in the character drawing time data storage unit;

(g) a character pause time interval control unit for forbidding the operation of the character drawing unit for a character pause time interval represented by the character pause time data stored in the drawing time data storage unit after the completion of loading a character into the image memory in a dot pattern by the character drawing unit;

(h) a drawing speed control unit for regulating the drawing speed of the variable-speed character drawing unit according to the character drawing time data in loading a character into the image memory in a dot pattern; and (i) a display for displaying the contents of the image memory.

BRIEF DESCRIPTION OF THE DRAWINGS

FIG. 1 is a block diagram of a character drawing apparatus in a first embodiment according to the present invention;

FIGS. 2(A) and 2(B) are illustrations of assistance in explaining a character pattern processed by the character drawing apparatus of FIG. 1;

FIG. 3 is an explanatory view of a pattern data;

FIG. 4 is a flow chart of a character drawing procedure;

FIG. 5 is a flow chart of a pattern drawing procedure;

FIG. 6 is a block diagram of a character drawing apparatus in a second embodiment according to the present invention;

FIG. 7 is a flow chart of a character drawing process to be executed by the character drawing apparatus of FIG. 6;

FIG. 8 is a block diagram of a character drawing apparatus in a third embodiment according to the present invention;

FIG. 9 is a block diagram of a character drawing apparatus in a fourth embodiment according to the present invention;

FIG. 10 is a table showing character sets, character codes and drawing time intervals assigned to characters by the character drawing apparatus of FIG. 9;

FIG. 11 is a flow chart of a character drawing procedure to be executed by the character drawing apparatus of FIG. 9;

FIG. 20 is a view of assistance in explaining a preparatory pattern drawing process;

FIGS. 22(A) and 22(B) show examples of pattern drawing command strings;

FIGS. 25(A)-1, 25(A)-2, 25(B)-1, 25(B)-2, 25(C) and 25(D) are views of assistance in explaining character drawing data used by the character drawing apparatus of FIG. 24;

FIG. 29 is a flow chart of a pattern drawing process to be executed by the character drawing apparatus of FIG. 24;

FIG. 32 is a block diagram of a character drawing apparatus in a ninth embodiment according to the present invention;

FIG. 34 is a view of assistance in explaining character codes used by the character drawing apparatus of FIG. 32;

FIG. 35 is an illustration of an exemplary character pattern for use by the character drawing apparatus of FIG. 32;

FIG. 36 is a view of pattern data representing the character pattern shown in FIG. 35;

FIG. 37 is a view of assistance in explaining character codes and character pause time intervals for use by a character drawing apparatus in a tenth embodiment according to the present invention;

FIG. 39 is a block diagram of a character drawing apparatus in an eleventh embodiment according to the present invention;

FIG. 45 is a view of assistance in explaining character codes and character pause time intervals for use by a character drawing apparatus in a fourteenth embodiment according to the present invention;

FIG. 48 is a table of character sets, character codes, character drawing time intervals and character pause time intervals for use by the character drawing apparatus of FIG. 47;

FIG. 56 is a flow chart of a character string drawing process to be executed by the character drawing apparatus of FIG. 55;

FIG. 57 is a view of character codes for use by the character drawing apparatus of FIG. 55;

FIGS. 58(A), 58(B) and 58(C) are views of assistance in explaining a rule of drawing time allocation process, a drawing time allocation process and drawing time allocation data, respectively, for use by the character drawing apparatus of FIG. 55;

FIGS. 59(A), 59(B), 59(C) and 59(D) are views of assistance in explaining a rule of drawing time allocation process, a drawing time allocation process, character drawing time data and relative drawing time data, respectively, for use by the character drawing apparatus in a nineteenth embodiment according to the present invention;

FIG. 60 is a view of assistance in explaining the relation between character drawing time intervals and actual character drawing time intervals;

FIGS. 60(A) and 60(B) illustrate the relation between the character drawing time intervals allocated to the characters and an actual character drawing period between the start and the completion of the drawing of a character;

FIG. 64 is a flow chart of a character drawing process to be executed by the character drawing apparatus of FIG. 63;

FIG. 65 is a view of character codes for use by the character drawing apparatus of FIG. 63;

FIGS. 66(A), 66(B) and 66(C) are views of assistance in explaining a rule of drawing time allocation process, a drawing time allocation process, character drawing time data and character pause time data for use by the character drawing apparatus of FIG. 63;

FIG. 67(A), 67(B), and 67(C) are views of assistance in explaining a rule of drawing time allocation process, a drawing time allocation process, character drawing time data and character pause time data for use by a character drawing apparatus ill a twenty-third embodiment according to the present invention;

FIGS. 68(A), 68(B), 68(C) and 68(D) are views of assistance in explaining a rule of weighted character drawing time allocation process, a weighted character drawing time allocation process, character drawing time data and relative drawing time data for use by a character drawing apparatus in a twenty-fourth embodiment according to the present invention;

DESCRIPTION OF THE PREFERRED EMBODIMENTS

Figure 12:
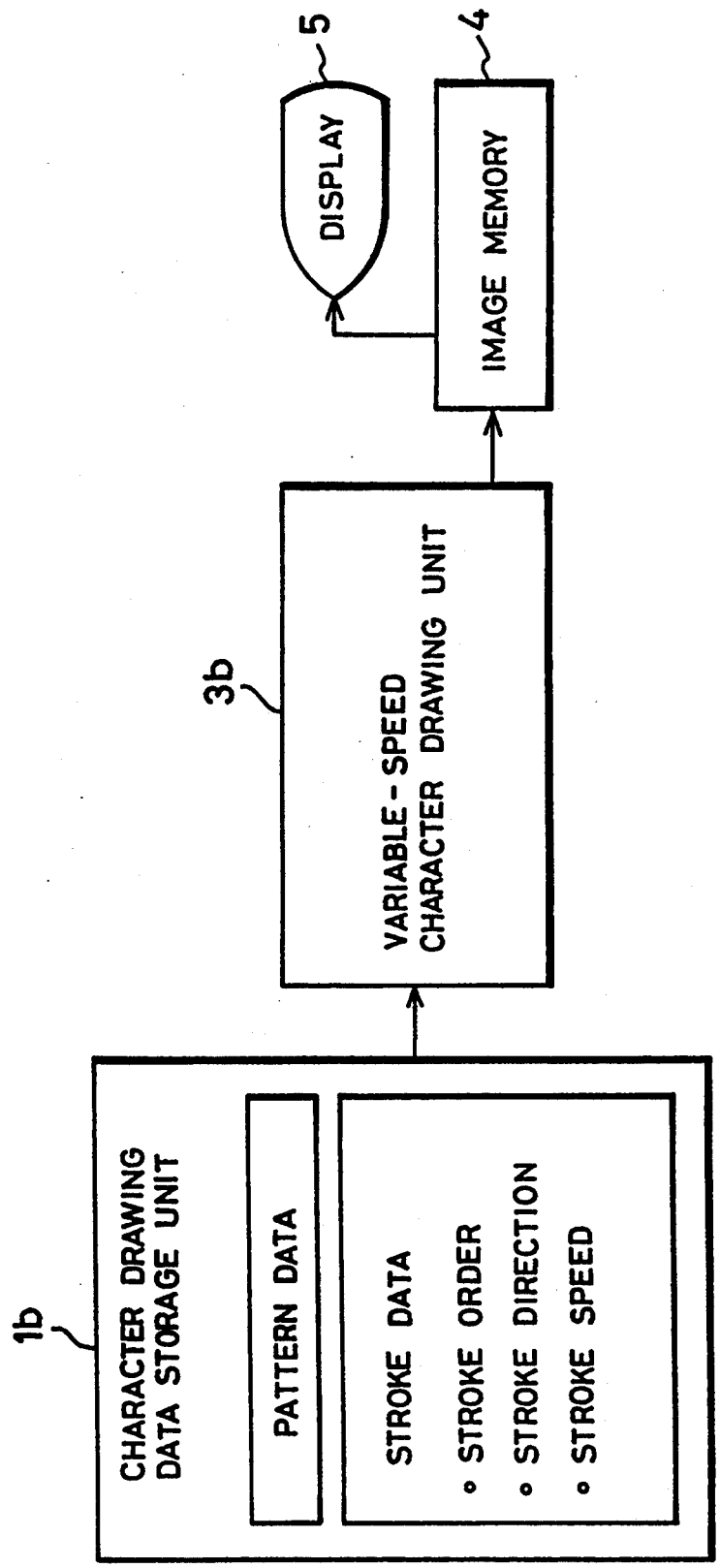
FIG. 12 is a block diagram of a character drawing apparatus in a fifth embodiment according to the present invention.

Preferred embodiments of the present invention will be described hereinafter with reference to the accompanying drawings.

First Embodiment

Referring to FIG. 1, a character drawing apparatus comprises a character drawing data storage unit 1a storing pattern data, a character drawing time data storage unit 2a storing character drawing time data (hereinafter, referred to as "drawing time data"), a character drawing unit 3a, an image memory 4, a display 5 for displaying the contents of the image memory 4, and a drawing speed control unit 6. The character processing unit 3a and the drawing speed control unit 6 constitute a character drawing control unit 8a.

The constitution of character drawing data for use by the character drawing apparatus in the first embodiment will be described hereinafter with reference to FIGS. 2(A), 2(B) and 3.

Referring to FIGS. 2(A) and 2(B), a character pattern of the letter J is expressed in a dot pattern as shown in FIG. 2(A), and dots of a 16×16 matrix expressing the character pattern are stored in binary digits as shown in FIG. 2(B). The dots forming the letter J are represented by a digit "1", and the rest are represented by a digit "0".

Referring to FIG. 3, dot pattern data represents the binary pattern expressed by digits "0" and "1" by hexadecimal numbers. Strings of binary digits on lines from top to bottom in FIG. 2(B) correspond to hexadecimal numbers on lines from top to bottom in FIG. 3, respectively. Character drawing time data for drawing the letter J is 1 second.

A character drawing process to be executed by the character drawing apparatus will be described hereinafter with reference to FIGS. 4 and 5.

In step ST41, a character code representing a character to be drawn is entered into the character drawing unit 3a. In step ST42, the character drawing unit 3a reads character pattern data corresponding to the input character code from the character drawing data storage unit 1a, and the drawing speed control unit 6 reads drawing time data from the character drawing data storage unit 1a. In step ST43, the character drawing unit 3a and the drawing speed control unit 6 loads a pattern represented by pattern data included in the character drawing data into the image memory 4 by controlling drawing time intervals according to the drawing time data.

FIG. 5 shows a process to be executed in step ST43 of FIG. 4. The character drawing apparatus uses pattern data expressed by a matrix of 16×16 dots. The lines of dots are loaded sequentially from the top line to the bottom line into the image memory 4. The dots on each line are drawn sequentially from the left end dot to the right end dot. The drawing time interval is controlled so that the dots are loaded at a drawing speed of one line per 1/16 seconds to draw the pattern data in 1 second into the image memory 4. Time required to draw the dots on one line is designated as a unit drawing time interval.

A pattern drawing process will be described hereinafter with reference to FIG. 5. In step ST51, the drawing speed control unit 6 resets and starts a timer for counting character drawing time. In step ST52, the character drawing unit 3a loads one line of the pattern data into the image memory 4. In step ST53, the drawing speed control unit 6 inquires to see if the unit drawing time interval has passed after the start of the timer. When the response in step ST53 is negative, the character drawing unit 3a remains in a waiting condition in step ST54, and then executes step ST53 again. Upon the elapse of the unit drawing time interval, the character drawing unit 3a makes an inquiry in step ST55 to see if all the dots on the line have been drawn. Steps ST51 to ST55 are repeated until the dots of all the lines are loaded into the image memory 4.

In this embodiment, the dots on each line are drawn successively and the character drawing apparatus remains in a waiting condition before starting drawing the dots of the next line until the unit drawing time interval elapses. The timing control for drawing the dots may be executed for each dot or for a block of several lines instead of for each line.

In this embodiment, the drawing time data is assigned to the pattern data of an individual character and is stored in the drawing time data storage unit 2a, but the drawing time data may be set each time the character drawing process is executed regardless of the pattern data.

Second Embodiment

A character drawing apparatus in a second embodiment according to the present invention shown in FIG. 6 uses drawing time data set in a drawing time data storage unit 2a by an external input device each time a character is drawn. Referring to FIG. 6, drawing time data, similarly to a character code, is entered into a character drawing operation control unit 81a by means of an external input device. The drawing time data may be entered into the character drawing operation control unit 81a by manually operating an external input device, such as a keyboard, may be transferred automatically to the same from a data file or may be transferred to the same from an application program together with character codes. A character drawing unit 31a stores the input drawing time data in the drawing time data storage unit 2a and draws characters by using the drawing time data.

Referring to FIG. 7 showing a flow chart of a character drawing process to be executed by the character drawing apparatus, a character code representing a character to be drawn is entered into the character drawing operation control unit 81a in step ST41. In step ST70, a query is made to see if the change of drawing time data for the following character drawing process is necessary. When the response in step ST70 is affirmative, the drawing time data is stored after change in the drawing time data storage unit 2a in step ST71, the character drawing unit 31a reads pattern data of the character corresponding to the character code from a character drawing data storage unit 1 and a drawing speed control unit 6 reads the drawing time data from the drawing time data storage unit 2a in step ST42. In step ST43, the character drawing unit 31a and the drawing speed control unit 6 load a pattern represented by the pattern data into an image memory 4 according to the drawing time data. The character drawing apparatus executes the same pattern drawing process as that executed by the character drawing apparatus in the first embodiment.

The character drawing apparatus in the first and second embodiments controls a time interval required for drawing a character only on the basis of the drawing time data representing an actual time interval assigned to the character. The character drawing time interval may be controlled on the basis of drawing time data for controlling the time interval required for drawing a character, including an actual time interval required for drawing a character and a relative time interval, namely, the ratio of a time interval required for drawing a character to the absolute time interval.

Third Embodiment

FIG. 8 shows a character drawing apparatus in a third embodiment according to the present invention including a drawing time data storage unit 22a, which stores standard drawing time data representing a standard drawing time interval required for drawing characters of a standard character set, and relative drawing time data representing relative drawing time intervals, namely, the ratios each of a drawing time interval required for drawing a character of a character set to the standard drawing time interval. The relative drawing time data can optionally be changed. The character drawing operation of the character drawing apparatus in the third embodiment is substantially the same as that of the character drawing apparatus in the second embodiment described previously with reference to FIG. 7, except that the relative drawing time data is entered into the drawing time data storage unit 2a in step ST71. Drawing time data, namely, a value obtained by multiplying the standard drawing time interval by the relative drawing time interval for the relevant characters is used for actual drawing operation. The drawing time data thus obtained is used for drawing time control operation in step ST43.

In the third embodiment, desired relative drawing time data is entered by means of an input device in resetting the relative drawing time data, but the drawing time data can automatically be changed by changing the character drawing time intervals according to a given rule.

Fourth Embodiment

FIG. 9 shows a character drawing apparatus in a fourth embodiment according to the present invention, which changes drawing time data automatically for a specified character set. This character drawing apparatus has a drawing time data storage unit 23a storing drawing time data table as shown in FIG. 10, by way of example, assigning drawing time data respectively to the character sets. The table shown in FIG. 10 includes seven character sets, namely, a symbol set, an alphanumeric character set, a hiragana character set, a katakana character set, a Greek character set, a Russian character set and a Chinese character set. Different character drawing time intervals are applied to drawing different character sets, respectively.

A character drawing process to be executed by the character drawing apparatus will be described hereinafter with reference to FIG. 11. In step ST41, a character code representing a character to be drawn is entered. In step ST110, the character set to which the character indicated by the character code belongs is identified with reference to the drawing time data table, and then the relative drawing time data identified in step ST110 is selected in step ST111. Then, in step ST42, a drawing time interval is determined on the basis of the relative drawing time data and predetermined standard drawing time data, and then the character is drawn in the drawing time interval in step ST43.

Although the foregoing embodiments employ dot pattern data as the character drawing data, the character drawing data is not limited thereto.

Fifth Embodiment

FIG. 12 shows a character drawing apparatus in a fifth embodiment according to the present invention. A character drawing data storage unit 1b for storing character drawing data necessary for drawing characters stores pattern data and stroke data. The pattern data includes the shape of each stroke of characters. The stroke data includes stroke order data representing the order of drawing strokes of characters, stroke direction data representing the direction of each stroke of characters, and stroke speed data for controlling time required for drawing strokes. The character drawing apparatus comprises a variable-speed character drawing unit 3b, an image memory 4, and a display 4 for displaying the contents of the image memory 4.

Figure 13:
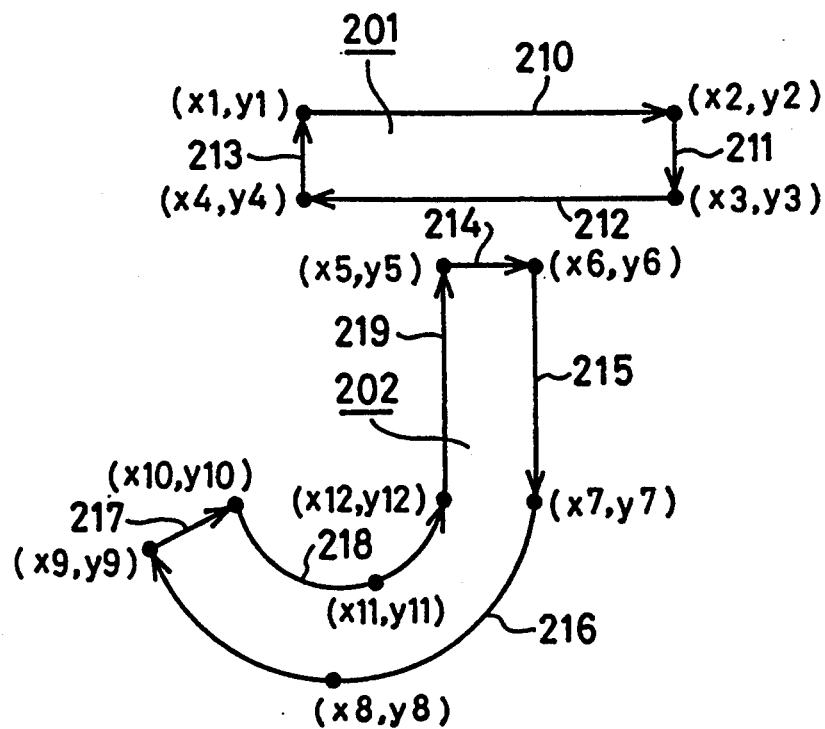
FIGS. 13(A), 13(B), 14(A), 14(B) and 14(C) reviews of an exemplary character drawing data for use by the character drawing apparatus of FIG. 12.
Figure 14:
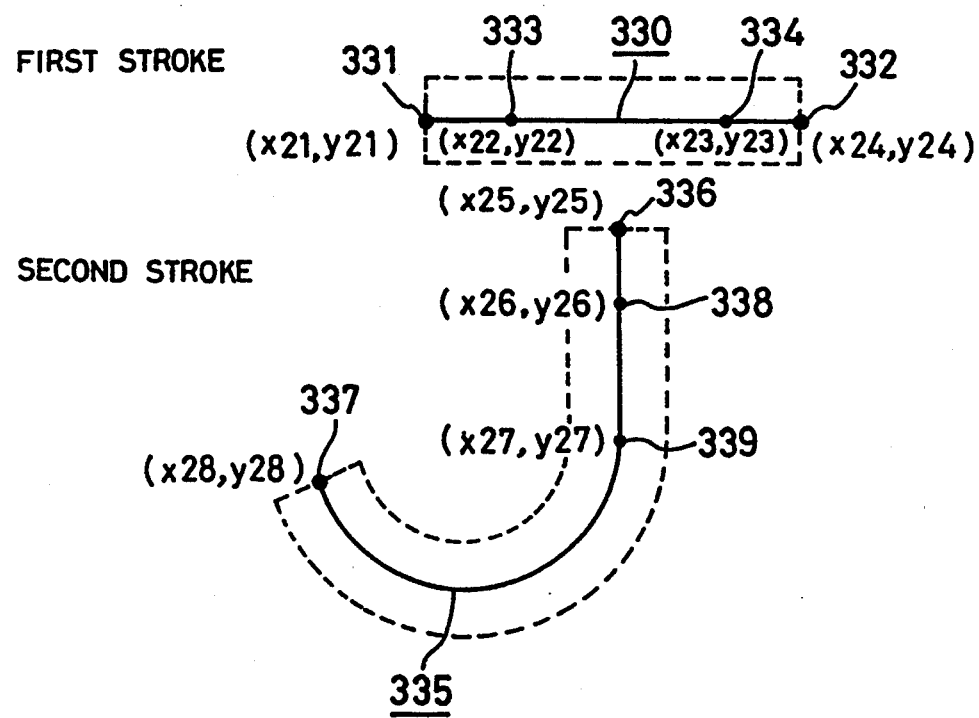

The character drawing data for use by the character drawing apparatus will be described hereinafter with reference to FIGS. 13(A), 13(B), 14(A) and 14(B). Shown in FIGS. 13(A) and 13(B) are a character pattern (the pattern of the letter J) defined by pattern data and elements of the pattern data, respectively. The pattern data includes the shapes of strokes of the character, and the outline of each stroke is defined by vector data. For example, the letter J consists of a first stroke 201 and a second stroke 202 as shown in FIG. 13(A). The first stroke 201 is defined by four vectors 210, 211, 212 and 213. As shown in FIG. 13(B), each vector is defined by a straight line code indicating a straight line, the coordinates of the starting point of the straight line and the coordinates of the end point of the straight line. A curved section of each stroke, for example, a curved section 216 in the outline of the second stroke 202 is defined by a circular arc code indicating a circular arc, and three sets of coordinates (x7, y7), (xS, y8) and (x9, y9) defining a circular arc. FIG. 14(A) shows stroke data, FIG. 14(B) shows the elements of the stroke data, and FIG. 14(C) shows a chain code string indicating stroke directions. The stroke data includes stroke order indicating the order of displaying strokes, the direction of each stroke, and stroke speed serving for controlling time required for drawing each stroke of the character. In FIG. 14(A), a first stroke and a second stroke are drawn in that order. The stroke direction of each stroke is defined by the coordinates of the starting point of the stroke, the coordinates of the end point of the stroke, and sets of coordinates of points on a stroke line connecting the starting point and the end point. For example, as shown in FIG. 14(A), the stroke line of the first stroke is represented by a solid line 330 connecting a starting point 331 and an end point 332. The stroke line of the second stroke is represented by a solid line 335 connecting a starting point 336 and an end point 337. The directions of the stroke lines are indicated by the chain code string shown in FIG. 14(C) included in the stroke data. For chain code string, refer to "Digital Signal Processing", Kindai Kagaku-sha, pp. 3–5, Translation by Prof. M. Nagao, Kyoto Univ.

Figure 15:
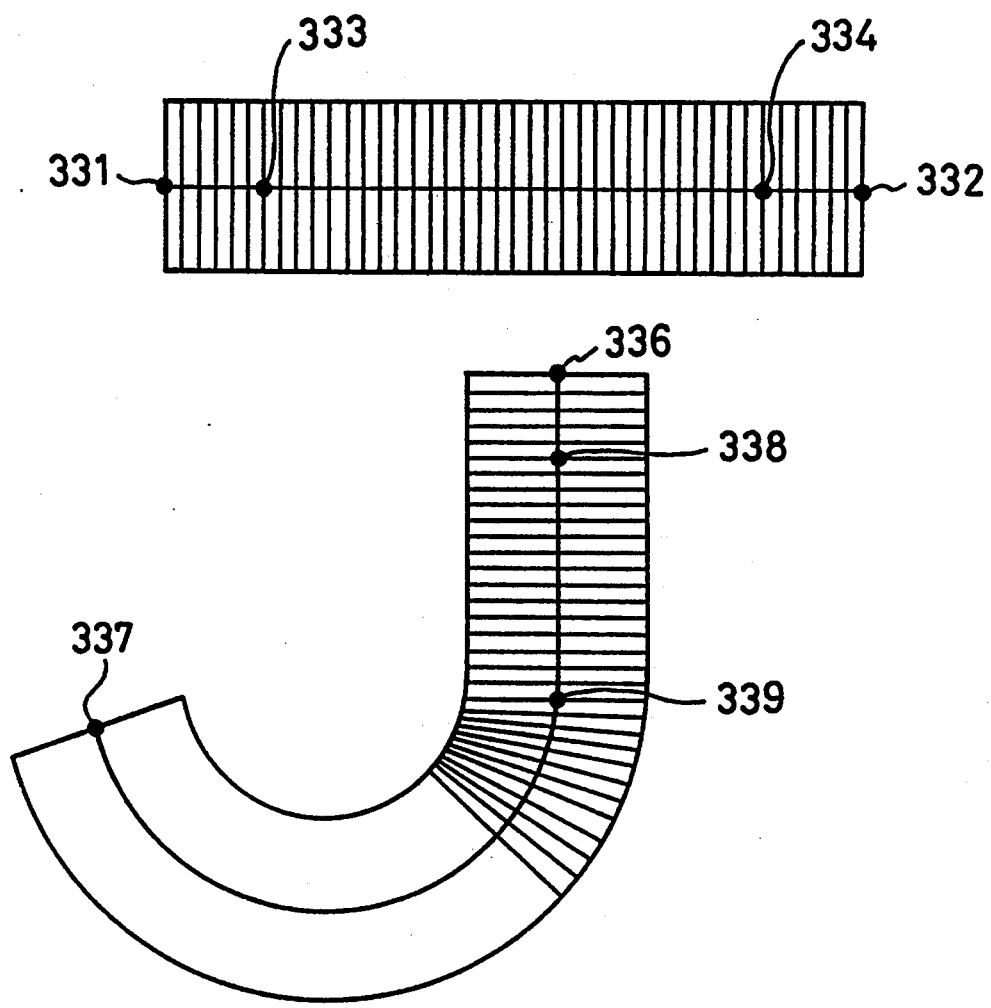
FIG. 15 is an illustration of assistance in explaining stroke speed.

Stroke speed data will be described hereinafter. The stroke speed data is used for controlling a time interval required for sequentially drawing a plurality of regions of each stroke along the stroke line and for controlling a stroke pause time interval between the two successive strokes. The stroke data shown in FIGS. 14(A), 14(B) and 14(C) by way of example divides the stroke line of each stroke into a plurality of sections at a plurality of speed change points and assigns a stroke speed to each section. The last element of the stroke data is a stroke pause time interval between the two successive strokes, namely, a time interval between the end of drawing the preceding stroke and the start of drawing the succeeding stroke. Further description of stroke speed and stroke pause time interval will be given hereunder. The stroke data for the first stroke divides the stroke line 330 at two speed change points 333 and 334, and assigns a stroke speed "1" to drawing a section between the starting point 331 of the first stroke and the speed change point 333, a stroke speed "3" for drawing a section between the speed change points 333 and 334, a stroke speed "1" for drawing a section between the speed change point 334 and the end point 332 of the stroke and a stroke pause time interval "3". The stroke speeds and the stroke pause time interval used by this embodiment will further be described with reference to FIG. 15. The stroke speed specified in FIG. 14(B) represents the size of a region drawn in a predetermined unit time interval, such as 1/30 seconds or 20 kilocycles of a clock signal generated by a microprocessor included in the character drawing unit 3b. The size of the region does not correspond only to the arithmetic area of the region. For example, a region to be drawn is divided into a plurality of sufficiently small unit regions and the size of the region may be represented by the number of the unit regions. In this embodiment, as shown in FIG. 15, the stroke line is divided at given regular intervals by dividing points, and the stroke pattern is divided into a plurality of sufficiently small unit regions by normals to the stroke line at the dividing points. The stroke speed is represented by the number of unit regions to be drawn in a unit time interval. According to the stroke data shown in FIG. 14(B) for the first stroke, the region between the starting point 331 and the speed change point 333 is drawn at a rate of one unit region per unit time interval and the region between the speed change points 333 and 334 is drawn at a rate of three unit regions per unit time interval. The stroke pause time interval is represented by the number of unit time intervals.

The general character drawing process to be executed by the character drawing apparatus will be described hereinafter with reference to FIGS. 16 to 18 respectively showing the main routine and subroutines of the character drawing process.

Figure 16:
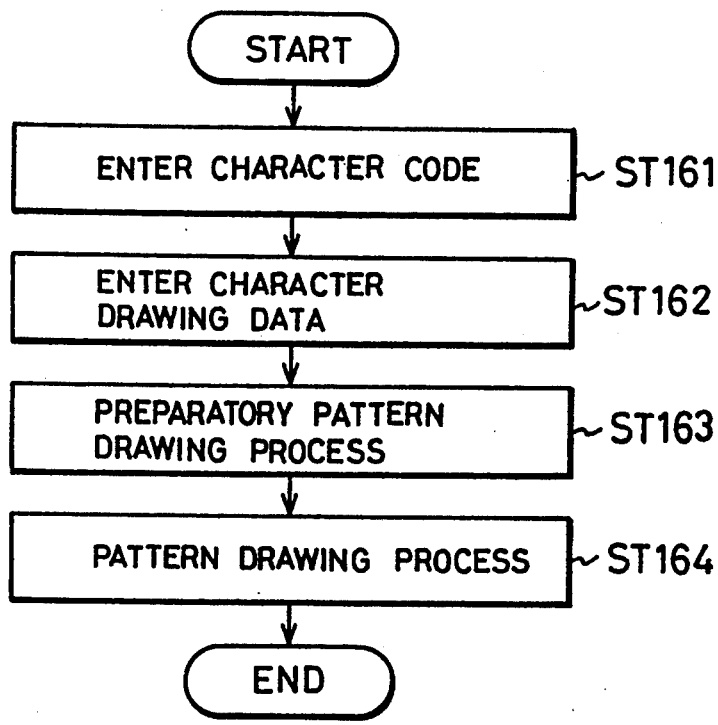
FIG. 16 is a flow chart of a character drawing procedure.
Figure 17:
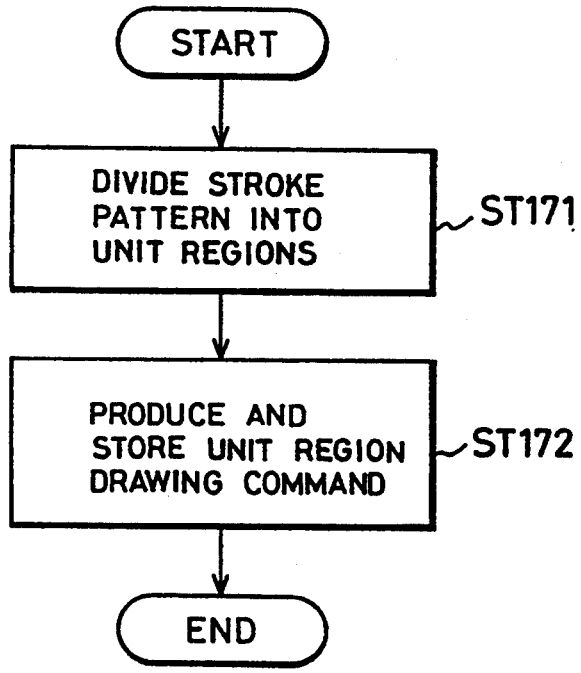
FIG. 17(A) is a flow chart of a preparatory pattern drawing process included in a character drawing process.
FIG. 17(B) is a view of assistance in explaining a unit region drawing command.
Figure 17:
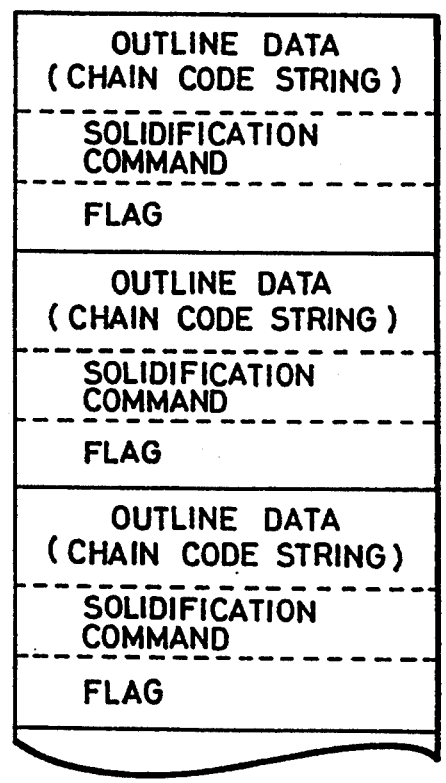

Referring to FIG. 16, a character code representing a character to be drawn is entered into the variable-speed character drawing unit 3b in step ST161. In step ST162, the variable-speed character drawing unit 3b reads the pattern data and stroke data corresponding to the character code. In step ST163, a preparatory pattern drawing process is executed to produce a pattern drawing command string on the basis of the character drawing data to draw the character by sequentially drawing its unit regions. FIG. 17(A) shows the details of the preparatory pattern drawing process and FIG. 17(B) shows, by way of example, a pattern drawing command string produced by the preparatory pattern drawing process. In step ST171, stroke patterns are divided into unit regions. In dividing each stroke pattern having a stroke line of L in length into unit regions, the stroke line is divided from the starting point to the end point or from the end point to the starting point at regular intervals l, and then normals to the stroke line at the dividing points are determined to define each unit region enclosed by the adjacent normals and line segments on the outline of the stroke pattern bounded by the adjacent normals. In step ST172, pattern drawing commands for drawing the unit region are produced and a pattern drawing command string consisting of the pattern drawing commands arranged in order of stroke and order of stroke direction. The pattern drawing command for drawing each unit region comprises outline data representing the outline of the unit region by a chain code string, a solidification command requesting solidifying the unit region, and a flag indicating inclusion of the speed change point or the end point in the unit region. In step ST164 of the pattern drawing process shown in FIG. 16, the character pattern is drawn according to the pattern drawing command string produced by the preparatory pattern drawing process and the stroke speed data for the character. FIG. 18 shows the details of the pattern drawing process. Steps of the pattern drawing process for drawing the first stroke of the letter J will be described hereinafter with reference to FIG. 18. In step ST701, stroke speeds read from the stroke data are stored in the memory of the variable-speed character drawing unit 3b. In this embodiment, the first stroke speed is "1" as shown in FIG. 14(B). In step ST702, a unit region counter for counting the drawn unit regions and a timer for measuring an elapsed time interval are reset, and then the timer is started. In step ST703, the pattern drawing command requesting drawing one unit region is read and executed. In step ST712, a query is made to see if the flag of the pattern drawing command is set. When the response in step ST712 is negative, the count of the unit region counter is incremented by "1" in step ST713, and then, in step ST714, a query is made to see if the count is less than the stroke speed. When the response in step ST714 is affirmative the routine returns to step ST703 to execute the pattern drawing operation for the next unit region. When the response in step ST712 is affirmative and when the response in step ST714 is negative, a query is made in step ST704 to see if the time interval measured by the timer is equal to or greater than the unit time interval. When the response in step ST704 is negative, the character drawing apparatus remains in a waiting condition in step ST705. When the response in step ST704 is affirmative, a query is made in step ST706 to see if the flag of the last unit region drawing command is set. When the response in step ST706 is negative, the routine returns to step ST702 to draw the same number of unit regions as the number of unit regions drawn in the preceding cycle in the unit time interval. When the response in step ST706 is affirmative, a query is made in step ST707 to see if the unit region includes the end point or the speed change point. When the speed change point is included in the unit region, the routine returns to step ST701 to read the stroke speed data from the stroke data and sets the same in the memory. Since the stroke speed for the unit regions between the speed change points 333 and 334 is "3", "3" is set in tile memory, so that three unit regions are drawn in the unit time interval in step ST703. When the drawn region includes the end point, the timer is reset and started again in step ST708. Then, ST709 and ST710 are repeated to suspend the drawing operation until the timer measures the preset stroke pause time interval specified in the stroke data. In step ST711, a query is made to see if the last stroke has been completed. When the response in step ST711 is negative, the routine returns to step ST701 to start drawing the next stroke. When the response in step ST711 is affirmative, the routine is ended. Thus, the strokes of the letter J can sequentially be drawn along the stroke lines each in a direction from the starting point to the end point of the stroke line.

Thus, the character drawing apparatus divides stroke patterns into unit regions by a given process arid stores the number of unit regions to be drawn in the unit time interval as tile stroke speed data in the character drawing data storage unit. However, the stroke speed data is not limited thereto, but may be any data representing the size of a region of the character pattern and a time interval required for drawing the region.

Sixth Embodiment

Figure 19:
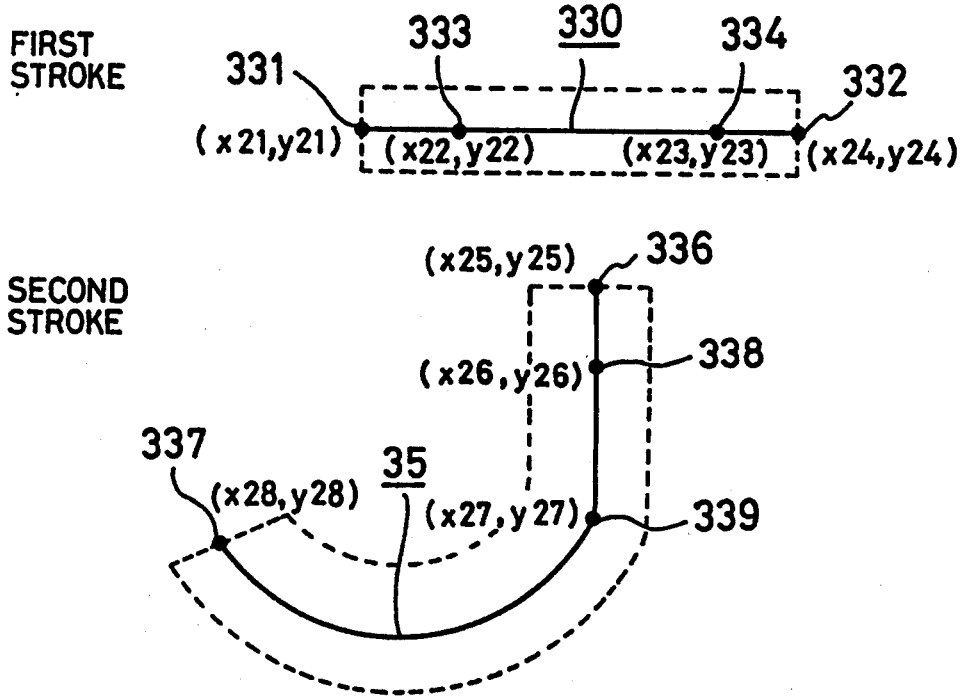
FIGS. 19(A) and 19(B) are views of assistance in explaining exemplary character drawing data employed in a character drawing apparatus in a sixth embodiment according to the present invention.

A character drawing apparatus in a sixth embodiment according to the present invention which uses another type of stroke speed data and a character drawing process to be executed by the same will be described hereinafter. The character drawing apparatus uses stroke data shown in FIGS. 19(A) and 19(B) included in character drawing data, and the pattern data shown in FIGS. 13(A) and 13(B) used by the character drawing apparatus in the fifth embodiment. The stroke data shown in FIGS. 19(A) and 19(B) comprises, for each stroke of a character, the coordinates of the starting point of the stroke line of the stroke, line data of each of a plurality of sections of the stroke line, a dividing number by which each section is divided, representing stroke speed, and a stroke pause time interval, namely, a time interval between the end of drawing a stroke and the start of drawing the next stroke. The dividing number as stroke speed data will be described afterward. As shown in FIG. 19(A), The stroke line 330 of a first stroke has a starting point represented by coordinates (x21, y21) and is divided into three sections by two speed change points 333 and 334. As shown in FIG. 19(B), the stroke data for the first stroke includes line data of each of the sections divided by the speed change points. The line data of each section includes a straight line code indicating a straight line, the coordinates of the end point of the section, and the dividing number for dividing the section. The dividing number representing stroke speed will be described hereinafter. In drawing the pattern of a stroke by the character drawing apparatus, the stroke is divided into a plurality of regions, and each region is drawn in a time interval specified in the stroke speed data. Each region to be drawn at a constant stroke speed is divided further into a plurality of small subregions and the subregions are drawn sequentially along the stroke line in a given time interval. The dividing number corresponds to the number of subregions in the region. The character drawing unit draws each subregion in a unit time interval.

A character drawing process to be executed by the character drawing apparatus in the sixth embodiment is the same as that shown in FIG. 16 executed by the character drawing apparatus in the fifth embodiment, except that the contents of a preparatory pattern drawing process and a pattern drawing process to be executed by the former are different from those executed by the latter. The preparatory pattern drawing process and the pattern drawing process to be executed by the character drawing apparatus in the sixth embodiment will be described hereinafter with reference to FIGS. 20 to 23.

Figure 21:
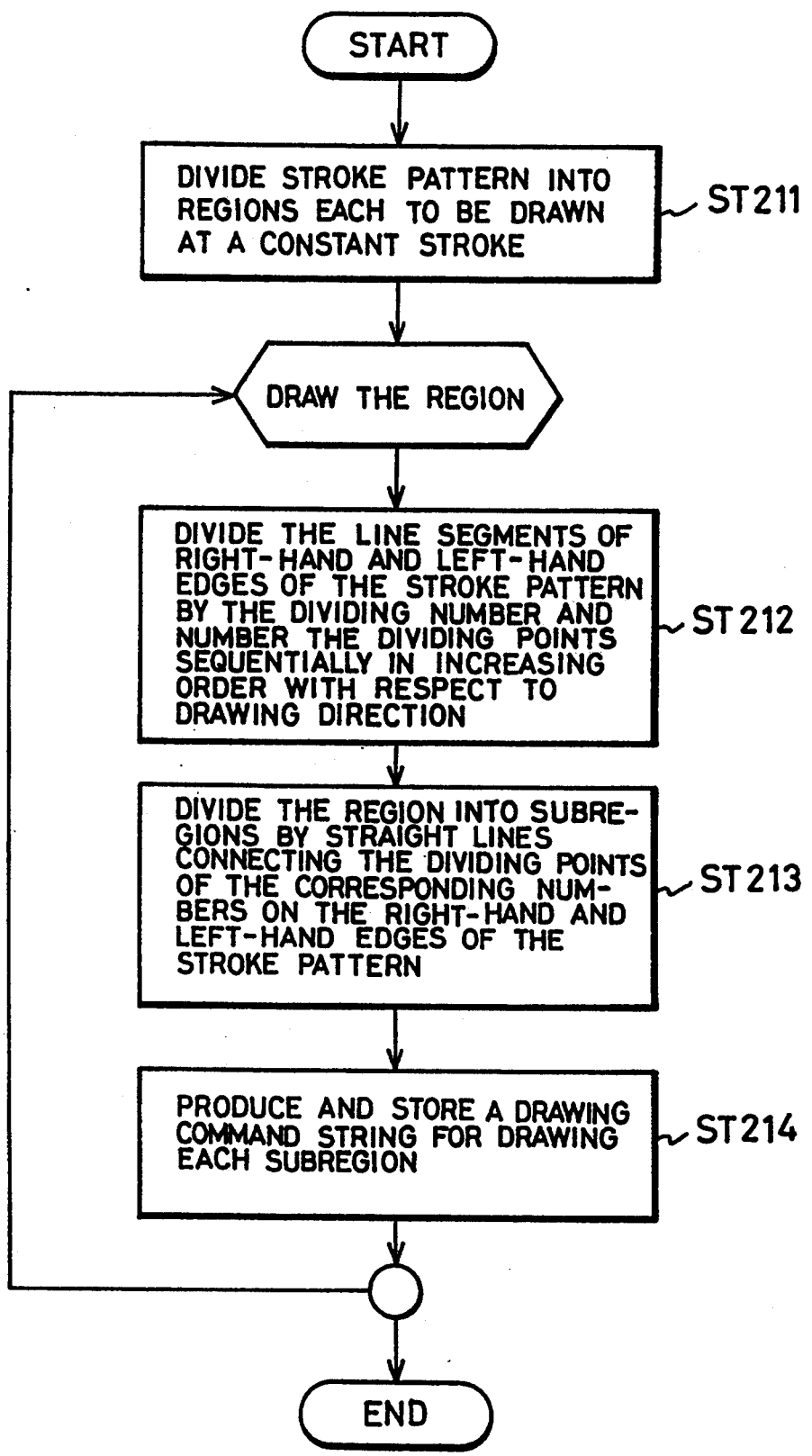
FIG. 21 is a flow chart of a preparatory pattern drawing process.
Figure 22:
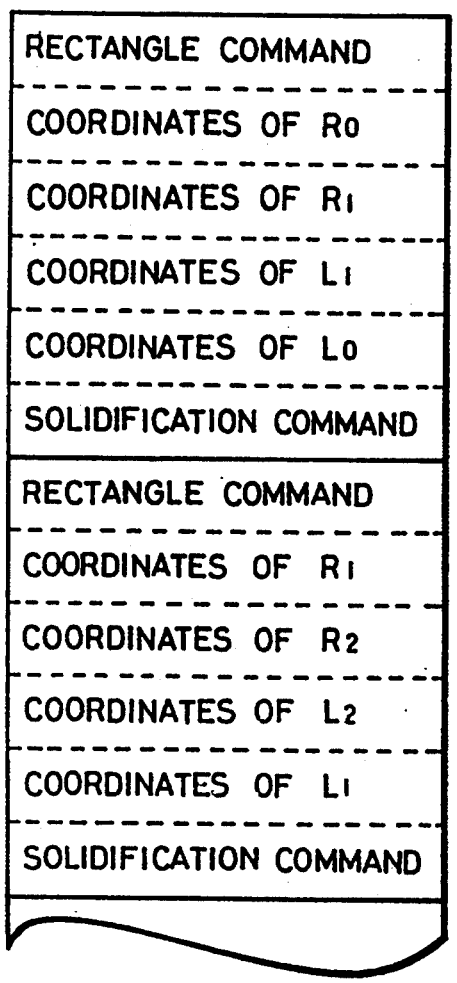
FIG. 22 is a view of assistance in explaining a pattern drawing command.
Figure 22:
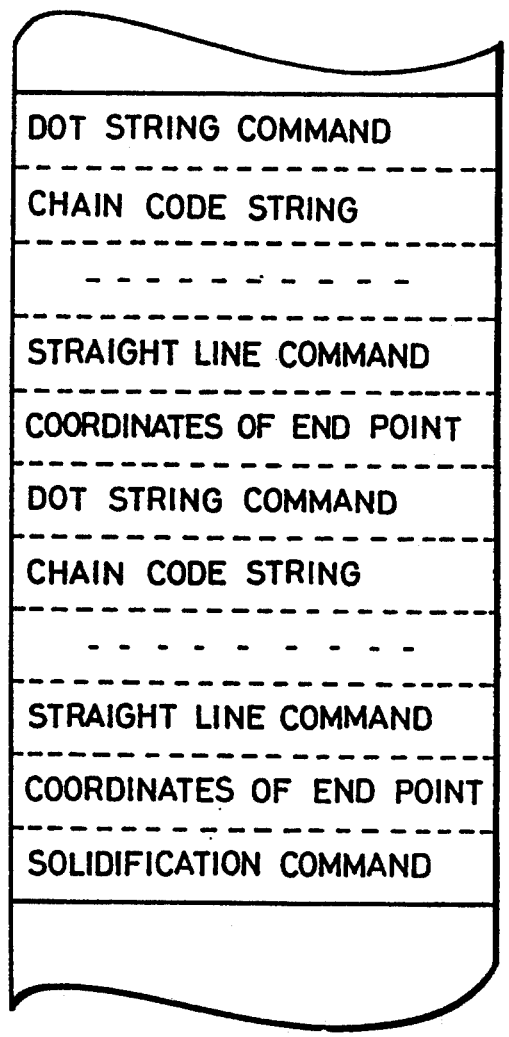

FIGS. 20 and 21 are an illustration of assistance in explaining the preparatory pattern drawing process and a flow chart of the preparatory pattern drawing process, respectively. In the preparatory pattern drawing process, a stroke to be drawn is divided into subregions each to be drawn in a unit time interval, a pattern drawing command for requesting drawing each subregion is produced, and the pattern drawing commands are stored sequentially in order of stroke direction. Referring to FIG. 21, in step ST211, a stroke pattern is divided into regions each to be drawn at a constant stroke speed. Concretely, the stroke line of the first stroke is divided into three sections by the speed change points 333 and 334 as shown in FIG. 19(A). The dividing numbers for the regions respectively including the sections are "10", "10" and "10", respectively, as shown in FIG. 19(B). As shown in FIG. 20, the stroke pattern of the first stroke is divided into three regions by normals 391 and 392 to the stroke line respectively at the speed change points 333 and 334. The process of dividing the stroke pattern by straight lines passing points on the stroke line is the same as that previously described with reference to the fifth embodiment, and hence the detailed description thereof will be omitted. After thus dividing the stroke pattern into the regions, steps ST212, ST213 and ST214 of FIG. 21 are executed to draw each of the regions. In step ST212, the respective line segments of the right-hand edge and left-hand edge of the stroke pattern included in the region are divided by the dividing number. The edge of the stroke pattern extending on the right-hand side of the stroke line with respect to the direction of the stroke line is the right-hand edge, and the edge of the same extending on the left-hand side of the stroke line with respect to the direction of the stroke line is the left-hand edge. As shown in FIG. 20, a normal $R_0L_0$ to the stroke line 330 at the starting point 331 a portion of the outline of the first stroke. The intersection of a normal to the stroke line 330 at the speed change point 333 and the right-hand edge of the stroke is a point $R_{10}$, and the intersection of the same normal and the left-hand edge of the stroke is a point $L_{10}$. Then, a line segment $R_0R_{10}$ of the right-hand edge and a line segment $L_0L_{10}$ of the left-hand edge are included in the region. The line segments $R_0R_{10}$ and $L_0L_{10}$ are divided each into ten equal sections by dividing points. The dividing points are numbered in increasing order with respect to the stroke direction. Referring to FIG. 21, in step ST213, the region is divided into subregions as indicated by dotted lines in FIG. 20 by lines extending across the stroke line respectively between the dividing points on the line segment $R_0R_{10}$ and the corresponding dividing points on the line segment $L_0L_{10}$. In FIG. 20, a hatched region is one of the subregions. In step ST214, a pattern drawing command string for drawing each subregion is produced and the pattern drawing command strings are stored in a working storage in order of succession and in order of stroke direction. FIGS. 22(A) and 22(B) show examples of the pattern drawing command strings. FIG. 22(A) shows part of the pattern drawing command strings for the first stroke. The pattern drawing command string for the hatched subregion 390 of the first stroke (FIG. 20) comprises a rectangle command indicating that the subregion 390 is rectangular, coordinates of the four points $R_0$, $R_1$, and $L_1$ defining the rectangular subregion 390, and a solidification command requesting the solidification of the rectangular subregion 390. FIG. 22(B) shows a pattern drawing command string for drawing a subregion 391 of the second stroke shown in FIG. 20 having curved edges. When the outline is curved, the length of the line segment is represented by the number of chain codes of a chain code string representing the curved, and the number of chain codes is divided by the dividing number. The subregion 391 is defined by curves $R_nR_{n+1}$, $L_nL_{n+1}$ and straight lines $R_nL_n$ and $R_{n+1}L_{n+1}$. In FIG. 22(B) the curved portion is represented by point sequence command indicating that the curved portion is represented by a chain code string, and subsequent chain code strings. The subregion 391 is defined by a point sequence and chain code strings representing the curved line segment $R_nR_{n+1}$, a straight line command representing the straight line $R_nL_n$, the coordinates of the end point of the straight line $R_nL_n$, a point sequence command and chain code strings representing the curved line segment $L_nL_{n+1}$, a straight line command representing the straight line $R_{n+1}L_{n+1}$, the coordinates of the end point of the straight line $R_{n+1}L_{n+1}$, and a solidification command requesting solidifying the region enclosed by those four lines.

Figure 23:
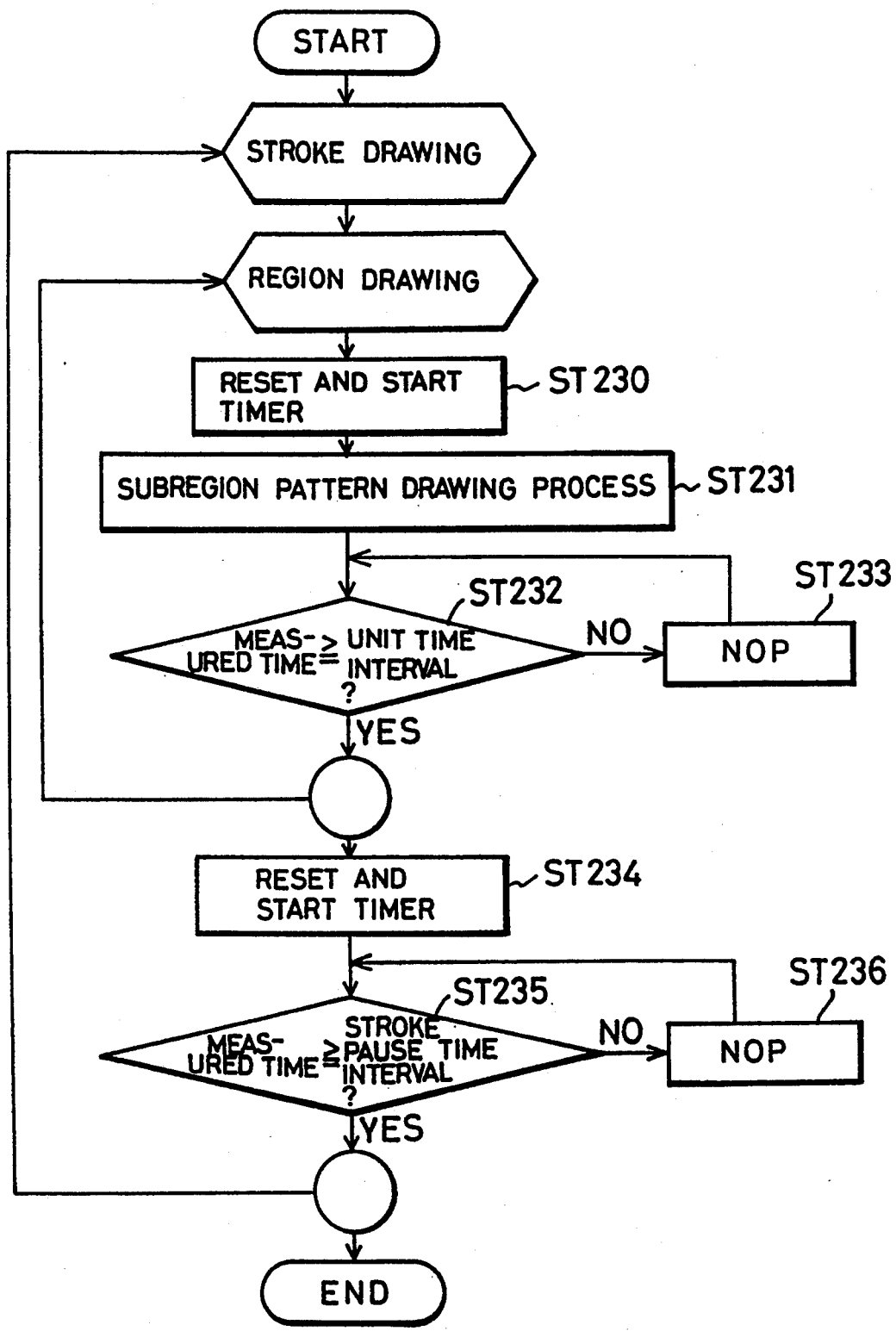
FIG. 23 is a flow chart of a pattern drawing process.

A pattern drawing process to be executed by the character drawing apparatus will be described hereinafter with reference to FIG. 23. In the pattern drawing process, the stroke patterns of a character are drawn according to the order of stroke represented by stroke data. Pattern drawing commands for drawing each subregion stored in order of succession with respect to the stroke direction are executed sequentially to draw each stroke. In step ST230, the timer for measuring a unit time is reset and started. In step ST231, a pattern drawing command for drawing one subregion is executed to load the subregion into the image memory. Steps ST232 and ST233 are repeated until a time interval measured by the timer coincides with the unit time. Upon the coincidence of the time interval measured by the timer with the unit time, the routine returns to step ST230 to start operation for drawing the next subregion. Steps ST230 to ST233 are repeated until all the subregion of the stroke are drawn. Upon the completion of drawing all the subregions of the stroke, the timer for measuring a stroke pause time interval is reset and started in step ST234. Steps ST235 and St236 are repeated until the time interval measured by the timer coincides with a predetermined stroke pause time interval. Upon the coincidence of the time interval measured by the timer with the stroke pause time interval, operation for drawing the next stroke is started. These steps are repeated until all the strokes are drawn.

Thus, the character drawing apparatus divides stroke patterns of a character into a plurality of subregions and sequentially draws the subregions according to the order of succession included in stroke data included in the character drawing data at a predetermined drawing speed included in the stroke speed data. Accordingly, the drawing speed can be controlled so that the starting region, end region and stroke region of each stroke of the character are drawn at different drawing speeds and the drawing operation are suspended for a stroke pause time interval between the completion of drawing a stroke and the start of drawing the next stroke. Thus, the drawing operation can be carried out in a mode similar to that of handwriting in drawing speed as well as in order of stroke and in the direction of stroke by varying the drawing speed in drawing a character, which relieves a person observing the drawing process from mental load. The application of the character drawing apparatus to an educational purpose in which stroking method is important, the character drawing apparatus enables the display of characters in a manner similar to that of handwriting on a board. The application of the character drawing apparatus to other information systems gives a satisfactory effect of display.

The character drawing apparatus in the foregoing embodiment execute the preparatory pattern drawing process to produce the pattern drawing command strings, on the basis of the pattern data and stroke data included in the character drawing data, for sequentially drawing the unit regions or the subregions in the unit time interval, store the pattern drawing command strings temporarily in the working memory, and then executes the pattern drawing command sequentially to draw the pattern. However, in drawing a character string including a plurality of characters, the preparatory character drawing process may be executed for all the characters to store pattern drawing command strings and time data including the unit time interval and the stroke pause time intervals for all the characters in a storage or a memory, and then the pattern drawing process may be executed to draw all the characters successively.

Although the character drawing apparatus uses vector data expressing the outline of a stroke by a plurality of vectors as the pattern data stored in the character drawing data storage unit, the pattern data is not limited thereto, but may be data which can transfer the outline of each stroke of a character in the working memory. For example, the pattern data may be the dot pattern of a stroke or chain code strings representing the outline of the dot pattern of a stroke.

The character drawing apparatus in the fifth and sixth embodiments store the vector pattern data temporarily in the working memory in the preparatory pattern drawing process, and then produce pattern drawing commands for subregions of a stroke pattern by dividing the stroke pattern into the subregions. However, the stroke pattern need not be stored in the working memory if the pattern drawing commands for drawing the outline of the subregion or the subregion can directly be obtained from the character drawing data. For example, the outline of a region to be drawing in the unit time, such as the unit region used in the fifth embodiment or the subregion used in the sixth embodiment, can directly be determined by calculation using expressions representing straight lines and curves of the outline of each stroke.

The display 5 is not limited to a CRT display, but may be any kind of display, such as a plotter, a storage tube display or a liquid crystal display, provided that the display is capable of displaying two-dimensional patterns, such as characters. Similarly, the image memory 4 is not limited to a two-dimensional array memory, such as a frame buffer, but may be any kind of memory capable of temporarily storing sufficient information for display in two-dimensional display.

Seventh Embodiment

Figure 24:
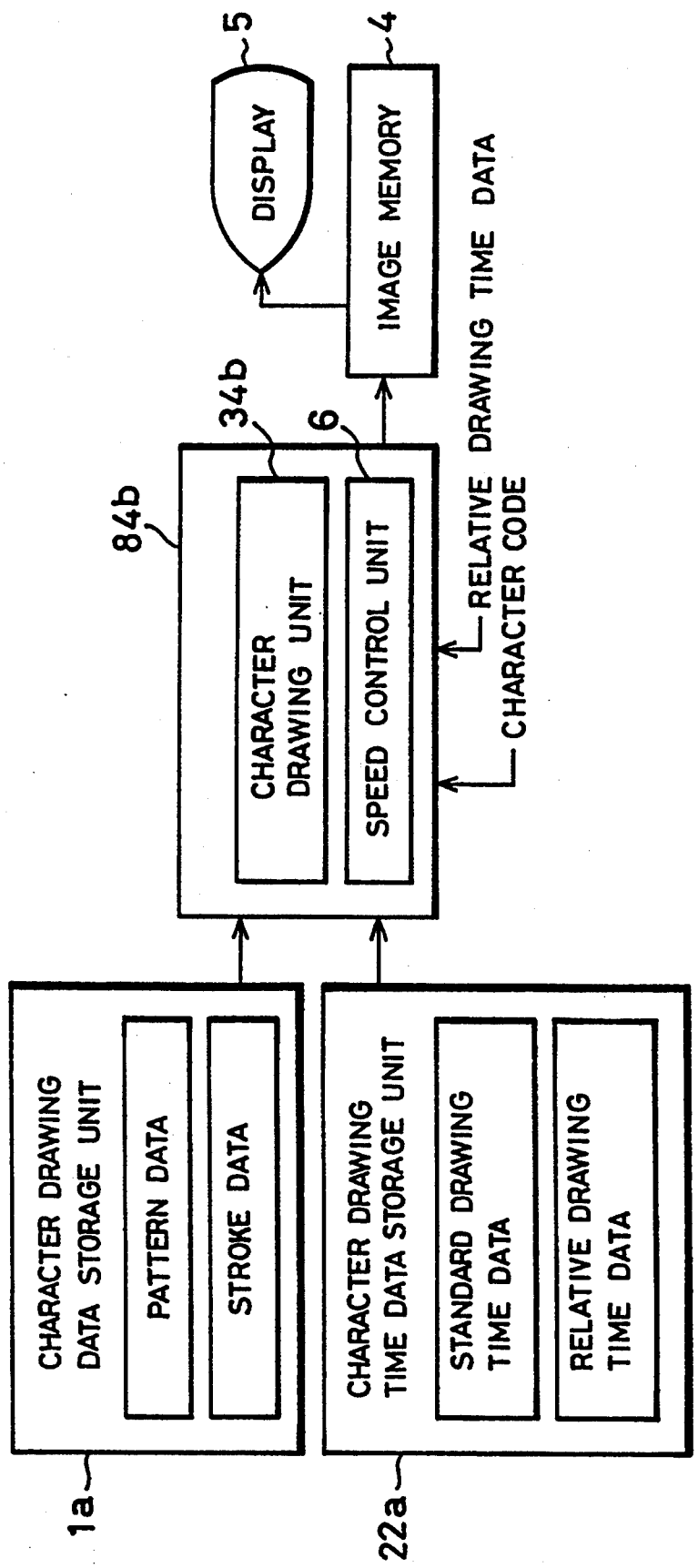
FIG. 24 is a block diagram of a character drawing apparatus in a seventh embodiment according to the present invention.

FIG. 24 shows a character drawing apparatus in a seventh embodiment according to the present invention. This character drawing apparatus uses character drawing data including stroke data representing stroke order indicating the order of displaying the strokes of characters and stroke lines each defined for each stroke, pattern data representing patterns of characters, standard drawing time data representing a standard drawing time interval for drawing strokes of characters, and relative drawing time data.

FIGS. 25(A), 25(B), 25(C) and 25(D) show the pattern data and the stroke data included in the character drawing data which are used by the character drawing apparatus. Tables containing the pattern data and the stroke data shown in FIGS. 25(A) and 25(B) are stored in a character drawing data storage unit 1c. The pattern data represents the pattern of each stroke of a character. The outline of the pattern of each stroke is described by vector data. The stroke data represents the order of succession of strokes and the stroke direction of each stroke. The stroke direction of each stroke is described by the stroke line of each stroke and coordinates of the starting point and end point of the stroke line. The stroke line is represented by a chain code string, which is described in the previously cited reference: "Digital Signal Processing", Kindai Kagaku-sha, pp. 2–5. The character drawing apparatus draws a character by using the pattern data and the stroke data in the same stroke order and the same strokes as those of handwriting by a pattern drawing process.

Figures 25, 26:
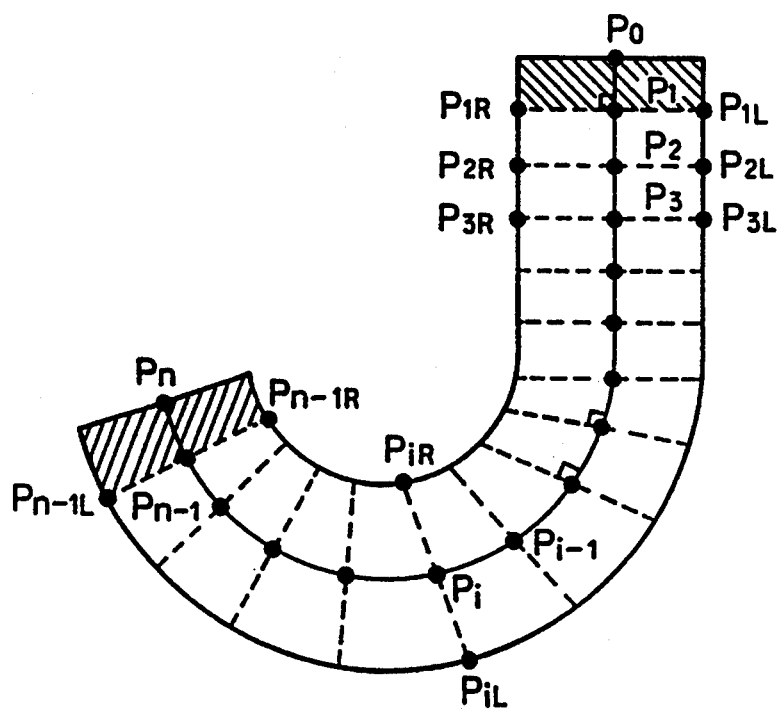
FIG. 26 is a view of assistance in explaining a pattern drawing process to be executed by the character drawing apparatus of FIG. 24.

The pattern drawing process will be explained with reference to FIG. 26 as applied to drawing a second stroke of the letter J. The pattern of the stroke is described according to the pattern data in a working memory. Then, the stroke line of the stroke is divided by a plurality of dividing points, and then divides the stroke into subregions by normals to the stroke line at the dividing points. The solidified subregions are loaded sequentially into an image memory 4 in order of succession with respect to the stroke direction.

The number of subregions of each component stroke of a character is determined beforehand and is specified in the stroke data. For example, the coordinates of the dividing points are specified, or only the dividing number is specified and the dividing point are determined so that the stroke line of the stroke is divided equally into a number of sections corresponding to the dividing number. In this embodiment, the intervals between the dividing points are set to a distance l and the stroke line is divided at regular intervals of l from the starting point to the end point in the character drawing process. The dividing number n is expressed by: $n=L/l$ (the decimal part is raised), where L is the length of the stroke line.

The standard drawing time data and the relative drawing time data stored in the character drawing data storage unit 1c (FIG. 24) will be described hereinafter. As stated above, the character drawing process divides the pattern of each stroke of a character into a plurality of subregions and draws the subregions sequentially along the stroke line. The dividing number n is expressed as a function of the intervals of l between the dividing points and the length L of the stroke line.

$$n=L/l$$

A time interval required for drawing the stroke without time regulation in drawing the character is dependent on the time interval required for drawing each subregion. Thus, the time interval required for drawing the stroke corresponds to the total sum of time intervals required respectively for drawing the subregions. The character drawing apparatus uses a preset unit drawing time interval, namely, a time interval required for drawing one subregion. Therefore, the time interval required for drawing the stroke of a character is determined by multiplying the unit drawing time interval by the dividing number. The standard drawing time interval is a time interval required for drawing a character when the strokes are divided into subregions at regular intervals specified in the stroke data and each subregion is drawn in the unit drawing time interval. The relative drawing time interval is the ratio of a drawing time interval required or drawing a character to the standard drawing time interval included in the character drawing data stored in the character drawing data storage unit 1c. The relative drawing time interval can be set for character drawing operation as occasion calls.

As stated above, since the drawing time interval required for drawing a character is dependent on the product of the unit drawing time interval and the dividing number, the time interval required for drawing the character can be changed by changing the unit drawing time; that is, when a relative drawing time data a is entered, a time interval obtained by multiplying the unit drawing time interval by a may be used as a new unit drawing time interval.

Another drawing time control method uses a predetermined unit drawing time interval and changes the dividing number for dividing the strokes of a character. This drawing time control method will be described hereinafter with reference to FIGS. 27, 28 and 29.

Figure 27:
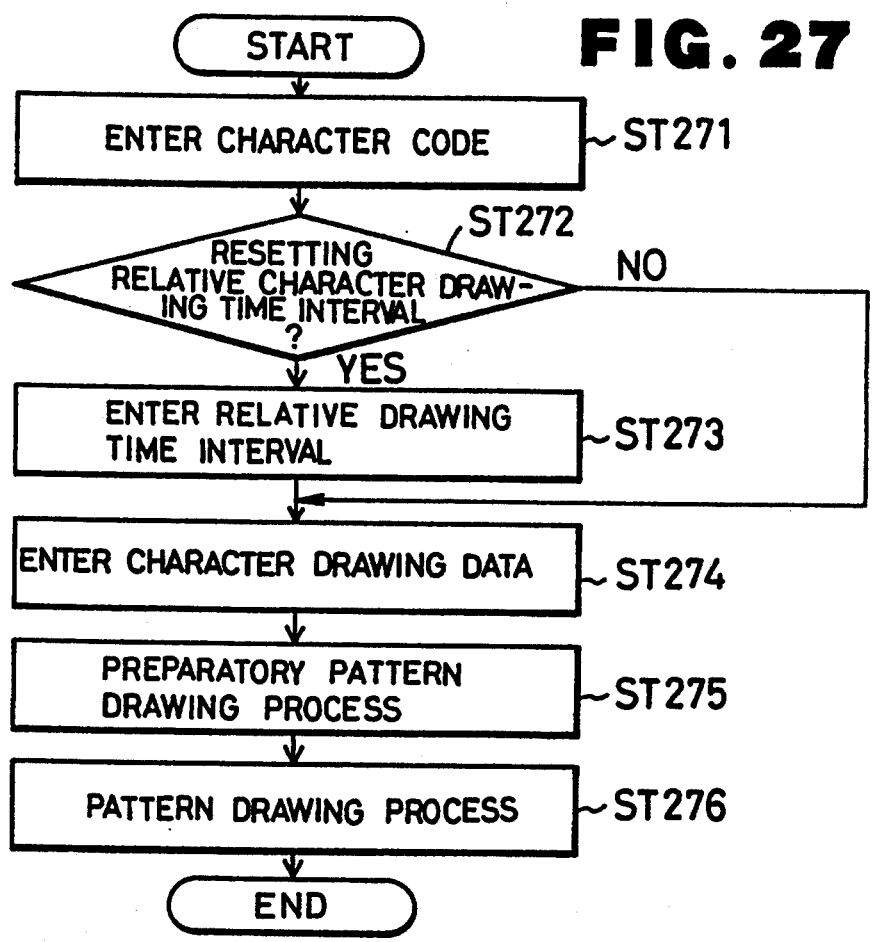
FIG. 27 is a flow chart of a character drawing process to be executed by the character drawing apparatus of FIG. 24.

Referring to FIG. 27 showing the main routine of the character drawing process, a character code representing a character to be drawn is entered in step ST271. In step ST272, the standard drawing time interval is examined to determine whether or not the relative drawing time interval needs to be reset. When the relative drawing time interval needs to be reset, a desired relative drawing time interval is entered by means of an input device to reset relative drawing time data stored in a drawing time data storage unit 22a in step ST273. Then, character drawing data is entered in step ST274, a drawing command string is produced in step ST275 to draw the character according to predetermined stroke data, and the character is drawn in step ST276 in a drawing time interval determined by using the relative drawing time interval.

A preparatory pattern drawing process to be executed in step ST275 of FIG. 27 will be described hereinafter with reference to FIG. 28. In step ST280, the pattern of a stroke to be drawn is developed in a working memory according to pattern data included in the character drawing data. In step ST281, the interval between the dividing points is reset according to the relative drawing time data. Thus, in this character drawing process, the time interval required for drawing the character is the product of the unit drawing time interval and the number of subregions in the component strokes of the character. The number of subregions is dependent on the interval between the dividing points. The character can be drawn in the standard drawing time interval when the component strokes of the character are divided into subregions at regular intervals of l specified beforehand in the stroke data, Suppose that the dividing number is n when the stroke is divided at the predetermined intervals of l, and the relative drawing time interval specified in the relative drawing time data is a. Then, the following expression must be satisfied.

$$n_1 = a \cdot n$$

where $n_1$ is the dividing number for each component stroke of the character. As stated above, the dividing number is the quotient of division of the length of the stroke line by the interval between the dividing points. Since the length of the stroke line is fixed, an interval 1/a times the predetermined interval may be set to multiply the dividing number by a.

Then, in step ST281, each stroke pattern of the character is divided at intervals of the reset value set in step ST281 into subregions, and then pattern drawing command string for sequentially drawing solidified subregions along the stroke direction is produced in step ST283.

The solidified patterns of the subregions are loaded sequentially into the image memory 4 in a controlled time interval according to the pattern drawing command string in step ST276 of FIG. 27. Referring to FIG. 29 showing a pattern drawing process to be executed in step ST276 of FIG. 27, a timer for measuring the drawing time interval is reset and started in step ST51. In step ST290, a subregion is drawn, and then a query is made in step ST53 to see if the time measured by the timer is equal to or greater than the unit drawing time interval. When the response in step ST53 is negative, steps ST54 and ST53 are repeated. When the response in step ST53 is affirmative, a query is made in step ST291 to see if all the subregions have been drawn. Steps ST51 to ST291 are repeated until all the subregions are drawn.

Thus, the character drawing apparatus draws characters in the same stroke order and the same stroke direction as those of handwriting by using the character drawing data including the pattern data and the stroke data, and the drawing time interval data including the standard drawing time data and the relative drawing time data. The possibility of the selective change of the relative drawing time data enables the simple change of a drawing time interval required for drawing characters.

The character drawing apparatus makes reference to the standard drawing time data in resetting the relative drawing time data. Since the standard drawing time data is dependent on the pattern data and stroke data of the character drawing data, and the ability of the character drawing unit 34b, and hence the standard drawing time data need not be stored in the drawing time data storage unit 22a if reference need not be made to the standard drawing time data in resetting the relative drawing time data.

Eighth Embodiment

A character drawing apparatus in an eighth embodiment according to the present invention will be described hereinafter with reference to FIGS. 14(A), 14(B), 14(C), 15, 31(A), 31(B) and 31(C).

Figure 30:
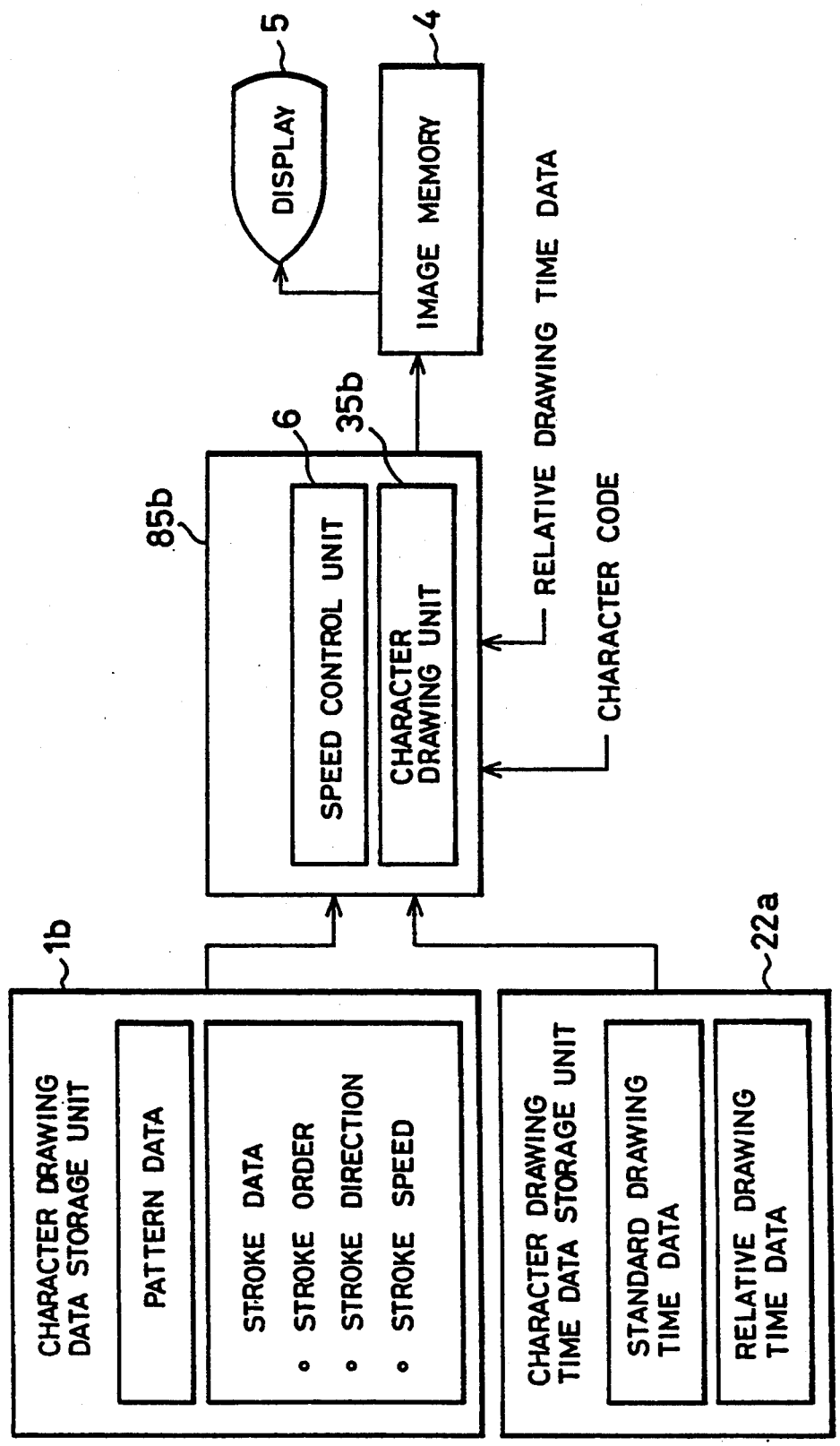
FIG. 30 is a block diagram of a character drawing apparatus in an eighth embodiment according to the present invention.

The character drawing apparatus in the eighth embodiment shown in FIG. 30 is of a character drawing system capable of varying stroke speed depending on the portion of the character. The character drawing apparatus is able to change the drawing time interval required for drawing a character without varying stroke tempo by using relative drawing time data.

The character drawing apparatus uses character drawing data including the pattern data, the stroke data and the relative drawing time data shown in FIGS. 14(A), 14(B) and 14(C). The stroke data represents stroke order, stroke direction, and stroke speed for controlling time intervals required for drawing portions of a character. The pattern data and the relative drawing time data are the same as those used by the character drawing apparatus in the seventh embodiment. The character drawing system which varies the stroke speed depending on the portion of a character will be described briefly with reference to FIGS. 14(A) to 14(C), 15 and 31(A) to 31(C).

Referring to FIGS. 14(A) to 14(C), a first stroke and a second stroke are drawn in that order. The stroke direction is determined for each stroke and includes a stroke starting point, a stroke end point and a stroke direction specifying a stroke line connecting the starting point and the end point. Stroke speed is used as information for controlling a time interval required for sequentially drawing a plurality of successive regions of a stroke along the stroke line and a stroke pause time interval between the end of drawing a stroke and the start of drawing the next stroke. The stroke line 330 of the first stroke is divided by dividing points 333 and 334 into three sections, and the stroke line 335 of the second stroke is divided by dividing points 338 and 339 into three sections. A stroke speed is assigned to each section of the stroke lines 330 and 335. The stroke speed is represented by the number of unit regions of the stroke to be drawn in a unit drawing time interval. The stroke pause time interval is specified in the stroke data for the stroke and is represented by the number of unit drawing time intervals.

Figure 31:
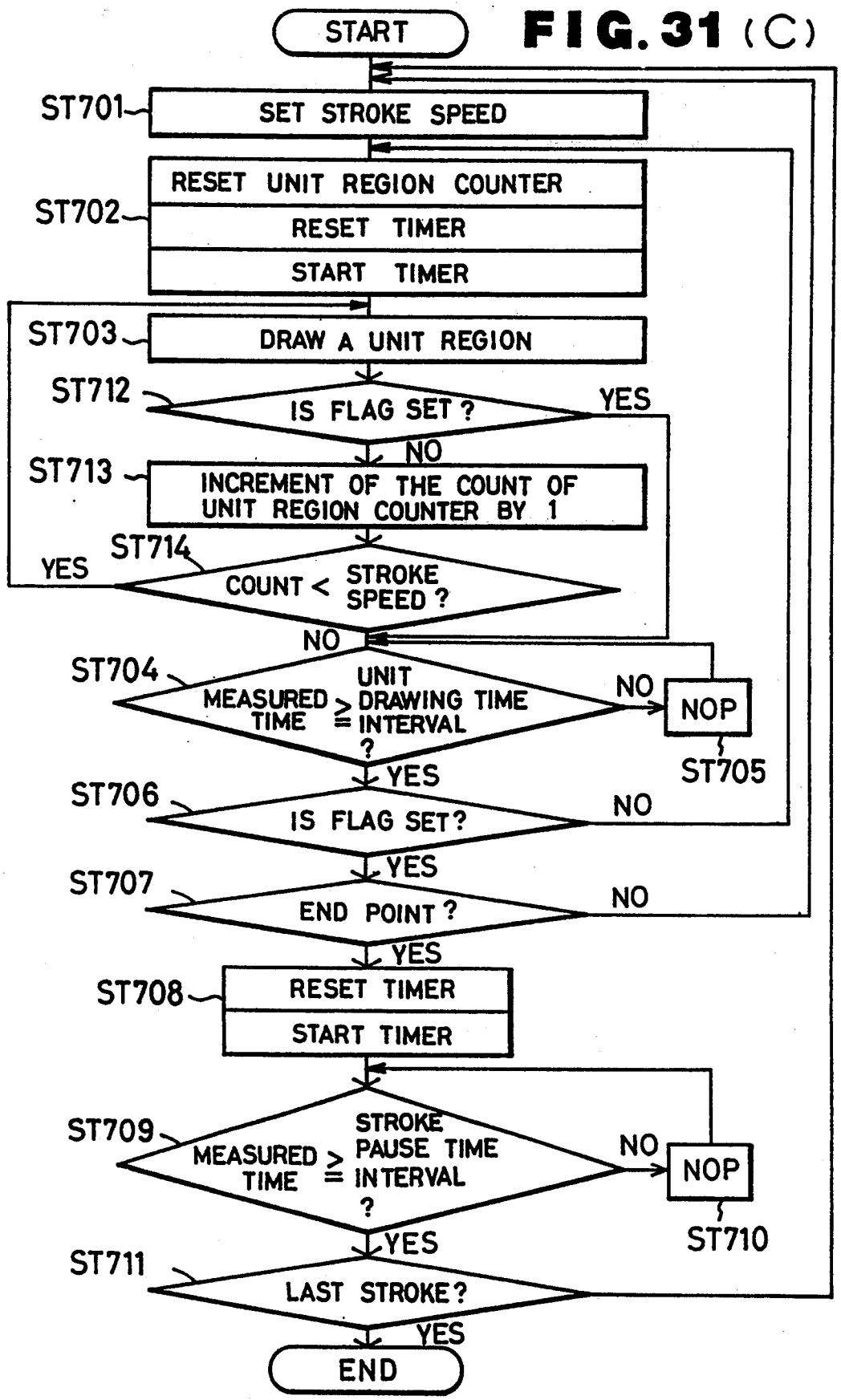
FIGS. 31(A), 31(B) and 31(C) are flow charts of character drawing process to be executed by the character drawing apparatus of FIG. 30.

Referring to FIG. 31(A) showing the main routine off a character drawing process to be carried out by the character drawing apparatus, a character code representing a character to be drawn is entered in step ST310, and then relative drawing speed data is entered. The relative drawing speed data specifies the ratio of a drawing time interval required for drawing a character to a drawing time interval required for drawing the same character only according to the pattern data and the stroke data. In step ST311, character drawing data for the character represented by the input character code is entered. In step ST312, a pattern drawing command string for drawing the character according to the stroke data is produced. A preparatory pattern drawing process to be carried out in step ST312 of FIG. 31(A) will be described hereinafter with reference to FIG. 31(B). As shown in FIG. 15, the stroke line is divided by dividing points at regular intervals of a given value into a plurality of sections, and the stroke pattern is divided in step ST171 by normals to the stroke line at the dividing points into a plurality of unit regions. In step ST172, a pattern drawing commands requesting sequentially solidifying the unit regions to draw the stroke pattern are produced and are stored sequentially. After thus completing the preparatory pattern drawing process, step ST313 of FIG. 31(A) for the pattern drawing process is executed. FIG. 31(C) shows the pattern drawing process to be carried out in step ST313 of FIG. 31(A). Since the pattern drawing process shown in FIG. 31(C) is the same as that shown in FIG. 18, and hence the description thereof will be omitted.

In drawing the character, the pattern drawing commands of the pattern drawing command string produced by the preparatory pattern drawing process respectively for drawing the unit regions are read sequentially, and a number of unit regions specified by the stroke speed are loaded in a unit drawing time interval into an image memory 4. After the completion of drawing the stroke, the character drawing operation is suspended for the stroke pause time interval included in the stroke data before starting drawing the next stroke.

The stroke speed is controlled on the basis of the unit drawing time interval. The drawing speed is represented by the number of unit regions to be drawn in the unit drawing time interval, and the stroke pause time interval is represented by the ratio of a time interval for which the drawing operation is suspended to the unit drawing time interval. Accordingly, the drawing time interval required for drawing the character can be changed by changing the unit drawing time interval. Suppose that the relative drawing time interval is a. Then, the character can be drawn in a drawing time interval obtained by multiplying a standard drawing time interval by the relative drawing time interval a without varying stroke tempo.

Another drawing time control method changes the dividing number for dividing the strokes of a character without changing the unit drawing time interval and other drawing time control method changes the number of unit regions to be drawn in the unit drawing time interval. These drawing time control methods will be described hereinafter.

A character drawing time interval required for drawing a character is the total sum of time intervals required for drawing the component regions of the character and the stroke pause time intervals. Accordingly, the drawing time interval required for drawing the character can be multiplied by the relative drawing time interval, for example, X by multiplying the time interval required for drawing each component region of the character and the stroke pause time intervals by X.

Therefore, to reset the stroke pause time intervals, the stroke pause time intervals included in the stroke data are multiplied by a value included in the relative drawing time data.

Process of controlling the drawing time interval required for drawing each region of the character will be described hereinafter. A drawing time interval required for drawing each region is dependent on the number of unit regions included in the region and a drawing speed for drawing the region. The region in the first stroke between the starting point 331 and the speed change point 333 shown in FIG. 14(A) is drawn at a stroke speed "1", and the region is divided into six unit regions as shown in FIG. 15, and hence the region is drawn in six unit drawing time intervals. The region in the first stroke between the speed change points 333 and 334 shown in FIG. 14(A) is drawn at a stroke speed "3" and the region is divided into thirty unit regions, and hence the region is drawn in ten unit drawing time intervals.

The drawing time interval required for drawing each region can be increased by a factor X by increasing the number of the unit regions in the region by the factor X. Thus, the preparatory pattern drawing process of this character drawing system divides the stroke line at regular intervals of a predetermined value and divides the stroke pattern by normals to the stroke line at the dividing points. Therefore, the drawing time interval required for drawing the region can be increased by the factor X by increasing the interval between the dividing points by a factor 1/X.

The drawing time interval required for drawing the region may be increased by the factor X by increasing the stroke speed by the factor 1/X. For example, the stroke speed "3" for the region between the speed change points 333 and 334 shown in FIG. 14(A) may be changed for a stroke speed of 3/X. A stroke speed obtained by increasing a stroke speed by a factor 1/X is not necessarily an integral number. Since it is only possible to draw an integral number of unit regions in a unit drawing time interval, a number representing the stroke speed is added to the count of a counter for counting the number representing the stroke speed every time the unit drawing time interval elapses and a number of unit regions corresponding to a variation in the integral part of the count are drawn when the integral part of the count changes. When the unit regions are drawn by such a method, the number of unit regions drawn in a unit drawing time intervals varies, but the average number of unit regions drawn in one unit drawing time interval is a number corresponding to (stroke speed)/X in drawing the region.

The character drawing apparatus in the seventh and eighth embodiments use the character drawing data of a system different from that of a dot system for controlling character drawing process and set the drawing time data by giving external input data, similarly to the character code, to the character drawing unit. However, the drawing time interval can automatically be changed according to a rule for controlling the drawing time interval, represented by data contained in a table stored in the character drawing data storage unit, in the same manner as that employed by the character drawing apparatus in the sixth embodiment.

Ninth Embodiment

A character drawing apparatus in a ninth embodiment according to the present invention will be described hereinafter. Referring to FIG. 32, the character drawing apparatus comprises a character drawing data storage unit 1a storing the pattern data of each character of a character string, a drawing time data storage unit 2a storing character pause time data including a character pause time interval, namely, a time interval between the end of drawing a character and the start of drawing the next character, a character drawing unit 3a, an image memory 4, a display 5 for displaying the contents of the image memory 4, and a character pause time interval control unit 7. The character drawing unit 3a and the character pause time interval control unit 7 constitute a drawing operation control unit 8c.

Figure 33:
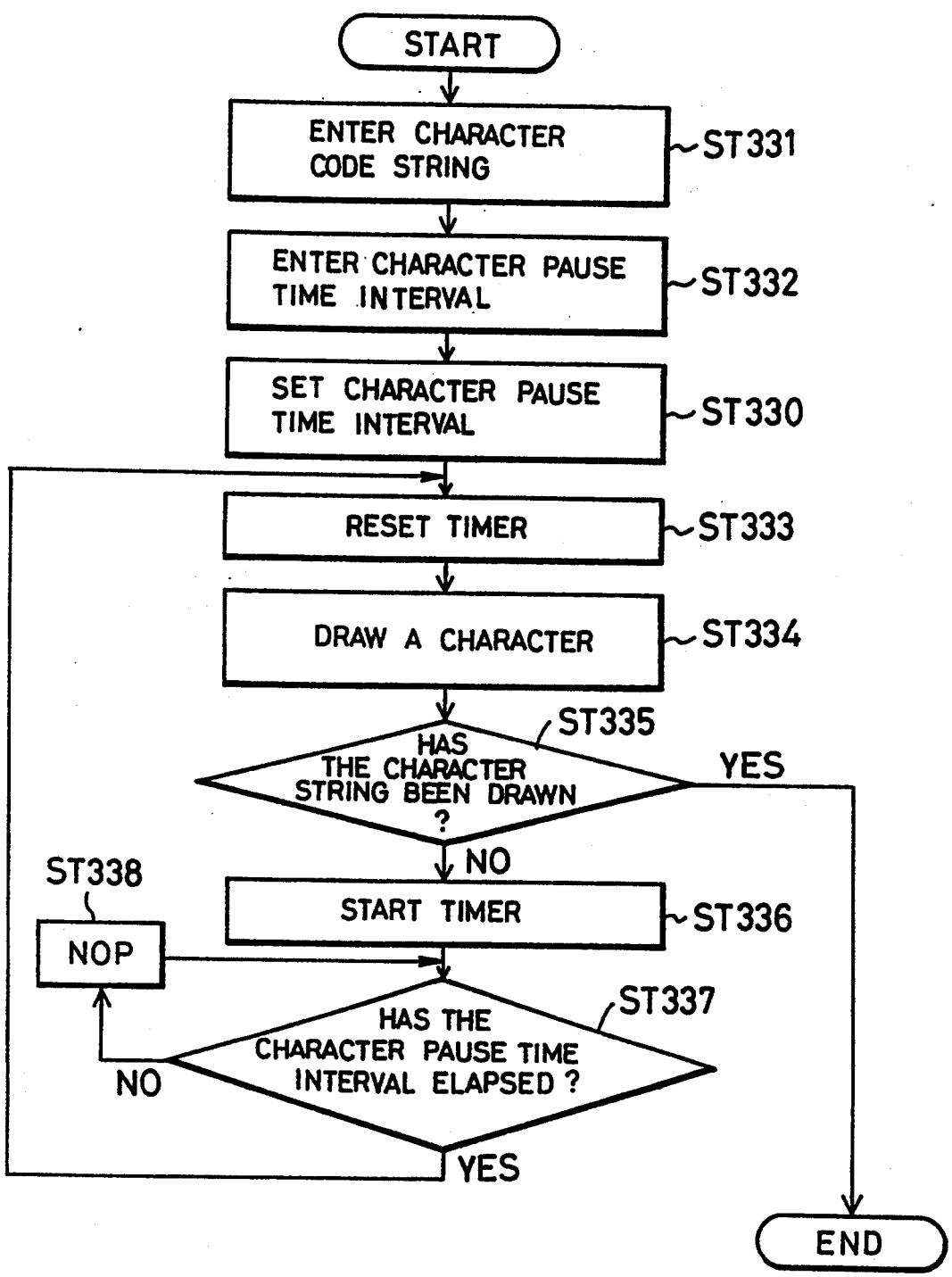
FIG. 33 is a flow chart of a character string drawing process to be executed by the character drawing apparatus of FIG. 32.

The operation of the character drawing apparatus will be described hereinafter with reference to FIG. 33. In steps ST331 and ST332, a character code string representing a character string to be drawn, and a character pause time interval for which the character drawing operation is suspended in drawing the character string are entered. An example of a character code string is shown in FIG. 34, in which a code "9999" indicates the end of the corresponding character string. In this embodiment, the characters of the character string are represented by the Chinese letter codes specified in JIS (the Japanese Industrial Standards) and are entered in order of display. In step ST332, a character pause time interval of t seconds, namely, a time interval between the end of drawing a character and the start of drawing the next character, is stored in the drawing time data storage unit 2b. The character code string and the character pause time interval may be entered into the character drawing unit 3a at any time by the human operator by means of an input device, such as a keyboard, the character drawing unit 3a may read out the data automatically from a data file or the data may be supplied from an application program.

In step ST330, the character pause time interval control unit 7 reads the character pause time interval from the drawing time data storage unit 2b and sends same to the drawing operation control unit 8c. In step ST53, a timer for measuring the character pause time interval is reset. In step ST334, the character drawing unit 3a executes a character drawing process for the first character of the character string represented by the character code string.

In the character drawing process, pattern data corresponding to the character to be drawn is read out from the character drawing data storage unit 1a and the character is loaded into the image memory 4 in a dot pattern according to the pattern data. This character drawing apparatus uses dot pattern data as the character drawing data. FIG. 35 shows the letter J in a dot pattern and FIG. 36 shows an example of pattern data representing the letter J. The dot pattern data expresses directly the dots forming the letter as shown in FIG. 35. In the 16×16 dot matrix expressing the letter J as shown in FIG. 35, the dots representing the letter are denoted by "1" and the rest by "0". The pattern data shown in FIG. 36 represents the binary pattern of the letter J by hexadecimal notation. The character drawing unit 3a reads out the pattern data corresponding to the character to be drawn from the character drawing data storage unit 1a and loads the same into the image memory 4.

Referring again to FIG. 33, in step ST334, the character is drawn. In step ST335, the character drawing unit 3a makes a query to see if all the characters of the character string have been drawn. When the response in step ST335 is negative, the character pause time interval control unit 7 starts a timer for measuring the character pause time interval in step ST336, and then steps ST337 and ST338 are repeated until the character pause time interval elapses. Upon the elapse of the character pause time interval of t seconds, step ST333 is executed to start drawing the next character. Steps ST333 to ST338 are repeated until all the characters of the character string indicated by the character code string are drawn.

This character drawing process uses only one character pause time interval in drawing a character string, but the character drawing operation may be suspended for different character pause time intervals after different characters, respectively.

Tenth Embodiment

A character drawing apparatus in a tenth embodiment according to the present invention is capable of setting character pause time intervals for different characters of a character string. The character drawing apparatus will be described with reference to FIGS. 37 and 38.

FIG. 37 shows an input character code string and an input character pause time interval string, in which a code "9999" indicates the end of the character string. As shown in FIG. 37, the number of different character pause time intervals is smaller than the number of the characters by one and the character pause time intervals are arranged in order of drawing. Referring to FIG. 37, the character drawing process is suspended for 2 seconds after a character indicated by a character code "3B30" (JIS) has been drawn, a character indicated by a character code "4929" is drawn, the character drawing process is suspended for 2 seconds, a character indicated by a character code "4545" is drawn, the character drawing process is suspended for 1 second, and then a character indicated by a character code "3521" is drawn.

Figure 38:
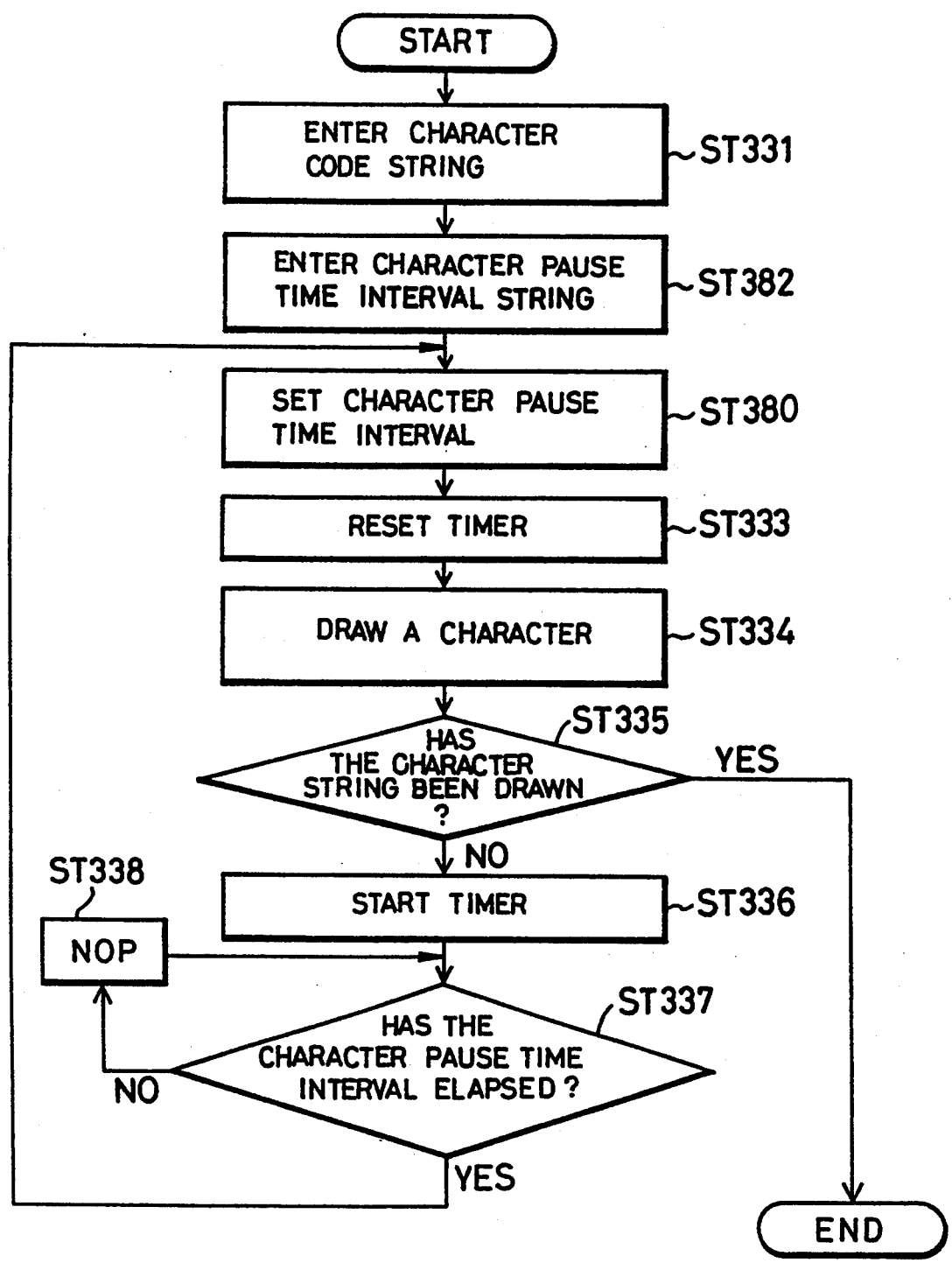
FIG. 38 is a flow chart of a character string drawing process to be executed by the character drawing apparatus in the tenth embodiment according to the present invention.

Referring to FIG. 38 showing the character drawing process to be carried out in the manner as described with reference to FIG. 37, the character code string is entered in step ST331 and the character pause time interval string is entered in step ST382. In step ST380, the first character pause time interval is set, and then the timer is reset in step ST333. Subsequently, the first character is drawn in step ST334. In step ST335, a query is made to see if all the characters of the character string have been drawn. When the response in step ST335 is negative, the timer is started in step ST336, and then steps ST337 and ST338 are executed to suspend the character drawing process until the character pause time interval set in step ST380 elapses. Upon the elapse of the character pause time interval, the routine returns to step St380 to set the next character pause time interval for the next character. Thus, steps ST380 to St338 are repeated until all the characters of the character string are drawn.

In the ninth and tenth embodiments, one character pause time interval or a character pause time interval string is entered for one character string, and the character drawing process is suspended accordingly. However, the character pause time interval or the character pause time interval string need not necessarily be entered; a standard character pause time interval stored beforehand in the drawing time data storage unit 2b may be used and a different character pause time interval or a character pause time interval string including different character pause time intervals may be entered only when necessary. The character pause time interval need not necessarily be an actual time interval expressed in seconds, but may be represented by the number of clock cycles of a clock signal generated by the microprocessor of the character drawing unit 3a. It is also possible to store a standard character pause time interval beforehand in the drawing time data storage unit 2b and to set a desired character pause time interval by multiplying the standard character pause time interval by a factor entered by human operation.

The character drawing apparatus in the foregoing embodiments use the character pause time intervals entered by means of an external input device, but it is also possible to set a character pause time interval automatically according to a rule for setting a character pause time interval, stored beforehand in a memory.

Eleventh Embodiment

Figures 40, 41:
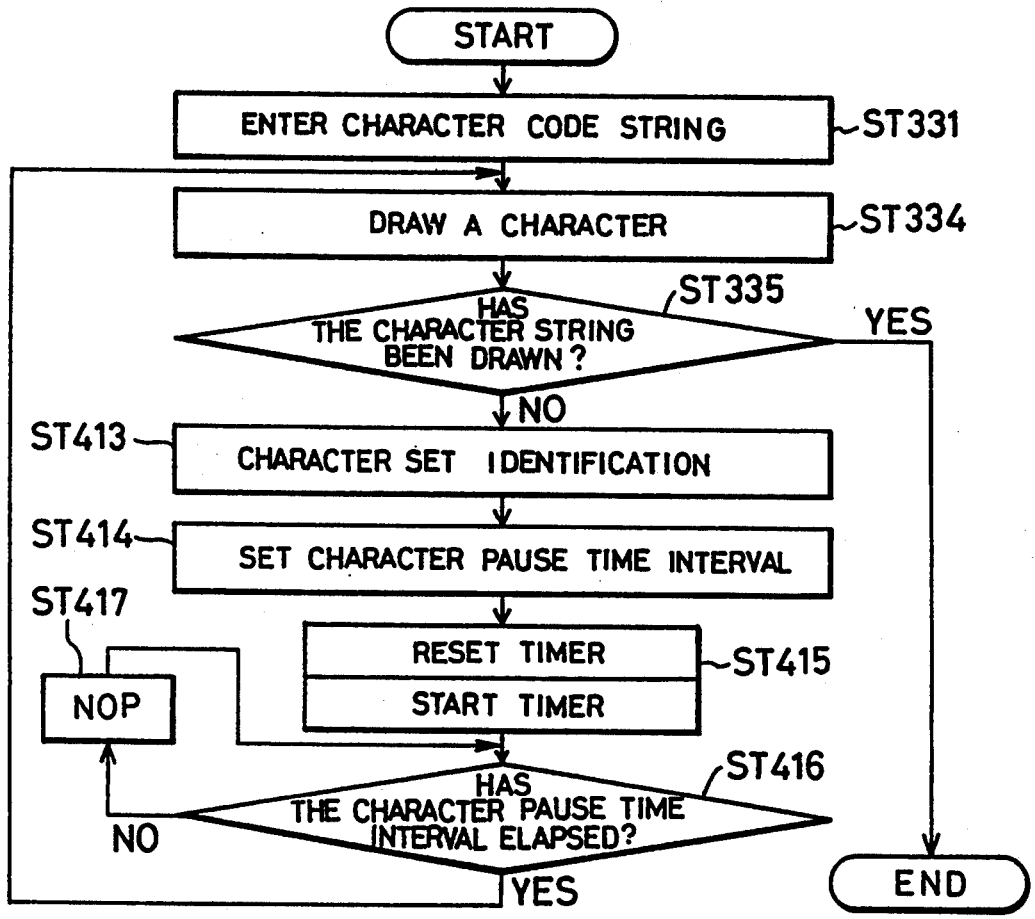
FIG. 40 is a table showing character sets, character codes and character pause time intervals for use by the character drawing apparatus of FIG. 39.
FIG. 41 is a flow chart of a character string drawing process to be executed by the character drawing apparatus of FIG. 39.

FIG. 39 shows a character drawing apparatus in an eleventh embodiment according to the present invention, capable of automatically setting a character pause time interval according to the type of characters of an input character string. The character drawing apparatus comprises a character drawing data storage unit 1a, a drawing time data storage unit 21b, a character drawing operation control unit 81c including a character drawing unit 33a and a character pause time interval control unit 7, an image memory 4 and a display 5. A character pause time interval table containing character codes and character pause time intervals for different character sets as shown in FIG. 40 is stored in the drawing time data storage unit 21b. The character pause time interval table shown in FIG. 40 contains such data for seven character sets, namely, a symbol set, an alphanumeric set, a hiragana character set, a katakana character set, a Greek character set, a Russian character set and a Chinese character set. As shown in FIG. 40, different character pause time intervals are set respectively for different character sets. As is obvious from FIG. 41 showing a character drawing process to be executed by the character drawing apparatus in the eleventh embodiment, a character code string is only an external input data. Referring to FIG. 41, a character code string is entered in step ST331, and then a character is drawn in step ST334. In step ST335, a query is made to see if all the characters of the character string have been drawn. When the response in step ST335 is negative, the character set including the drawn character is identified by the character code in step ST413, and a character pause time interval for this character set is read out from the character pause time interval table stored in the drawing time data storage unit 21b and the character pause time interval is set in step ST414. A timer is reset in step ST415, the timer is started in step ST416, and then steps ST416 and ST417 are repeated until the character pause time interval elapses. Steps ST334 to ST417 are repeated until all the characters of the character string are drawn.

The character pause time intervals shown in FIG. 40 are absolute values of time intervals, which are selected according to the input character code string and are used directly for controlling time intervals in drawing the characters of the character string. The character pause time interval table may contain factors for multiplying an input standard character pause time interval instead of the character pause time intervals. When such a table is employed, a standard character pause time interval is entered together with a character code string by means of an external input device, and a character pause time interval obtained by multiplying the standard character pause time interval by the factor for a character set corresponding to the character code string is used for timing the character drawing operation.

The rule of selecting a character pause time interval is not necessarily limited to that defined in the character pause time interval table, It is possible to set different character pause time intervals respectively for different combinations of the adjacent characters; for example, the half of the standard character pause time interval for the combination of alphabetical letters and for the combination of numerals, and a character pause time interval twice the standard character pause time interval for the combination of Chinese characters. It is also possible to calculate a character pause time interval by using a function stored before hand in the drawing time data storage unit 21b and input parameters.

The character drawing apparatus uses dot pattern data as character drawing data, but the character drawing data is not limited thereto; any kind of suitable character drawing data may be used provided that the character drawing data has sufficient information for loading character patterns corresponding to the input character codes in the image memory 4. For example, coded data of a run length coding system or vector pattern data representing the outlines of characters or the strokes of characters may be used instead of the dot pattern data. The character drawing data may include the order of stroke of characters, stroke directions and stroke speeds in addition to the pattern data.

Twelfth Embodiment

Figure 42:
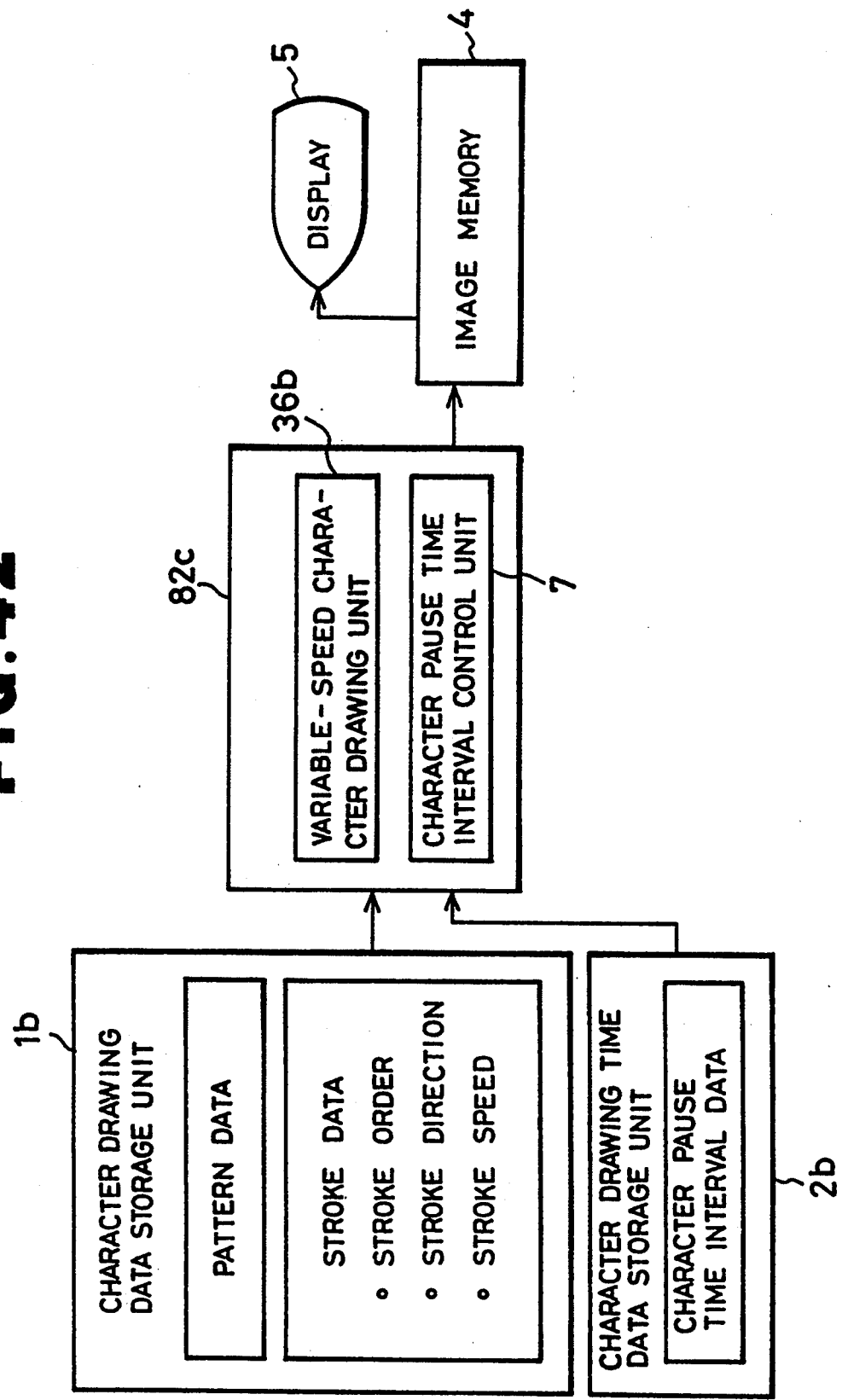
FIG. 42 is a block diagram of a character drawing apparatus in a twelfth embodiment according to the present invention.

FIG. 42 shows a character drawing apparatus in a twelfth embodiment according to the present invention. The character drawing apparatus comprises a character drawing data storage unit 1b, a drawing time data storage unit 2b, a drawing operation control unit 82c, an image memory 4 and a display 5. The drawing operation control unit comprises a variable-speed character drawing unit 36b and a character pause time interval control unit 7. The character drawing apparatus carries out character drawing operation making reference to stroke data including stroke order indicating the order of succession of strokes of characters, stroke directions indicating directions in which strokes are to be drawn, and stroke speed data for controlling drawing time intervals required for drawing characters and character pause time intervals. The stroke data is stored in the character drawing data storage unit 1b.

The character drawing apparatus draws characters on the basis of the pattern data as shown in FIG. 13(B) by way of example. The pattern data includes vector data representing the respective outlines of strokes of a character. As shown in FIG. 13(A) by way of example, the letter J has a first stroke 201 and a second stroke 202. The first stroke 201 is represented by four vectors 210, 211, 212 and 213 as shown in FIGS. 25(A)-1 and 25(A)-2. As shown in FIG. 13(B), each vector data includes a straight line code indicating a straight line, the coordinates of the starting point and end points of the straight line. A curved section 216 of the second stroke 202 is represented by vector data including a circular arc code indicating a circular arc, and three sets of coordinates (x7, y7), (xS, yS) and (x9, y9) defining the circular arc.

FIGS. 14(A) and 14(B) show stroke data included in the character drawing data for drawing the letter J. The stroke data includes stroke order indicating the order of displaying the strokes of the character, a stroke direction indicating a direction in which each stroke is to be drawn, and stroke speed for timing the drawing portions of the character. According to FIGS. 14(A) and 14(B), the first stroke and the second stroke are drawn in that order.

The stroke direction for each stroke is represented by the coordinates of the starting point and end point of the stroke, and the coordinates of points on a stroke line connecting the starting point and the end point or direction data representing the direction of extension of the stroke line. For example, as shown in FIG. 14(A), a solid line 330 between the starting point 331 and the end point 332 is the stroke line of the first stroke, a solid line 335 between the starting point 336 and the end point 337 is the stroke line of the second stroke. Stroke directions of the stroke lines are indicated by chain code strings shown in FIG. 14(C).

The character drawing of the character drawing apparatus is the same as that carried out by the character drawing apparatus in the fifth embodiment. Similarly to the character drawing operation carried out by the character drawing apparatus in the fifth embodiment, the character pause time interval control unit 7 suspend the character drawing operation for the character pause time interval stored in the drawing time data storage unit 2b after the end of drawing a character and starts the character drawing operation to draw the next character upon the elapse of the character pause the interval.

Thirteenth Embodiment

Figure 43:
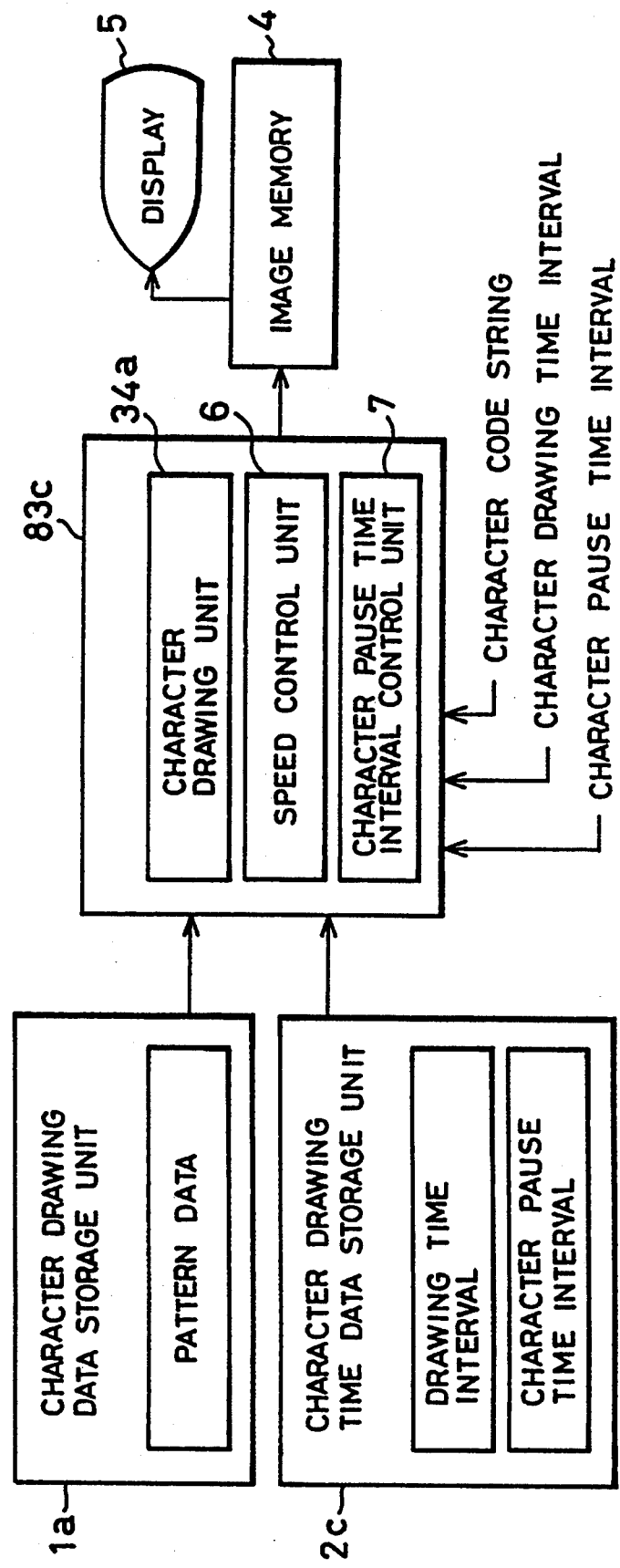
FIG. 43 is a block diagram of a character drawing apparatus in a thirteenth embodiment according to the present invention.

FIG. 43 shows a character drawing apparatus in a thirteenth embodiment according to the present invention. The character drawing apparatus comprises a character drawing data storage unit 1a, a drawing time data storage unit 2c, a character drawing operation control unit 83c, an image memory 4 and a display 5. The character drawing data storage unit 2c, which is similar to that shown in FIG. 32, stores character pause time data and drawing time data. The drawing operation control unit 83c includes a speed control unit 6 for controlling a drawing time interval required for drawing a character on the basis of the drawing time data. In the character drawing process, a character code string is entered (step ST331 of FIG. 33), and then a drawing time interval of T second required for drawing one character is entered. A character pause time interval defining a time interval between the end of drawing a character and the start of drawing the next character is entered (step ST332 of FIG. 33).

Figure 44:
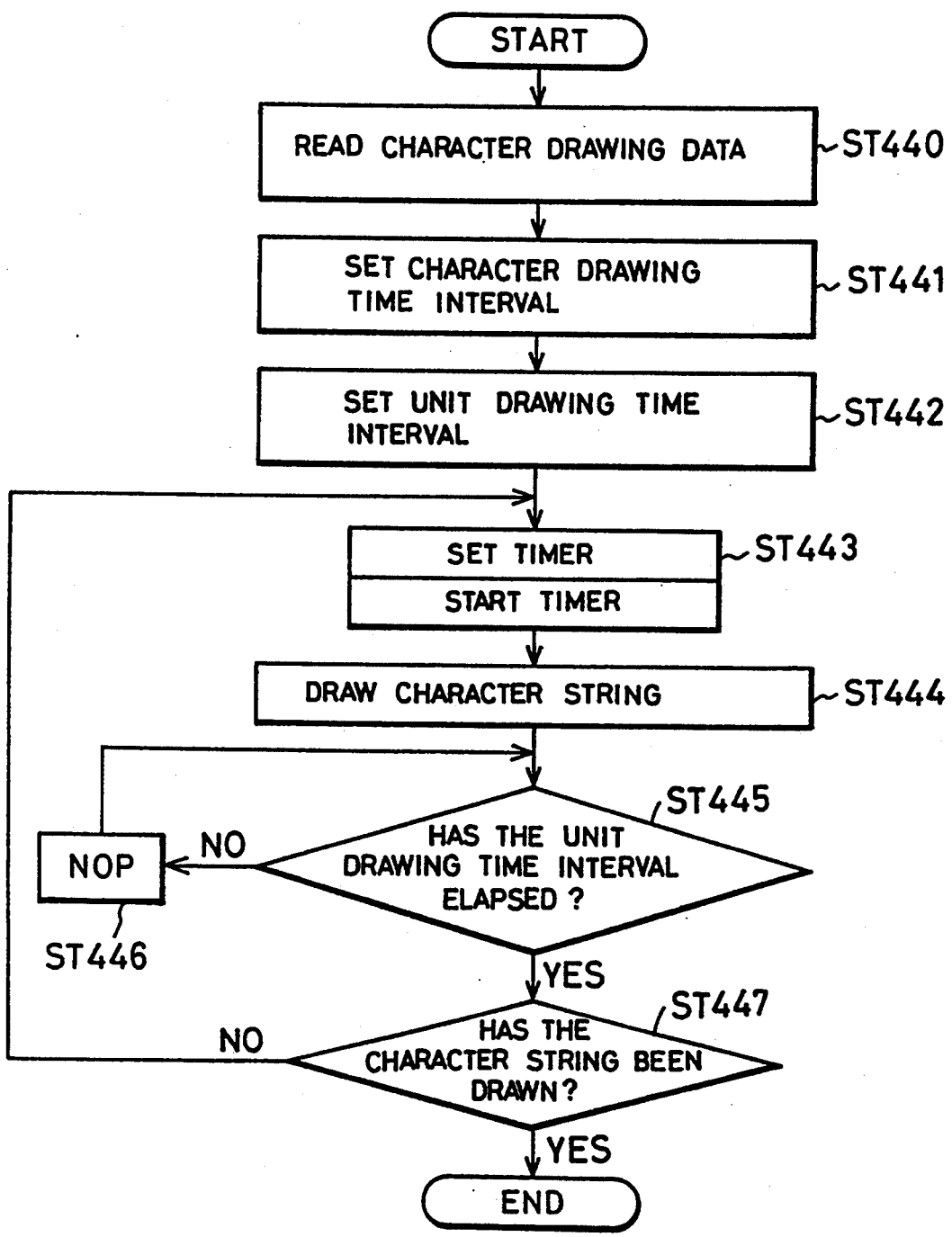
FIG. 44 is a flow chart of a character drawing process to be executed by the character drawing apparatus of FIG. 43.

Referring to FIG. 44 showing a character drawing process, pattern data of a character to be drawn is read out from the character drawing data storage unit 1a in step ST440, a character drawing time interval is read out from the drawing time data storage unit 2c in step ST441, and a unit drawing time interval is set on the basis of the character drawing time interval in step ST442. The unit drawing time interval corresponds to a drawing time interval required for one drawing cycle. The character drawing apparatus draws one line of a 16×16 dot matrix representing a character in one drawing cycle, hence in one unit drawing time interval. Therefore, each character requires sixteen drawing cycles. Since the given character drawing time interval is T seconds, the unit drawing time interval is T/16 seconds.

In step ST443, a timer for measuring drawing time is rest and started, and then the character drawing unit 34a loads one line of the dot matrix representing the character pattern in the image memory 4 in step ST444. In steps ST445 and ST446, the speed control unit 6 suspends the character drawing operation until the unit drawing time interval elapses. Upon the elapse of the unit drawing time interval, a query is made in step ST447 to see if all the lines of the dot matrix of the character have been drawn. When the response in step ST447 is negative, the routine returns to step ST443 to draw the next line. Steps ST443 to ST447 are repeated until all the lines of the dot matrix of the character pattern are drawn.

Upon the completion of drawing the character, a query is made to see if all the characters of the character string indicated by the character code string entered in step ST335. When the response is negative, the character pause time interval control unit 7 starts a timer for measuring a character pause time interval step ST336 of FIG. 33 and repeats steps ST337 and ST338 of FIG. 33 until the character pause time interval of t second elapses. Upon the elapse of the character pause time interval of t seconds, the timer is reset in step ST337 of FIG. 33 to start drawing the next character in step ST334 of FIG. 33. These steps are repeated until all the characters indicated by the character code string are drawn.

In this embodiment, one character drawing time interval and one character pause time interval are given for on character string. However, the character drawing time intervals required respectively for drawing the characters of a character string may be different from each other and different character pause time intervals may be provided respectively between different pairs of adjacent characters.

Fourteenth Embodiment

A character drawing apparatus in a fourteenth embodiment according to the present invention will be described hereinafter with reference to FIGS. 45 and 46. This character drawing apparatus is capable of setting a character drawing time interval for each character, and a character pause time interval for each pair of adjacent characters.

FIG. 45 shows, by way of example, an input character code string, a character drawing time interval string and a character pause time interval string, in which "9999" is a character string end code. As shown in FIG. 45, character drawing time intervals are set respectively for the characters of the character string. The character drawing time intervals are entered sequentially in order of drawing the characters of the character string. The number of the character pause time intervals is smaller than that of the characters of the character string by one and the character pause time intervals are entered sequentially in order of drawing the characters of the character string.

According to the data shown in FIG. 45, a character indicated by a code "3B30" (JIS) is drawn in a character drawing time interval of 5 seconds, the character drawing operation is suspended for a character pause time interval of 2 seconds, a character indicated by a code "4929" (JIS) is drawn in a character drawing time interval of 5 seconds, the character drawing operation is suspended for a character pause time interval of 2 seconds, a character indicated by a code "4545" (JIS) is drawn in a character drawing time interval of 3 seconds, the character drawing operation is suspended for a character pause time interval of 1 second, and then a character indicated by a code "3521" (JIS) is drawn in a character drawing time interval of 3 seconds.

Figure 46:
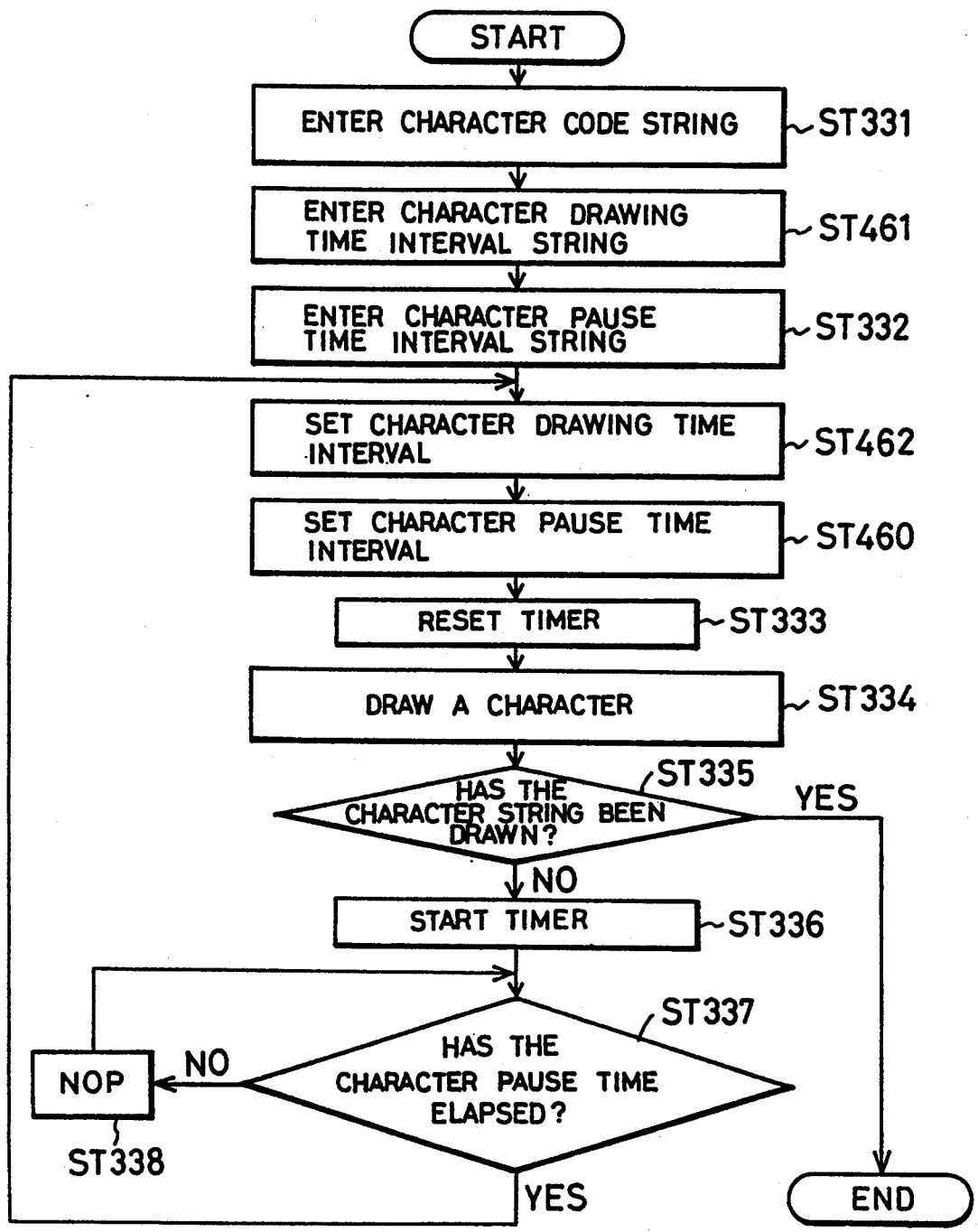
FIG. 46 is a flow chart of a character drawing process using the character codes and character pause time intervals shown in FIG. 45.

Referring to FIG. 46 showing a character drawing process to be carried out by the character drawing apparatus, a character code string, a character drawing time interval string and a character pause time interval string are entered in steps ST331, ST461 and ST332. In step St462, the speed control unit 6 sets a character drawing time, and the character pause time interval control unit 7 set a character pause time interval in step ST460 and resets a timer in step ST333. The first character of the character string is drawn in step St334, and then a query is made in step ST335 to see if all the characters of the character string have been drawn. When the response in step ST335 is negative, a timer is set in step ST336, and then steps ST337 and ST338 are repeated until the character pause time interval set in step ST462 elapses. Upon the elapse of the character pause time interval, the next character drawing time interval is set in step ST462, the next character pause time interval is set in step ST460 to start drawing the next character. Steps ST462 to ST338 are repeated until all the characters of the character string are drawn.

Thus, the timing of the character drawing operation of the character drawing apparatus is controlled according to the character drawing time interval string and the character pause time interval string, but the character drawing time interval string and the character pause time interval string are not always necessary. It is possible to store a standard drawing time interval and a standard character pause time interval in the drawing time data storage unit, and to enter a character drawing time interval other than the standard drawing time interval or a character drawing time interval string including character drawing time intervals other than the standard drawing time interval, or a character pause time interval other than the standard character pause time interval or a character pause time interval string including character pause time intervals other than the standard character pause time interval only when the character drawing operation of the character drawing apparatus is desired to be controlled according to character drawing time interval or intervals other than the standard drawing time interval, or a character pause time interval or intervals other than the standard character pause time interval. The character drawing time interval and the character pause time interval need not necessarily be an actual time interval expressed in seconds, but may be represented by the number of clock cycles of a clock signal generated by the microprocessor of the character drawing unit. It is also possible to store a standard drawing time interval beforehand in the drawing time data storage unit 2c and to set a desired character drawing time interval by multiplying the standard character drawing time interval by a factor entered by human operation. Similarly, it is also possible to store a standard character pause time interval beforehand in the drawing time data storage unit 2c and to set a desired character pause time interval by multiplying the standard character pause time interval by a factor entered by human operation.

The character drawing apparatus in the foregoing embodiments use the character drawing time intervals and the character pause time intervals entered by means of an external input device, but it is also possible to set a character drawing time interval and a character pause time interval automatically according to a rule for setting a character drawing time interval and a character pause time interval, stored beforehand in a memory.

Fifteenth Embodiment

Figure 47:
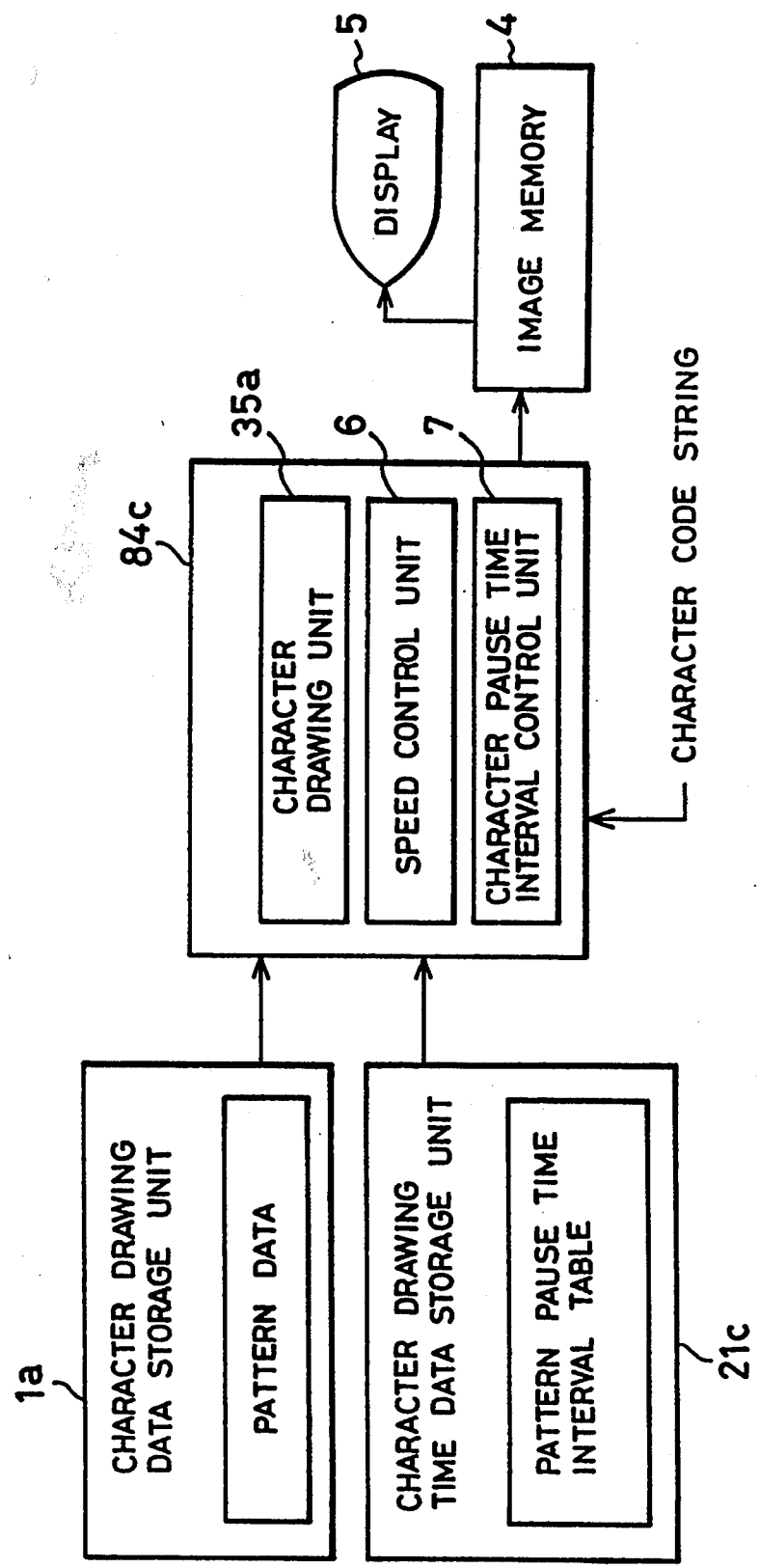
FIG. 47 is a block diagram of a character drawing apparatus in a fifteenth embodiment according to the present invention.

FIG. 47 shows a character drawing apparatus in a fifteenth embodiment according to the present invention capable of automatically setting a character drawing time interval and a character pause time interval depending on the type of the characters of an input character string. The character drawing apparatus comprises a character drawing data storage unit 1a, a drawing time data storage unit 21c, a drawing operation control unit 84c, an image memory 4 and a display 5. A drawing time data table as shown in FIG. 48 is stored in the drawing time data storage unit 21c. The timing of the character drawing operation of the character drawing apparatus is controlled according to different character drawing time intervals respectively corresponding to the respective types of the characters of an input character string selected from the drawing time data table shown in FIG. 48.

Figure 49:
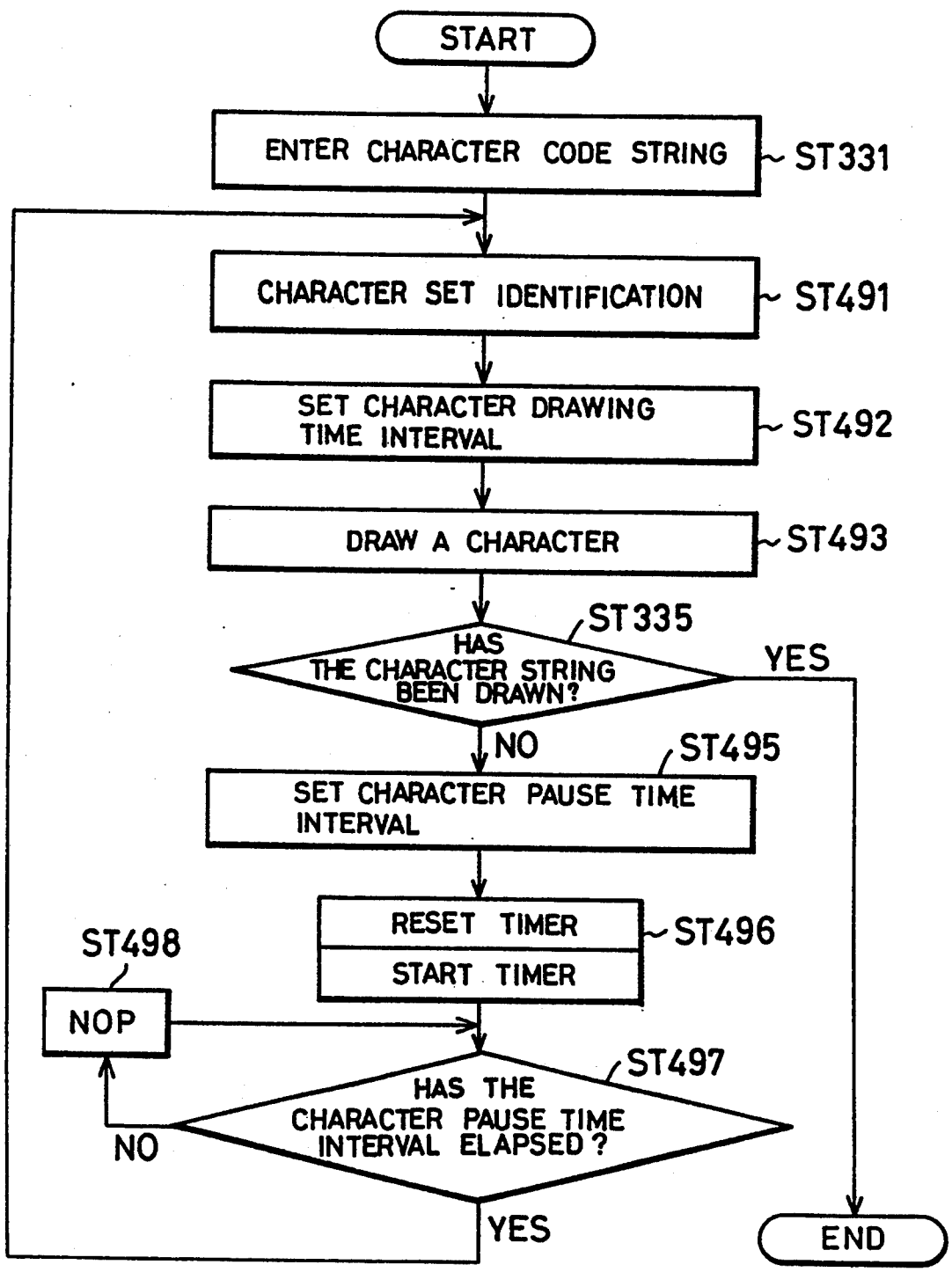
FIG. 49 is flow chart of a character string drawing process to be executed by the character drawing apparatus of FIG. 47.

FIG. 49 shows a character drawing process to be executed by the character drawing apparatus in the fifteenth embodiment. As is obvious from FIG. 49, only the input provided by an external input device is a character code string to be entered in step ST331. In step ST491, the type of the first character of the character string is identified by the corresponding character code. In step ST492, a character drawing time interval relevant to the type of the character is read from the drawing time data table stored in the drawing time data storage unit 21c and the character drawing time interval is set. In step ST493, the character is drawn. In step ST335, a query is made to see if all the characters have been drawn. When the response in step ST335 is negative, a character pause time interval relevant to the type of the character is read from the drawing time data table stored in the drawing time data storage unit 21c in step ST495, and then a timer is reset and started in step ST496. Steps ST497 and ST498 are repeated until the character pause time interval elapses. Thus, steps ST491 to ST498 are repeated until all the characters are drawn.

Sixteenth Embodiment

Figure 50:
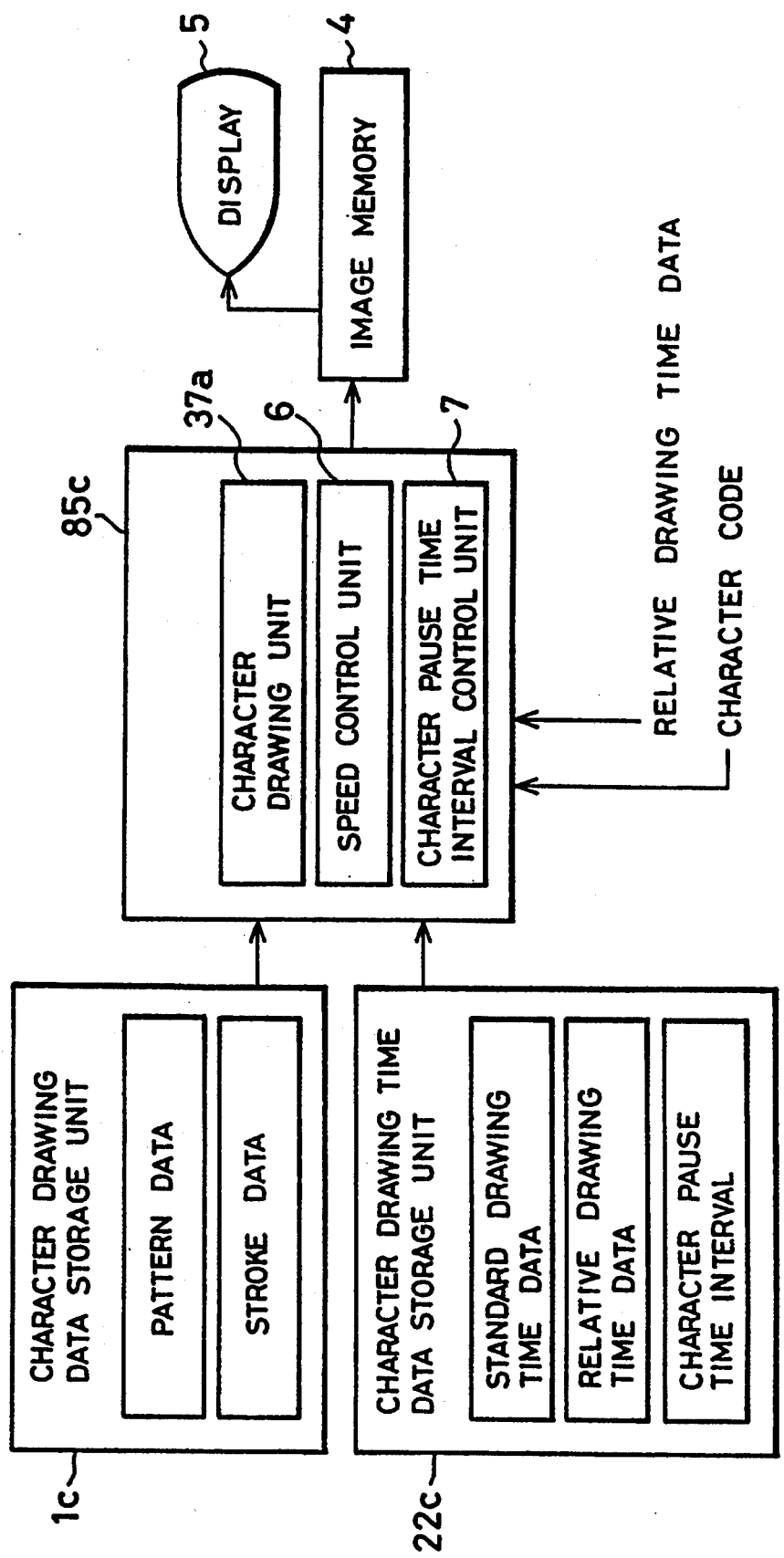
FIG. 50 is a block diagram of a character drawing apparatus in a sixteenth embodiment according to the present invention.

The timing of the character drawing operation of a character drawing apparatus in a sixteenth embodiment according to the present invention shown in FIG. 50 is controlled by character drawing data including data representing stroke directions and stroke speeds.

Referring to FIG. 50, stroke data including stroke order specifying the order of succession of strokes of characters and stroke lines of strokes of characters, and pattern data representing the patterns of characters are stored in a character drawing data storage unit 1c. Standard drawing time data and relative drawing time data are stored in a drawing time data storage unit 22c.

Figure 51:
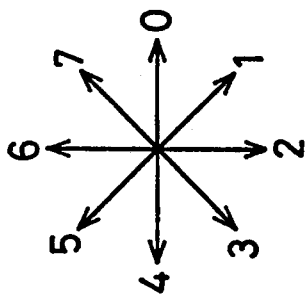
FIGS. 51(A) and 51(B) are views of assistance in explaining stroke data and chain codes representing strokes included in character string drawing data for use by the character drawing apparatus of FIG. 50.

FIGS. 51(A), 51(B) and 51(C) show an example of the stroke data included in the character drawing data. The pattern data and the stroke data are contained in tables as shown in FIGS. 13(B), 14(B) and 51(A). The pattern data represents the shapes of strokes of each character. The outline of each stroke is represented by vectors. The stroke data includes, in addition to the stroke order data, the stroke line of each stroke and the coordinates of the starting point and end point of the stroke line. The stroke line is expressed by a chain code string as shown in FIG. 51(B). The character drawing apparatus draws characters in the order of stroke and in a mode of drawing resembling those of handwriting by using the patter data and the stroke data.

Figure 52:
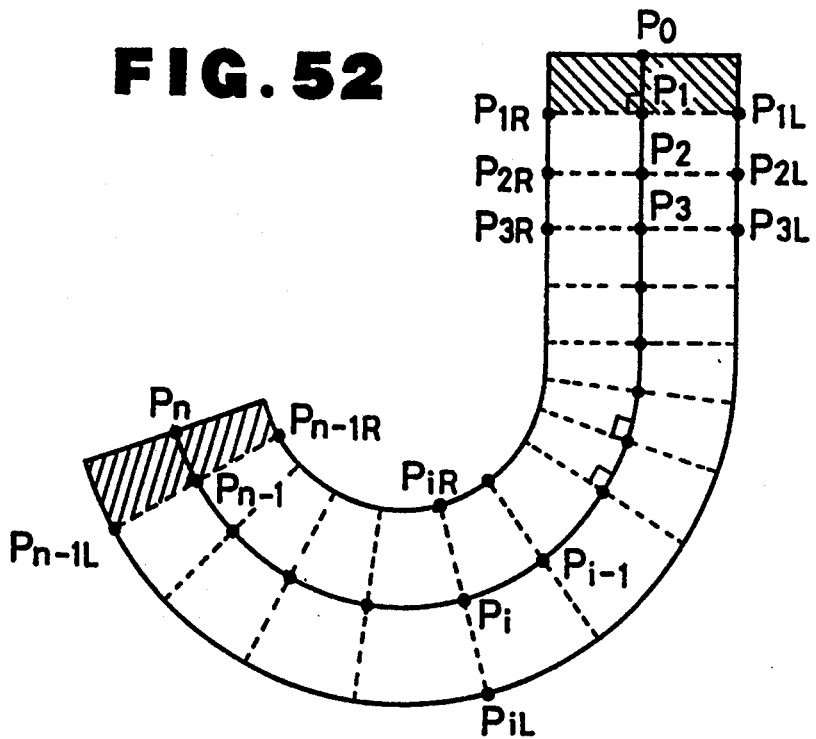
FIG. 52 is a view of assistance in explaining a character drawing process to be executed by the character drawing apparatus of FIG. 50.

The character drawing operation of the character drawing apparatus in drawing the second stroke of the letter J will be described hereinafter with reference to FIG. 52. First, the character drawing unit 37b loads the pattern of the stroke into a working memory according to the pattern data. The stroke line of the stroke is divided into a plurality of sections by dividing points, and then the stroke is divided into a plurality of small regions by normals to the stroke line at the dividing points. The solidified regions are loaded sequentially in order of succession along the stroke direction into the image memory 4.

The number of regions of the stroke is specified beforehand in the stroke data, for example, by the number of sets of coordinates of the dividing points or a dividing number. When a dividing number is given, dividing points are determined so that the stroke line of the stroke is divided at regular intervals into a number of sections corresponding to the dividing number. In this embodiment, the stroke line is divided at regular intervals of l from the starting point toward the end point of the stroke line. Therefore, n=L/l (the decimal part is raised), where n is the dividing number and L is the length of the stroke line.

The standard drawing time data and the relative drawing time data stored in the drawing time data storage unit 22c (FIG. 50) will be described hereinafter. As stated above, the character drawing process divides the stroke of the character into a plurality of regions and draws the regions sequentially along the stroke line. The dividing number is expressed as a function of the intervals of l between the dividing points and the length L of the stroke line.

$$n = L/l$$

A time interval required for drawing the stroke without time regulation in drawing the character is the total sum of time intervals required for drawing the regions. The character drawing apparatus uses a preset unit drawing time interval, namely, a time interval required for drawing one region. Therefore, the time interval required for drawing the stroke of a character is determined by multiplying the unit drawing time interval by the dividing number. The standard drawing time interval is a time interval required for drawing a character when the strokes are divided into regions at regular intervals specified in the stroke data and each region is drawn in the unit drawing time interval. The relative drawing time interval is the ratio of a drawing time interval required for drawing a character t the standard drawing time interval specified beforehand in the character drawing data stored in the character drawing data storage unit 1c. The relative drawing time interval can be set for character drawing operation as occasion calls.

As stated above, since the drawing time interval required for drawing a character is dependent on the product of the unit drawing time interval and the dividing number, the time interval required for drawing the character can be changed by changing the unit drawing time; that is, when a relative drawing time data a is entered, a time interval obtained by multiplying the unit drawing time interval by a may be used as a new unit drawing time interval.

Figure 53:
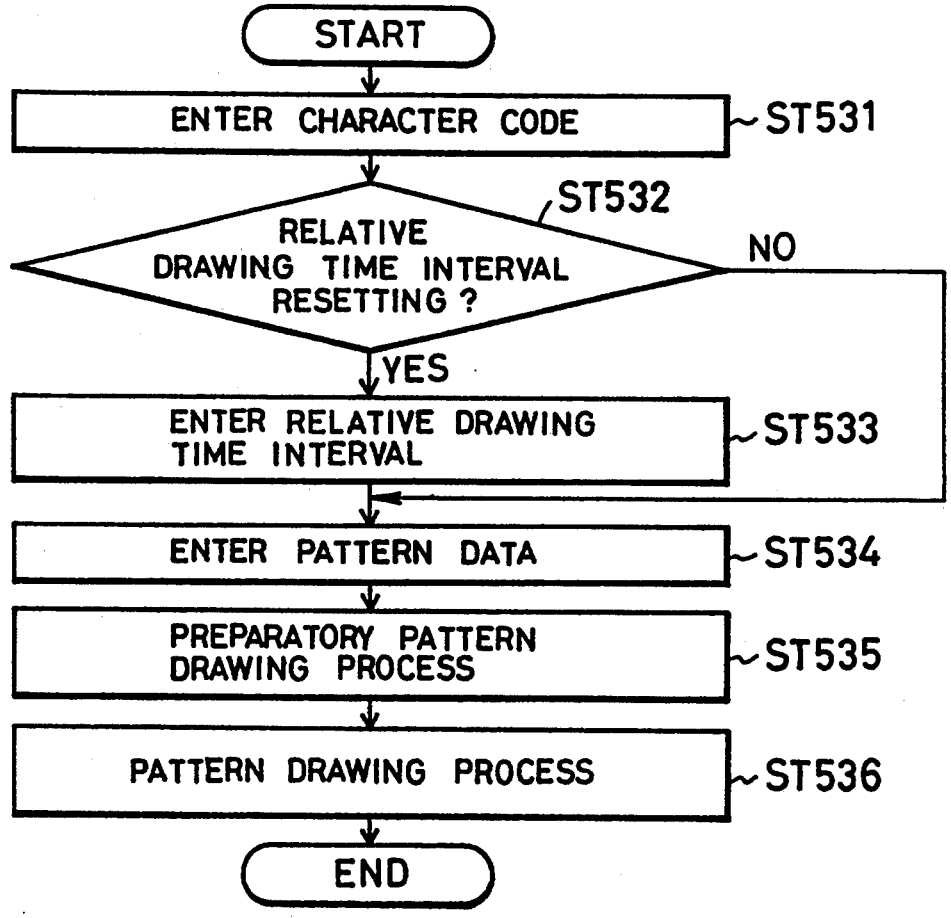
FIG. 53 is a flow chart of the character drawing process to be executed by the character drawing apparatus of FIG. 50.

Another drawing time control method uses a predetermined unit drawing time interval arid changes the dividing number for dividing the strokes of a character. Such a method of controlling the drawing time by changing the dividing number will be described hereinafter with reference to FIG. 53 showing a character drawing process for drawing one character.

A character code representing a character to be drawn is entered in step ST531. In step ST532, the standard drawing time interval is examined to determine whether or not the relative drawing time interval needs to be reset. When the relative drawing time interval needs to be reset, a desired relative drawing time interval is entered by means of an input device to reset relative drawing time data stored in the drawing time data storage unit 22c in step ST533. Then, in step ST534, pattern data is entered. In step ST535, a preparatory pattern drawing process is executed to produce a drawing command string for drawing the character according to stroke data. The preparatory pattern drawing process to be executed in step ST535 is the same as that described with reference to FIG. 28, and hence the description thereof will be omitted to avoid duplication.

Figure 28:
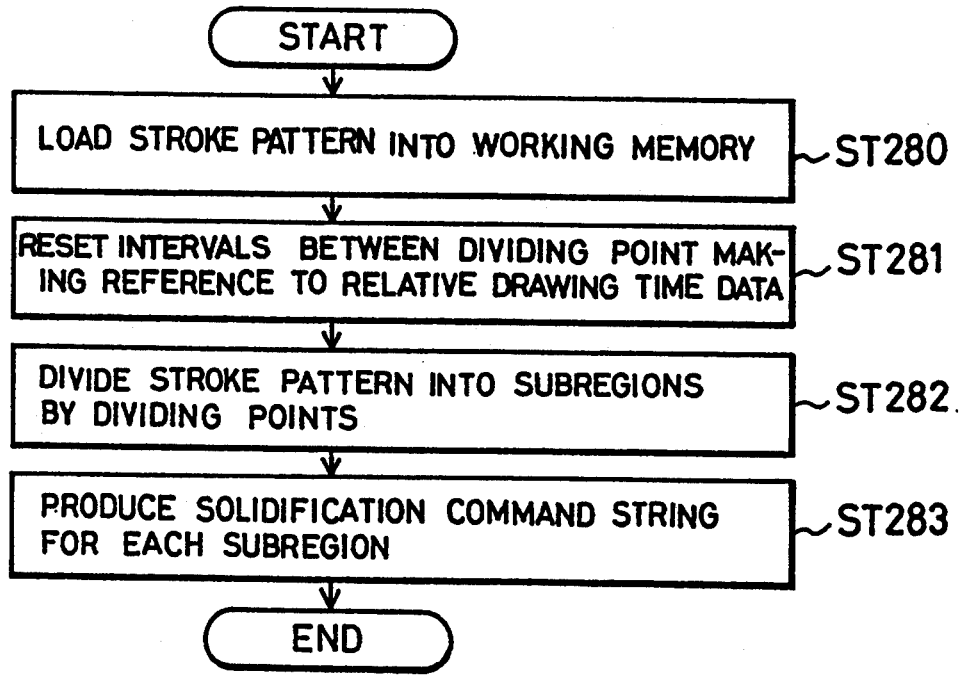
FIG. 28 is a flow chart of a preparatory pattern drawing process to be executed by the character drawing apparatus of FIG. 24.

In step ST536, a pattern drawing process is executed to load the solidified regions into the image memory 4 by controlling the loading timing on the basis of the pattern drawing command string produced by the preparatory pattern drawing process (FIG. 28). The pattern drawing process is the same as that described with reference to FIG. 29, and hence the description thereof will be omitted to avoid duplication.

Thus, the character drawing apparatus draws a character in the same stroke order and the same stroke direction as those of handwriting by using the character drawing data including the pattern data and the stroke data, and the standard drawing time data, the relative drawing time data and character pause time intervals stored in the drawing time data storage unit 22c. The possibility of the selective change of the relative drawing time data enables the simple change of a drawing time interval required for drawing characters.

The character drawing apparatus makes reference to the standard drawing time data included in the character drawing data in resetting the relative drawing time data. Since the standard drawing time data is dependent on the pattern data included in the character drawing data, the stroke data and the ability of the character drawing unit, the standard drawing time data need not be stored in the drawing time data storage unit 22c if reference need not be made to the standard drawing time data in resetting the relative drawing time data.

Seventeenth Embodiment

A character drawing apparatus in a seventeenth embodiment according to the present invention will be described hereinafter with reference to FIGS. 54 and 31(A) to 31(C).

Figure 54:
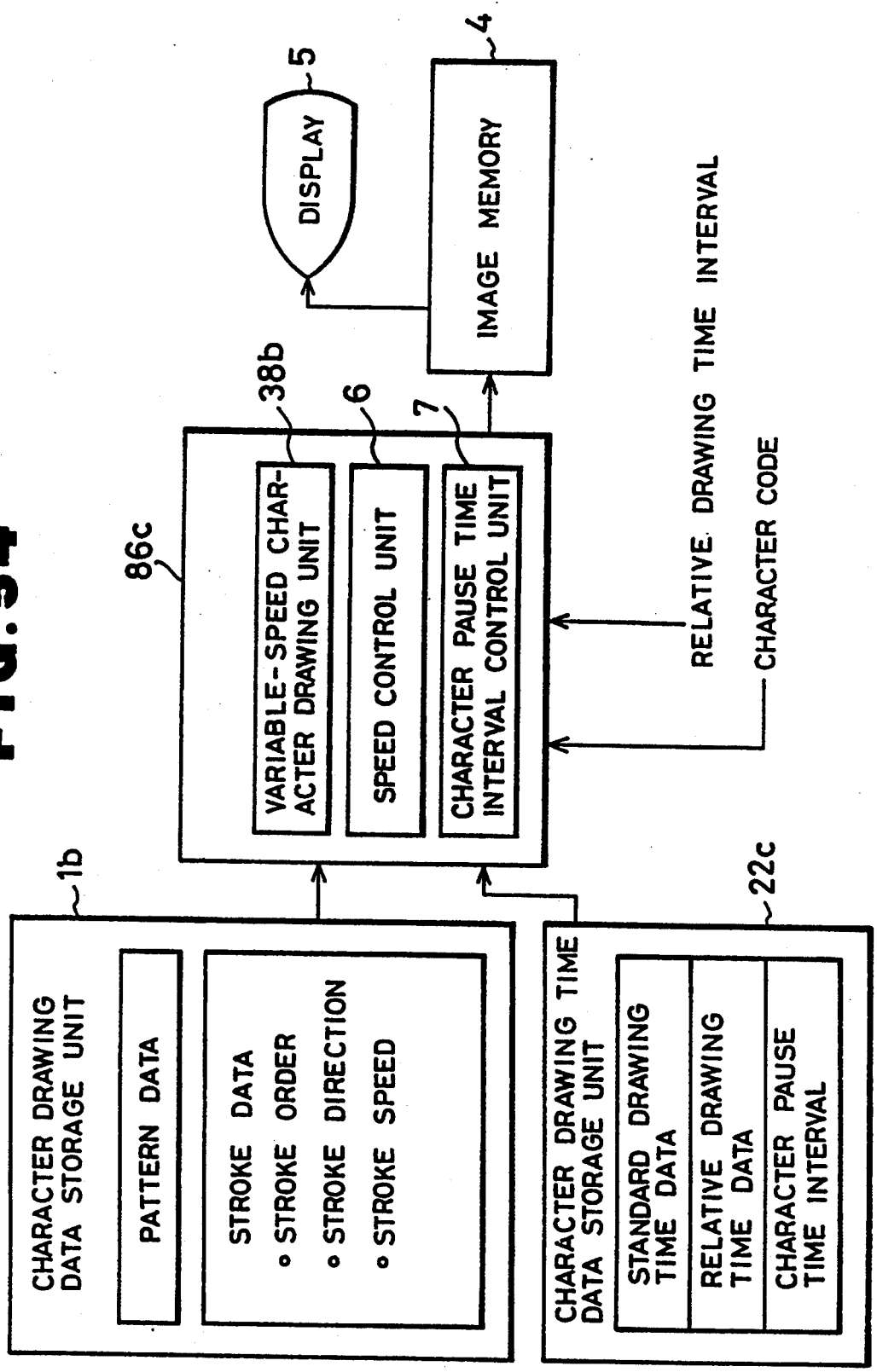
FIG. 54 is a block diagram of a character drawing apparatus in a seventeenth embodiment according to the present invention.

The character drawing apparatus shown in FIG. 54 is capable of varying the stroke speed depending on portions of a character. The time interval required for drawing a character can be varied by using relative drawing time data included in character drawing data without varying stroke tempo. The character drawing apparatus uses the character drawing data shown in FIG. 14(B) to draw the first and second strokes shown in FIG. 14(A) in that order. The stroke direction of each stroke is defined by the starting point of the stroke line, the end point of the stroke, and direction data indicating the direction of the stroke line connecting the starting and end points. The stroke speed data is used for controlling a time interval required for sequentially drawing a plurality of regions of each stroke along the stroke line and for controlling a stroke pause time interval between the two successive strokes. The character drawing data shown in FIGS. 14(A), 14(B) and 14(C) by way of example divides the stroke lines of the strokes into a plurality of sections respectively by speed change points 333 and 334, and speed change points 338 and 339, and assigns a stroke speed to each section. The stroke speed corresponds to the number of unit regions to be drawn in a unit drawing time interval. The last element of the stroke data is a stroke pause time interval between the two successive strokes, namely, a time interval between the end of drawing the preceding stroke and the start of drawing the succeeding stroke.

The stroke pause time interval is represented by the number of unit drawing time intervals.

Figure 18:
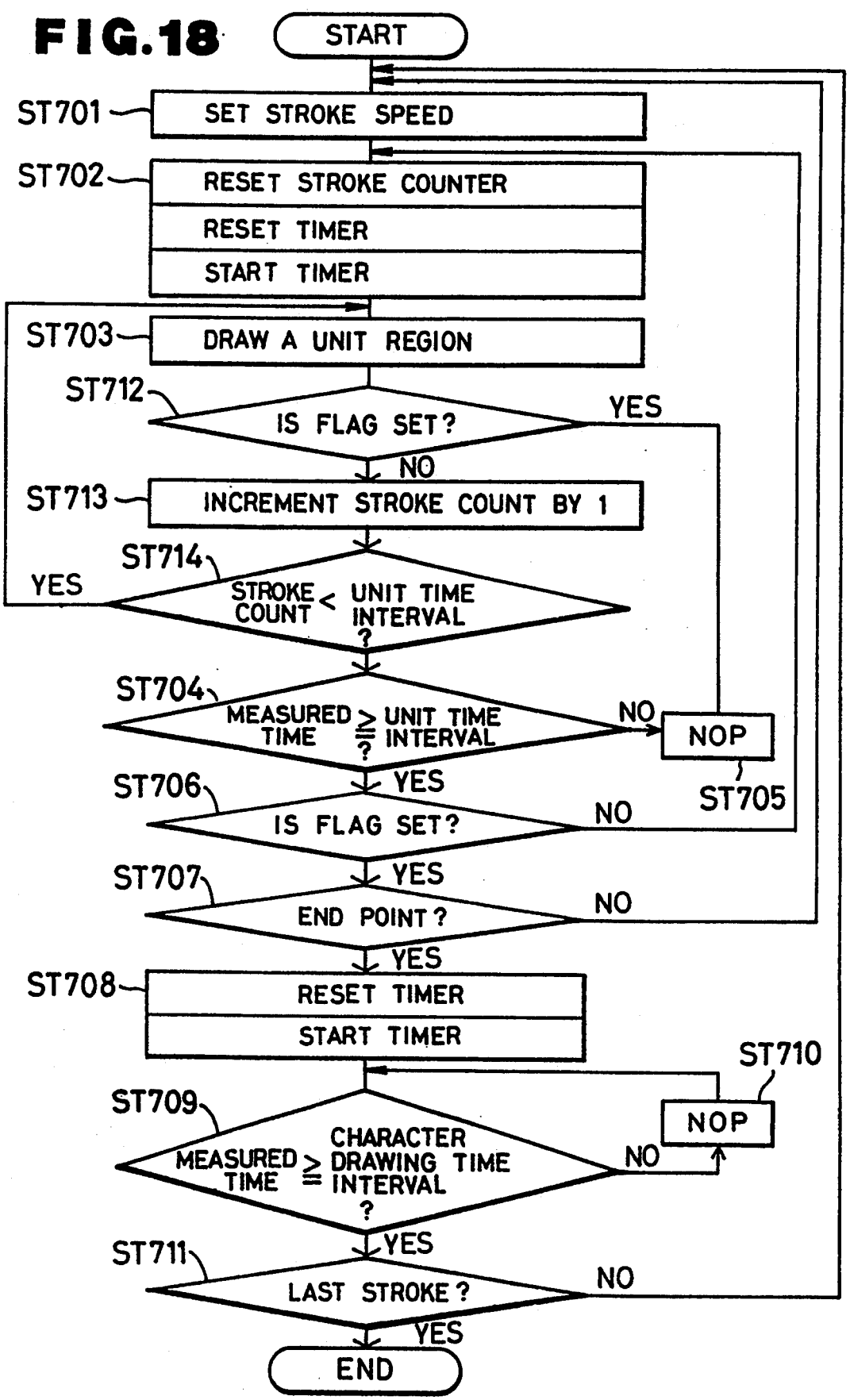
FIG. 18 is a flow chart of a pattern drawing process included in a character drawing process.

The character drawing apparatus carries out a character drawing process shown in FIG. 18 or in FIGS. 31(A), 31(B) and 31(C) to draw one character. Therefore, the character drawing operation of the character drawing apparatus is the same as that carried out by the character drawing apparatus in the fifth or eighth embodiment.

As described in detail with reference to the fifth embodiment, the pattern drawing commands requesting drawing the unit regions are read sequentially from the pattern drawing command string produced by the preparatory pattern drawing process, and the unit regions, the number of which corresponding to the stroke speed, are loaded into the image memory 4 in the unit drawing time interval. After the stroke has been drawn, the character drawing operation is suspended for a time corresponding to the product of the stroke pause time interval included in the stroke data for the stroke and the unit drawing time interval before starting drawing the next stroke. Upon the completion of drawing all the strokes of the character, the character pause time interval control unit 7 reads the character pause time interval from the drawing time data storage unit 22c and suspends the character drawing operation for the character pause time interval before starting drawing the next character.

The stroke speed is controlled on the basis of the unit drawing time interval; that is, the drawing speed is represented by the number of the unit regions to be drawn in the unit drawing time interval, and the stroke pause time interval is represented by the ratio of the time interval for which the character drawing operation is suspended to the unit drawing time interval. Accordingly, the time interval required for drawing the character can be changed by changing the unit drawing time interval. Suppose that the relative drawing time data is a. Then, the character can be drawn in a time interval a times the standard drawing time interval without varying stroke tempo.

Another drawing time control method changes the dividing number for dividing the strokes of a character without changing the unit drawing time interval, and other drawing time control method changes the number of the unit regions to be drawn in the unit drawing time interval. These drawing time control methods using the relative drawing time interval will be described hereinafter.

A drawing time interval required for drawing a character is the total sum of time intervals required for drawing the component regions of the character and the stroke pause time intervals. Accordingly, the drawing time interval required for drawing the character can be multiplied by the relative drawing time interval, for example, X by multiplying the time interval required for drawing each component region of the character and the stroke pause time intervals by X.

Therefore, to reset the stroke pause time intervals, the stroke pause time intervals included in the stroke data are multiplied by a value included in the relative drawing time data.

Process of controlling the drawing time interval required for drawing each region of the character will be described hereinafter. A drawing time interval required for drawing each region is dependent on the number of unit regions included in the region and a drawing speed for drawing the region. For example, the region in the first stroke between the starting point 331 and the speed change point 333 shown in FIG. 14(A) is drawn at a stroke speed "1", and the region is divided into six unit regions as shown in FIG. 15, and hence the region is drawn in six unit drawing time intervals. The region in the first stroke between the speed change points 333 and 334 shown in FIG. 14(A) is drawn at a stroke speed "3" and the region is divided into thirty unit regions, and hence the region is drawn in ten unit drawing time intervals.

The drawing time interval required for drawing each region can be increased by a factor X by increasing the number of the unit regions in the region by a factor X. Thus, the preparatory pattern drawing process of this character drawing system divides the stroke line at regular intervals of a predetermined value and divides the stroke pattern by normals to the stroke line at the dividing points. Therefore, the drawing time interval required for drawing the region can be increased by the factor X by increasing the interval between the dividing points by a factor $1/X$.

The drawing time interval required for drawing the region may be increased by the factor X by increasing the stroke speed by the factor $1/X$. For example, the stroke speed "3" for the region between the speed change points 333 and 334 shown in FIG. 14(A) may be changed for a stroke speed of $3/X$. A stroke speed obtained by increasing a stroke speed by a factor $1/X$ is not necessarily an integral number. Since it is only possible to draw an integral number of unit regions in a unit drawing time interval, a number representing the stroke speed is added to the count of a counter for counting the number representing the stroke speed every time the unit drawing time interval elapses and a number of unit regions corresponding to a variation in the integral part of the count are drawn when the integral part of the count changes. When the unit regions are drawn by such a method, the number of unit regions drawn in a unit drawing time intervals varies, but the average number of unit regions drawn in one unit drawing time interval is a number corresponding to (stroke speed)/X in drawing the region.

Thus, the character drawing apparatus uses the character drawing data of a system different from that of a dot system for time control in drawing a character string and sets the drawing time data by giving external input data as well as the character codes to the character drawing unit. However, the drawing time interval can automatically be changed according to a rule for controlling the drawing time interval, represented by data contained in a table stored in the character drawing data storage unit.

Eighteenth Embodiment

Figure 55:
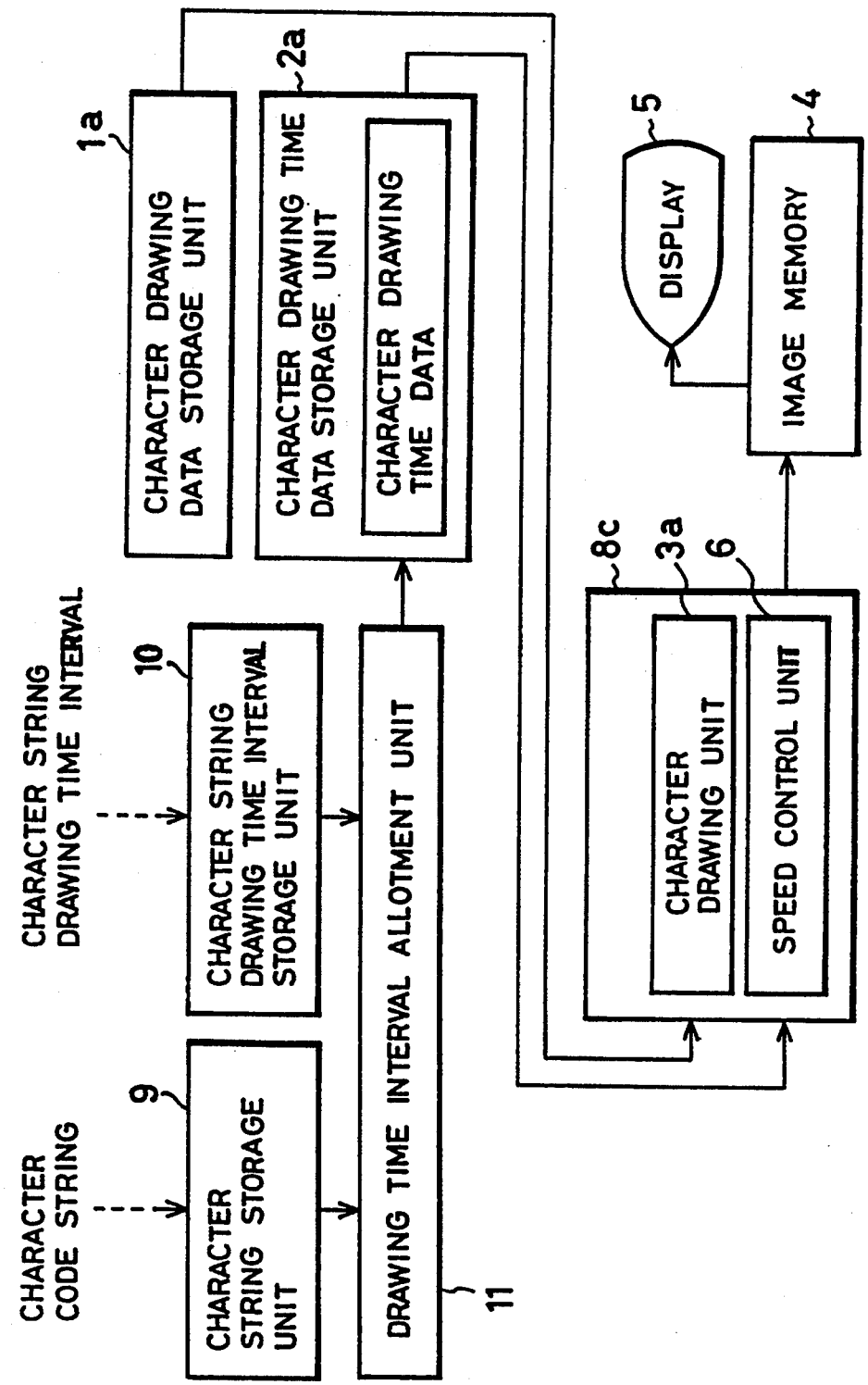
FIG. 55 is a block diagram of a character drawing apparatus in an eighteenth embodiment according to the present invention.

Referring to FIG. 55, a character drawing apparatus in an eighteenth embodiment according to the present invention comprises a character drawing data storage unit 1a storing character drawing data including pattern data representing characters of character strings, a drawing time data storage unit 2a storing a character drawing time interval for controlling a time interval required for drawing each character of a character string, a character drawing unit 3a, an image memory 4, a display 5 for displaying the contents of the image memory 4, a speed control unit 6, a character string storage unit 9 for storing a character string to be drawn, a character string drawing time storage unit 10 for storing a character string drawing time interval required for drawing a character string, and a drawing time interval allotting unit 11 for automatically setting the character drawing time interval according to a given rule on the basis of the character string and the character string drawing time interval.

A character string drawing process to be carried out by the character drawing apparatus will be described hereinafter with reference to FIGS. 55, 56, 57, 58(A), 58(B) and 58(C).

Referring to FIG. 56, a character code string indicating a character string to be drawn is entered in step ST561. FIG. 57 shows an example of a character code string, in which a code "9999" is a character string end code. Each character of the character string is represented by a Chinese character code specified in JIS. The character code string consists of Chinese character codes sequentially arranged in order of display. Referring again to FIG. 56, in step ST562, a character string drawing time interval of T seconds, i.e., data for controlling a time interval required for drawing the character string, is entered. The character code string and the character string drawing time interval may be entered by human operation by means of an input device, such as a keyboard, the character drawing unit 3a may read data representing the character code string and the character string drawing time interval from a data file containing character drawing data or data representing the character code string and the character string drawing time interval may be supplied from an application program. The minimum character string drawing time interval is subject to restrictions. Although dependent on the contents of a rule of regulating drawing time interval allotment, the minimum character string drawing time interval must not be less than a time interval required for drawing the characters of the character string at the maximum drawing speed of the character drawing unit 3a.

Referring again to FIG. 56, in step ST563 for a drawing time interval allotting process, a character drawing time interval is calculated making reference to the character code string and the character string drawing time interval, and the calculated character drawing time interval is stored in the drawing time data storage unit 2a. FIGS. 58(A), 58(B) and 58(C) show a character drawing time interval setting process to be carried out according to Rule 1 by the character drawing apparatus in step ST564. FIG. 58(A) shows Rule 1, FIG. 58(B) shows a character drawing time interval allotting process, and FIG. 58(C) shows drawing time data including character drawing time intervals allotted to the characters and stored in the drawing time data storage unit 2a. The character drawing time interval allotting process calculates the character drawing time intervals according to Rule 1 specifying allotment of an equal character drawing interval to each character. A character drawing time interval allotting process conforming to this rule will be described hereinafter with reference to FIG. 58(B). First, the number N of the component characters of a character string is counted in step ST581. In step ST582, a character drawing time interval t to be allotted to each character is calculated. Since Rule 1 specifies equal allotment, the character string drawing time interval is divided into equal character drawing time intervals.

$$t = T/N$$

In step ST583, the character drawing time intervals t are stored in the drawing time data storage unit 2a. The equal character drawing time intervals t seconds are allotted respectively to the characters. The character drawing unit 3a draws the characters of the character string by timing the drawing operation according to the character drawing time intervals stored in the drawing time data storage unit 2a. A character string drawing process will be described hereinafter with reference to steps ST564, ST565 and ST566 of FIG. 56.

In step St564, the character drawing time interval for the first character of the character string is read from the drawing time data storage unit 2a, and then the character is drawn in step ST565 in the character drawing time interval set in step ST564. In step ST565, processes shown in FIGS. 4 and 5 are carried out; that is, the operation of the character drawing apparatus in step ST565 is the same as that of the character drawing operation in the first embodiment. Upon the completion of drawing the first character, the character drawing unit 3a makes a query in step ST566 to see if all the characters of the character string have been drawn. When the response in step ST566 is negative, the routine returns to step ST564 to start drawing the next character. Steps ST564 to St566 are repeated until all the characters of the character string are drawn. Thus, character string can be drawn in the character string drawing time interval T by drawing the characters respectively in equal character drawing time intervals.

Nineteenth Embodiment

A character drawing apparatus in a nineteenth embodiment carries out a character drawing time allotment in conformity with Rule 2, which is different from Rule 1. FIGS. 59(A) to 59(D) show Rule 2, a character drawing time interval allotting process to be executed by the character drawing apparatus, a drawing time data determined by the character drawing time interval allotting process and stored in the drawing time data storage unit 2a and a table to be used by the character drawing time interval allotting process, respectively. The table shown in FIG. 59(D) includes seven character sets, namely, a symbol set, an alphanumeric character set, a hiragana character set, a katakana character set, a Greek character set and a Russian character set. Different character drawing time intervals are assigned respectively to the seven character sets. Relative drawing time data shown in FIG. 59(D) are factors of the character drawing time intervals assigned respectively to the character sets; the character drawing time intervals are obtained by multiplying a standard drawing time interval by the factors. According to Rule 2, the character drawing time intervals are weighted values; that is, the character drawing time intervals assigned to the symbol set and the alphanumeric character set are x (a standard drawing time interval), the character drawing time intervals assigned to the hiragana character set and the katakana character set are 3x and the character drawing time interval assigned to the Chinese character set is 5x.

The character drawing time interval allotting process will be described hereinafter with reference to FIG. 59(B). In step ST581, the number N of the component characters of a character string is counted. In step ST592, character drawing time intervals for the characters are calculated. Suppose that the characters are $m_i$ (i=1, 2, 3, ..., N), and the factors for the character sets including the characters $m_i$ are $a_i$(i=1, 2, 3 ..., N), respectively. Then, the standard character drawing time interval x is expressed by $$x = T/ \sum_{i=1}^{N} a_i$$

The character drawing time intervals for the characters are obtained by multiplying the standard drawing time interval x by the factors. In step ST583, the character drawing time intervals thus obtained are stored in the drawing time data storage unit 2a. A character string drawing process to be carried out after storing the character drawing time intervals in the drawing time data storage unit 2a is the same as the character drawing process shown in FIGS. 4 and 5 carried out by the character drawing apparatus in the eighteenth embodiment.

The character drawing time interval allotment process may be carried out by using a function expressed by a mathematical expression or by a graph instead of the table as shown in FIG. 59(D). It is possible to store a function beforehand in the drawing time interval allotment unit 11 and to calculate the character drawing time intervals for the characters by using the character string drawing time interval and input parameters.

When the character drawing unit 3a carries out the character drawing process, the speed control unit 6 controls the character drawing speed so that the characters of the character string are drawn respectively in the character drawing time intervals stored in the drawing time data storage unit 2a. However, it is impossible, in some cases, to control time in drawing the characters depending on the data structure of the character drawing data or the character drawing algorithm of the character drawing unit 3a. FIGS. 60(A) and 60(B) show the relation between the character drawing time intervals allotted to the characters and an actual character drawing period between the start of drawing the character and the completion of drawing the character, in which hatched portions indicate actual character drawing periods. FIG. 60(A) shows a case where time control during the character drawing period is possible and FIG. 60(B) shows a case where time control during the character drawing period is impossible. When time control is possible during the character drawing period, actual character drawing periods are distributed over the entire character drawing period as shown in FIG. 60(A). When time control is impossible during the character drawing period, actual drawing operation is continued after starting drawing the character and the character is drawn in a time interval necessary for drawing the character regardless of the allotted character drawing time interval. However, even in the latter case, the character string drawing time interval T is distributed entirely into the character drawing time intervals for the characters of the character string in either an equal allotment method or in a weighted allotment method as shown in FIG. 59(D). Since time control is impossible, the character drawing unit 3a draws each character in a time interval necessary for drawing the character; that is, the character drawing unit 3a suspends its character drawing operation until the character drawing time interval elapses even if the character is drawn in a time interval shorter than the character drawing time interval. Accordingly, a character drawing cycle for drawing the next character is not started until the character drawing time interval for drawing the preceding character elapses even if time control is impossible. The rule of character drawing time interval allotment may be a control program stored beforehand in the drawing time interval allotment unit 11 or may be an input data, such as an external control program or an external table, to be entered by an external input device in executing the character drawing time interval allotting process.

The character drawing time interval allotment unit 11 executes the character drawing time interval allotting process in accordance with a single predetermined rule. A plurality of rules may be stored beforehand in the character drawing apparatus and the rules may selectively be used according to input instructions.

Twentieth Embodiment

Figure 61:
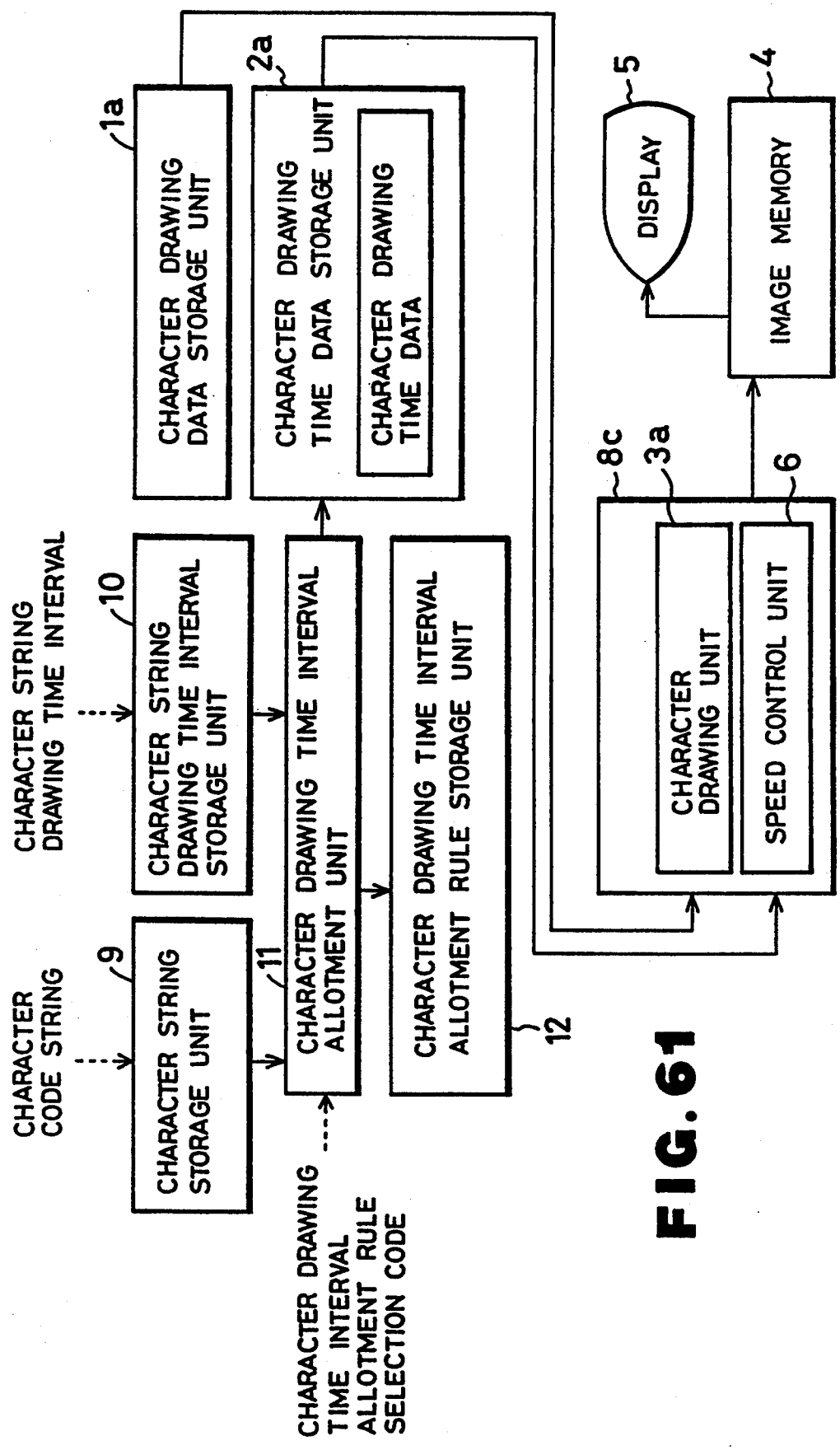
FIG. 61 is a block diagram of a character drawing apparatus in a twentieth embodiment according to the present invention.

A character drawing apparatus in a twentieth embodiment according to the present invention is shown in FIG. 61. The character drawing apparatus selects a character drawing time interval allotment rule corresponding to a rule selection code among a plurality of character drawing time interval allotment rules stored beforehand in character drawing time interval allotment unit 11, and carries out a character drawing time interval allotting process according to the selected rule. Referring to FIG. 61, the character drawing apparatus comprises a character drawing time interval allotment rule storage unit 12 storing a plurality of rules. In drawing a character string, a rule selection code is entered together with a character code string and a character string drawing time interval. Then, the character drawing time interval allotment unit 11 reads the rule specified by the rule selection code from the character drawing time interval allotment rule storage unit 12, and executes the character drawing time interval allotting process according to the selected rule. The character drawing time interval allotting process and the following character string drawing process to be executed by the character drawing apparatus are the same as those executed by the character drawing apparatus in the nineteenth embodiment.

The character drawing apparatus uses dot pattern data as character drawing data, but the character drawing data is not limited thereto; any kind of suitable character drawing data may be used provided that the character drawing data has sufficient information for loading character patterns corresponding to the input character codes into the image memory. For example, coded data of a run length coding system or vector pattern data representing the outlines of character patterns or the strokes of characters may be used instead of the dot pattern data. The character drawing data may include the order of stroke of characters, stroke directions and stroke speeds in addition to the pattern data.

The character string drawing time interval need not necessarily be an actual time interval expressed in seconds, but the character string drawing time interval and the character drawing time interval may be represented by the number of clock cycles of a clock signal generated by the microprocessor of the character drawing unit 3a. It is also possible to store a standard drawing time interval beforehand, to determine a standard character string drawing time interval by multiplying the standard drawing time interval by the number of characters of a character string and to set a desired character string drawing time interval by multiplying the standard character string drawing time interval by entering a factor for multiplying the standard character string drawing time interval as control input data for controlling the character string drawing time interval. When such a method is employed, the drawing time allotment unit 11 stores a character drawing time interval obtained by multiplying the standard drawing time interval by the input factor in the drawing time data storage unit 2a.

Twenty-first Embodiment

Figure 62:
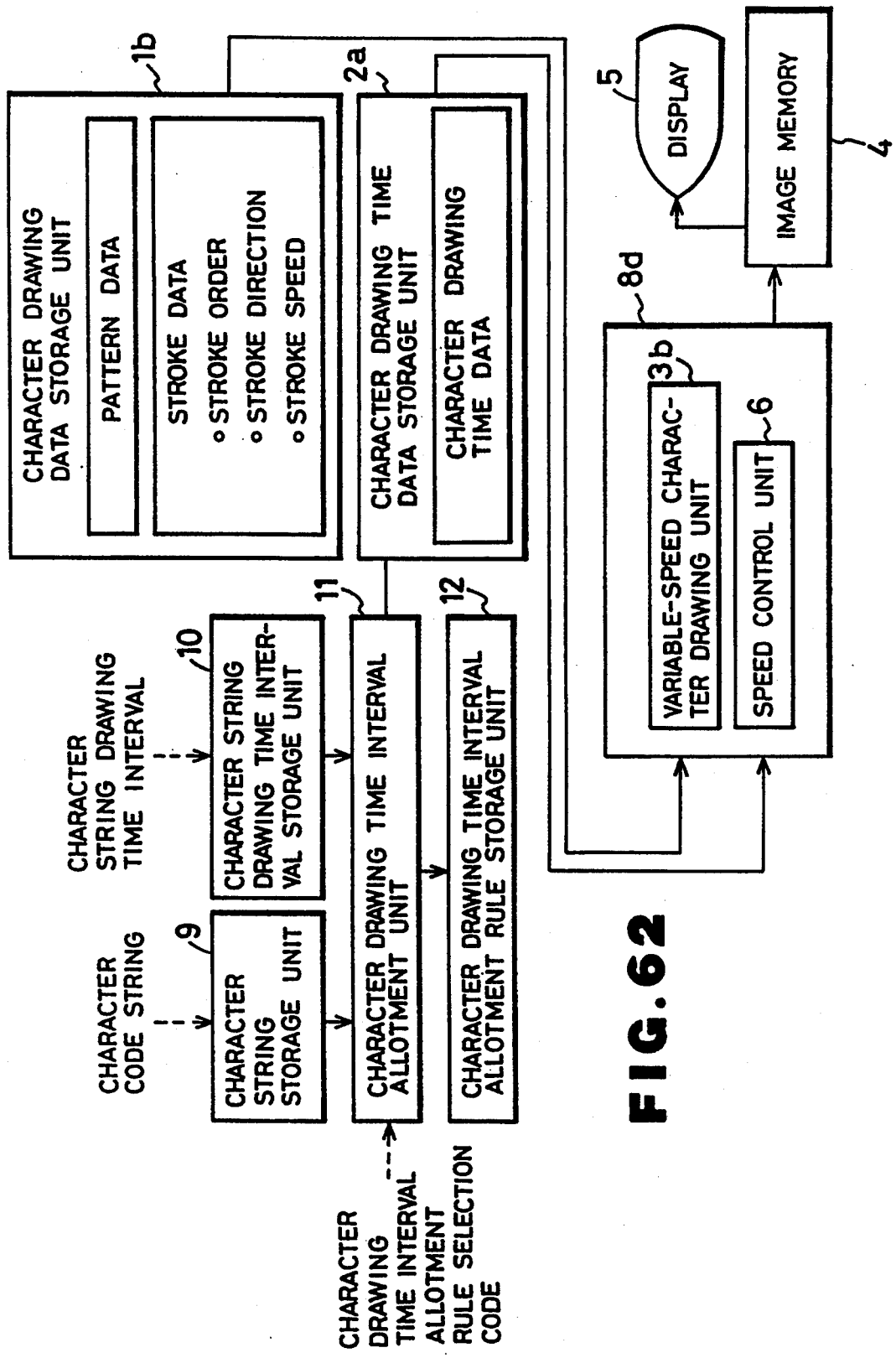
FIG. 62 is a block diagram of a character drawing apparatus in a twenty-first embodiment according to the present invention.

A character drawing apparatus in a twenty-first embodiment according to the present invention shown in FIG. 62 comprises a drawing data storage unit 1b storing pattern data and stroke data, and a drawing operation control unit 8d having a variable-speed character drawing unit 3b and a speed control unit 6. A character drawing process to be executed by this character drawing apparatus is similar to that shown in FIG. 56, except that the character drawing apparatus executes a character drawing process using stroke data in step ST565. The character drawing apparatus uses the pattern data and the stroke data previously shown in FIGS. 13(A), 13(B), 14(A), 14(B) and 14(C). The operation of the character drawing apparatus for drawing a character is the same as that of the character drawing apparatus in the fifth embodiment shown in FIGS. 16(A) to 18. The character drawing time interval can automatically be allotted to each character, and the character drawing speed is variable.

Twenty-second Embodiment

Figure 63:
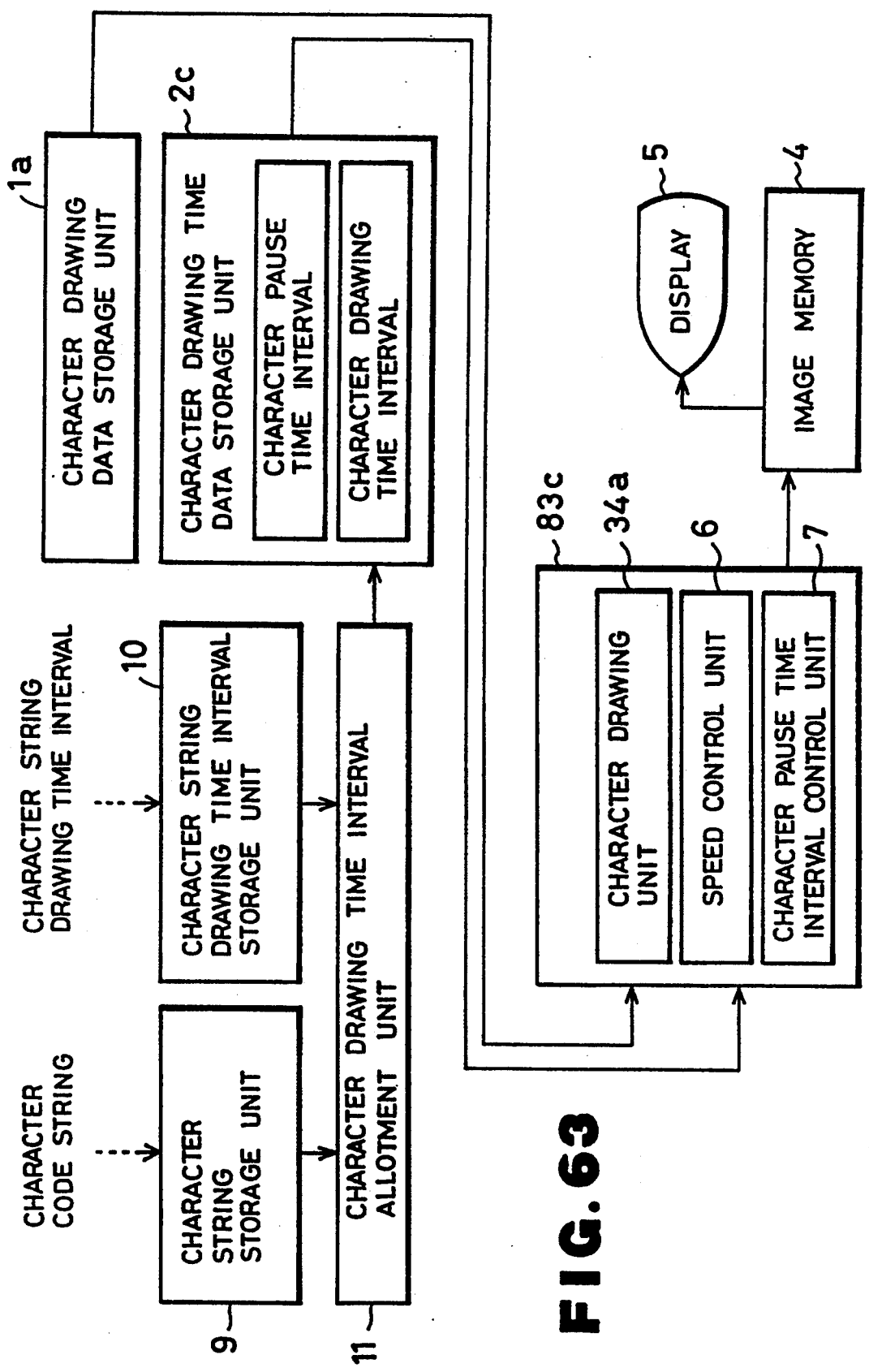
FIG. 63 is a block diagram of a character drawing apparatus in a twenty-second embodiment according to the present invention.

A character drawing apparatus in a twenty-second embodiment according to the present invention shown in FIG. 63 comprises a character drawing data storage unit 1a storing pattern data representing the characters of a character string, a drawing time data storage unit 2c storing drawing time data for controlling the character drawing time interval required for drawing each character and character pause time data for controlling a character pause time interval between the end of drawing a character and the start of drawing the next character, a character drawing unit 34a, an image memory 4, a display 5 for displaying the contents of the image memory 4, a speed control unit 6, a character pause time interval control unit 7, a character string storage unit 9 for storing a character string to be drawn, a character string drawing time data storage unit 10 storing character string drawing time data for controlling the character string drawing time interval required for drawing a character string, and a character drawing time interval allotment unit 11 for automatically determining the character drawing time interval and the character pause time interval according to a given rule on the basis of the character string and the character string drawing time interval.

A character string drawing process to be carried out by the character drawing apparatus will be described hereinafter with reference to FIGS. 63, 64, 65, 66(A), 66(B) and 66(C).

Referring to FIG. 64, a character code string indicating a character string to be drawn and a character string drawing time interval required for drawing the character string are entered in steps ST641 and ST642. FIG. 65 shows an example of a character code string used by the character drawing apparatus, in which a code "9999" indicates the end of the character code string. The character code string comprises Chinese character codes (JIS) indicating the component characters of the character string, arranged in order of display. Referring again to FIG. 64, in step ST642, a character string drawing time interval T seconds is entered. The character code string and the character string drawing time interval may be entered by the human operation of an input device, such as a keyboard, may be entered by automatically reading data representing the character code string and the character string drawing time interval from a data file by a character drawing unit 34a or may be supplied from an application program. The minimum character string drawing time interval is subject to restrictions. Although dependent on a rule for regulating drawing time interval allotment, the minimum character string drawing time interval must not be less than a time interval necessary for drawing the characters of the character string at the maximum drawing speed of the character drawing unit 34a.

In step ST643, a drawing time interval allotting process is executed, in which a character drawing time interval required for drawing each character of the character string and a character pause time interval are calculated on the basis of the character code string and the character string drawing time interval, and the calculated results are stored in a drawing time data storage unit 2c. FIG. 66(B) shows a character drawing time interval allotting process to be executed in step ST644 of FIG. 64 to allot character drawing time intervals to the characters. FIG. 66(A) shows a rule of determining the character drawing time intervals and the character pause time interval, and FIG. 66(C) shows drawing time data determined by the character drawing time interval allotting process and stored in the drawing time data storage unit 2c. This character drawing time interval allotting process allots a character pause time interval of b seconds equally to all the characters and allots the rest of the character string drawing time interval T equally to the characters in accordance with the rule. The character drawing time interval allotting process will be described hereinafter with reference to FIG. 66(B). In step ST661, the number N of the component characters of the character string is counted. In step ST662, the total sum B of character pause time intervals is calculated, by using $$B = (N-1) \cdot b$$

In step ST663, a character drawing time interval t to be allotted to each character is calculated by using $$t = (T-B)/N$$

Thus, the character pause time interval b and the character drawing time interval t allotted to each character are stored in the drawing time data storage unit 2c (FIG. 63). Then, the character drawing unit 34a draws the character string. The speed control unit 6 and the character pause time interval control unit 7 control the timing of the character drawing operation of the character drawing unit 34a on the basis of the character drawing time intervals and the character pause time interval stored in the drawing time data storage unit 2c. Steps ST644 to St651 (FIG. 64) of a character string drawing process will be described hereinafter. The character pause time interval control unit 7 reads the character drawing time interval and the character pause time interval for the first character of the character string from the drawing time data storage unit 2c and sets the same in steps ST644 and St645. A timer for measuring the character pause time interval is reset in step ST646. In step ST647, the character is drawn in the character drawing time interval set in step ST644 by the speed control unit 6. The character drawing operation to be executed in step ST647 is the same as that shown in FIGS. 4 and 5, namely, the same as that executed by the character drawing apparatus in the first embodiment.

Upon the completion of drawing the character, the character drawing unit 34a makes a query in step ST648 to see if all the characters of the input character string have been drawn. When the response in step ST648 is negative, the character pause time interval control unit 7 starts a timer for measuring the character pause time interval in step St649, and then steps St650 and St651 are repeated to keep the character drawing unit 34a in a waiting condition. Upon the elapse of the character pause time interval b, the routine returns to step St644 to starts the character drawing operation for the next character. Steps ST644 to St651 are repeated until all the characters of the character string indicated by the character code string are drawn.

Thus, the character string is drawn in the character string drawing time interval T with the character pause time interval b seconds between the two successive characters.

Twenty-third Embodiment

A character drawing apparatus in a twenty-third embodiment according to the present invention operates on another character drawing time interval allotment rule. FIG. 67(A) shows Rule 2 for regulating the operation of this character drawing apparatus; FIG. 67(B) shows a drawing time interval allotting process to be executed by the character drawing apparatus; FIG. 67(C) shows drawing time data produced by the drawing time interval allotting process and stored in the drawing time data storage unit 2c. Rule 2 specifies that the character drawing time interval is a times the character pause time interval, equal character drawing time intervals and equal character pause time intervals are allotted to the characters. The character drawing time interval allotting process will be described hereinafter with reference to FIG. 67(B). In step St661, the number N of the component characters of an input character string is counted. In step ST672, the character pause time interval is calculated in conformity with Rule 2. Since the character drawing time interval is a times the character pause time interval and equal character drawing time intervals and equal character pause time intervals must be allotted to the characters. Therefore, $$T = N \cdot ab + (N-1)b$$

therefore $$b = T/(aN+N-1)$$

where T is a character string drawing time interval, b is a character pause time interval, and hence ab is a character drawing time interval t. In step ST673, the character drawing time intervals t and the character pause time intervals b are stored in the drawing time data storage unit 2c. Then, the character drawing apparatus carries out the same character string drawing process as shown in FIG. 64, 4 and 5 as that carried out by the character drawing apparatus in the twenty-second embodiment.

Twenty-fourth Embodiment

A character drawing apparatus in a twenty-fourth embodiment according to the present invention carries out a drawing time allotting process in conformity with another Rule 3 shown in FIG. 68(A). FIG. 68(B) shows the character drawing time interval allotting process, FIG. 68(C) shows drawing time data produced by the character drawing time interval allotting process and stored in the drawing time data storage unit 2c and FIG. 68(D) shows a table for use by the character drawing time interval allotting process. Characters are classified into those of seven character sets, namely, a symbol set, an alphanumeric character set, a hiragana character set, a katakana character set, Greek character set, a Russian character set and a Chinese character set and different character drawing time intervals are allotted respectively to the characters of those different character sets. Referring to FIG. 68(D), the table contains factors assigned respectively to the character sets to multiply a standard character drawing time interval as relative drawing time data. Rule 3 specifies that equal character pause time intervals b seconds are assigned to all the character sets and weighted character drawing time intervals weighted by the factors shown in FIG. 68(D) are assigned respectively to the character sets. For example, when a standard drawing time interval is x, a character drawing time interval x is allotted to the characters of the symbol set and the alphanumeric character set, a character drawing time interval 3x is allotted to the characters of the hiragana character set and the katakana character set, a character drawing time interval 2x is allotted to the characters of the Greek character set and the Russian character set, and a character drawing time interval 5x is allotted to the characters of the Chinese character set.

A drawing time interval allotting process to be carried out in conformity with the Rule 3 will be described hereinafter with reference to FIG. 68(B). In step ST661, the number N of the component characters of the input character string is counted. Then, the total sum B of character pause time interval is calculated in Step ST682. Then, character drawing time intervals for the characters are calculated in step ST683. Suppose that the characters are $m_i$ ($i = 1, 2, 3 \ldots, N$), and the factors for the character sets including the characters $m_i$ are $a_i$ ($i = 1, 2, 3 \ldots, N$), respectively. Then, the standard drawing time interval x is expressed by $$x = (T - B) / \sum_{i=1}^{N} a_i$$

In step ST683, the standard drawing time interval x is multiplied by the factors assigned to the character sets to obtain character drawing time intervals to be allotted to the characters of the character string, respectively. The character drawing time intervals and the character pause time intervals thus determined are stored in the drawing time data storage unit 2c. After thus determining the drawing time data, the character drawing apparatus carries out the same character string drawing process as that shown in FIGS. 64, 4 and 5 executed by the character drawing apparatus in the twenty-second embodiment.

The character drawing time interval allotment process may be carried out by using a function. It is possible to store a function beforehand in the drawing time interval allotment unit 11 and to calculate the character drawing time intervals and the character pause time intervals to be allotted to the characters by using the character string drawing time interval and input parameters.

Incidentally, the character drawing unit 83c draws the component characters of the character string in the character drawing time intervals allotted thereto, respectively, and stored in the drawing time data storage unit 2c. However, it is impossible, in some cases, to control time in drawing the characters depending on the data structure of the character drawing data or the character drawing algorithm of the character drawing unit 34a. In such a case, the character drawing time intervals need to be regulated to draw the character string in the character string drawing time interval. The regulation of the character drawing time intervals is achieved by allotting the remainder of subtraction of the total sum of character drawing time intervals from the character string drawing time interval to the character pause time intervals. A time control method of drawing the character string in the character string drawing time interval will be described hereinafter. This time control method is employed when a character drawing time interval necessary for drawing each character of the character string is not known to the character drawing time allotment unit 11. First, on the assumption that the character pause time intervals are zero, the character string drawing time interval T is distributed equally or weightedly as shown in FIG. 68(D) among the character drawing time intervals for the characters of the character string. Since the character drawing unit 34a is unable to control time in drawing each character, each character is drawn in a time interval required for drawing the character and the character drawing unit 34a does not start drawing the next character until the character drawing time interval allotted to the preceding character elapses. Thus, even if time control is impossible in drawing the characters, the character drawing operation is suspended after the character has been drawn in the time interval necessary for drawing the same until the character time interval allotted to the character elapses. Therefore, the remainder of subtraction of the time interval actually spent for drawing the character from the set character drawing time interval serves as a character pause time interval, and, consequently, the character string can be drawn in the input character string drawing time interval.

The rule of character drawing time interval allotment may be a control program for controlling the character drawing time interval allotment unit 11, stored beforehand in the character drawing time interval allotment unit 11 or may be a control program or data contained in a table to be entered by an external input device as occasion calls.

The character drawing apparatus executes the character drawing time interval allotting process in conformity with a single rule, but the character drawing apparatus may be constructed so as to use one of a plurality of rules stored therein beforehand selectively according to instructions given thereto by an external input device.

Twenty-fifth Embodiment

Figure 69:
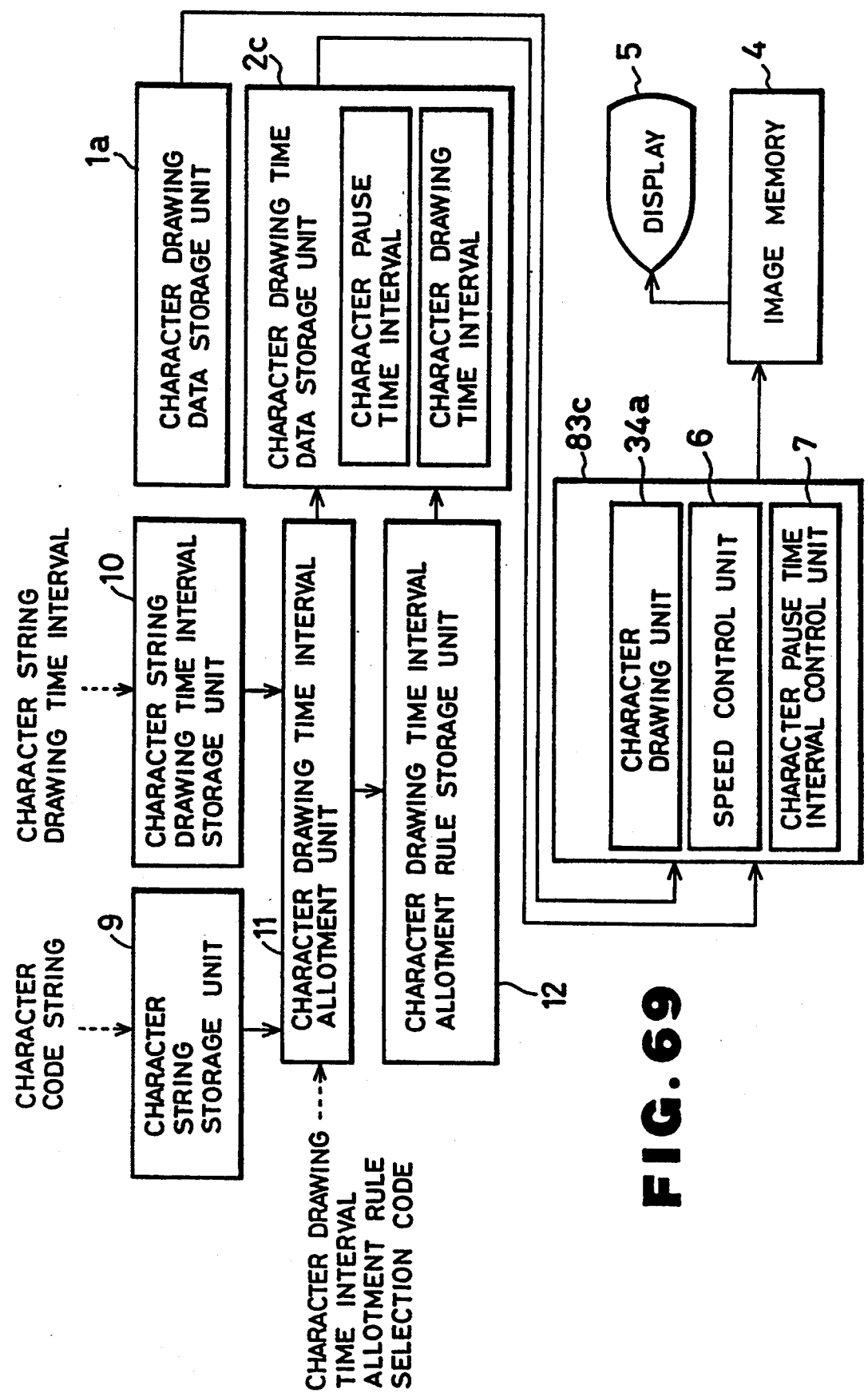
FIG. 69 is a block diagram of a character drawing apparatus in a twenty-fifth embodiment according to the present invention.

A character drawing apparatus in a twenty-fifth embodiment according to the present invention is shown in FIG. 69. The character drawing apparatus has a character drawing time interval allotment unit 11 which selects a rule specified by an input character drawing time interval allotment rule selection code from among a plurality of character drawing time interval allotment rules and executes a character drawing time interval allotting process in conformity with the selected rule. Referring to FIG. 69, the character drawing apparatus comprises a character drawing time interval allotment rule storage unit 12 storing a plurality of rules. In operation, a character string, a character string drawing time interval and a character drawing time interval allotment rule selection code are entered. The character drawing time interval allotment unit 11 reads a rule specified by the character drawing time interval allotment rule selection code from the character drawing time interval allotment rule storage unit 12, and then the character drawing time interval allotment unit 11 executes a character drawing time interval allotting process in conformity with the selected rule. The character drawing time interval allotting process and the subsequent character string drawing process are the same as those executed by the character drawing apparatus in the twenty-fourth embodiment.

The character drawing apparatus uses dot pattern data as character drawing data for drawing the characters, but the character drawing data is not limited thereto and may be any kind of suitable character drawing data carrying sufficient information for loading character patterns indicated by input character codes in the image memory. For example, coded data of a run length coding system or vector pattern data representing the outlines of characters or the strokes of characters may be used instead of dot pattern data. The character drawing data may include the order of stroke of characters, stroke directions and stroke speeds in addition to the pattern data.

The character string drawing time interval, the character drawing time interval and the character pause time interval need not necessarily be actual time intervals expressed in seconds, but may be represented by the number of clock cycles of a clock signal generated by the microprocessor of the character drawing unit 3. It is also possible to store a standard character drawing time interval beforehand, to determine a standard character string drawing time interval on an assumption that an input character string is drawn by using the standard character drawing time interval and standard character pause time interval and to set a desired character string drawing time interval by multiplying the standard character string drawing time interval by a factor entered by an external input device. In such a case, the character drawing time interval allotment unit 11 stores a character drawing time interval obtained by multiplying the standard character drawing time interval by the input factor, and a character pause time interval obtained by multiplying the standard character pause time interval by the input factor in the character drawing time data storage unit 2c.

Twenty-sixth Embodiment

Figure 70:
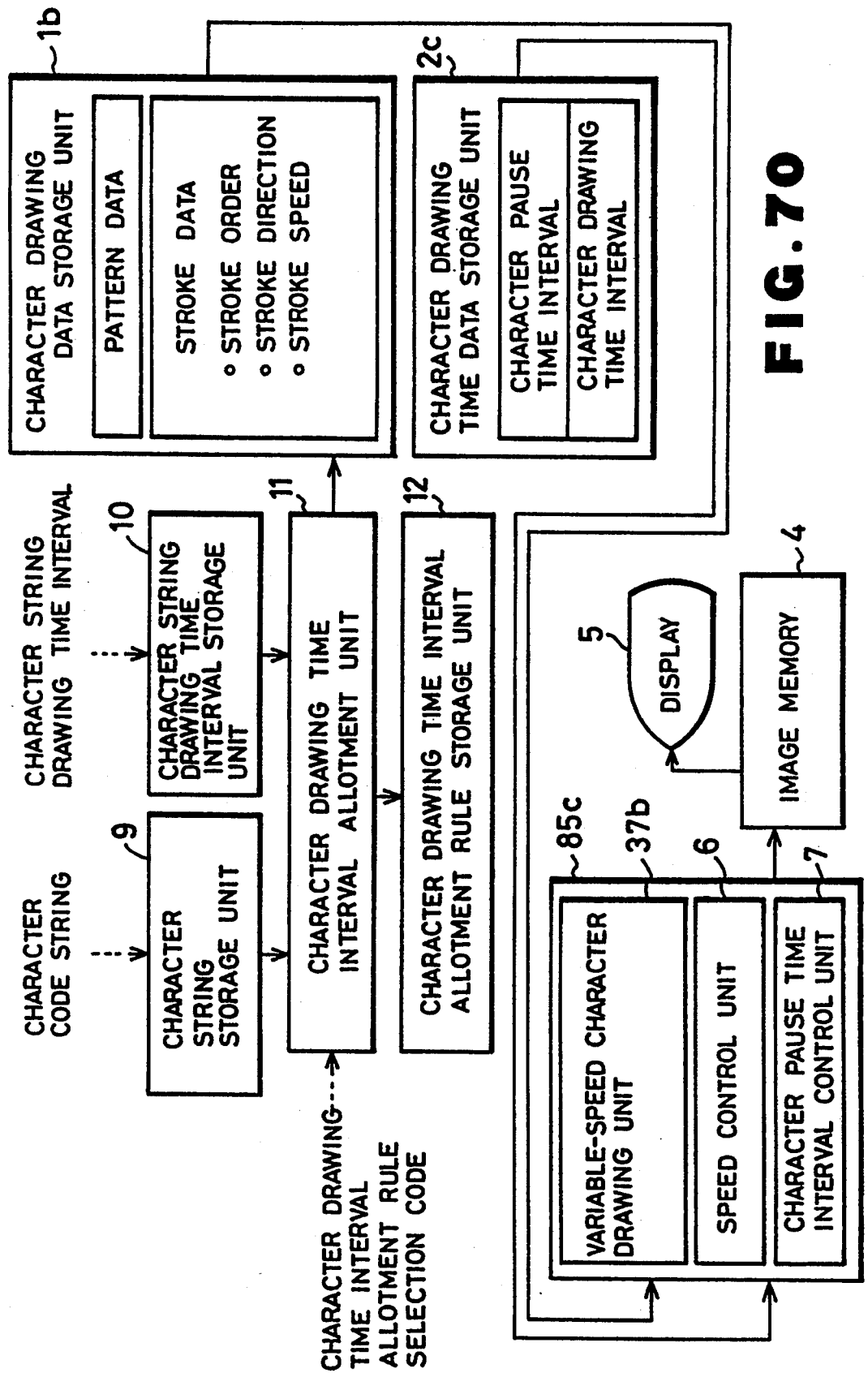
FIG. 70 is a block diagram of a character drawing apparatus in a twenty-sixth embodiment according to the present invention.
Figure 71:
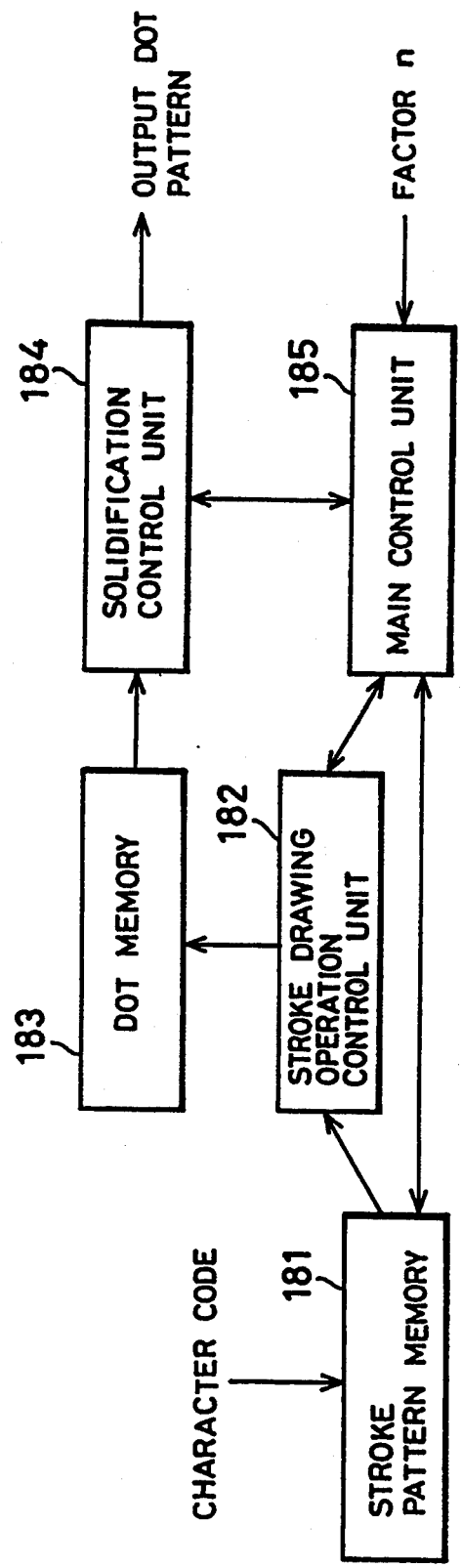
FIG. 71 is a block diagram of a conventional character drawing apparatus.
Figure 72:
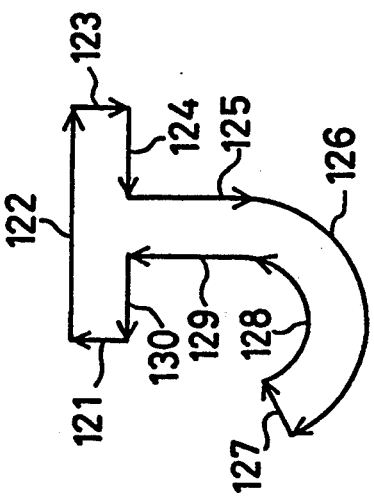
FIG. 72 is a view of assistance in explaining stroke data used by the conventional character drawing apparatus.

A character drawing apparatus in a twenty-sixth embodiment according to the present invention shown in FIG. 70 comprises a character drawing data storage unit 1b storing pattern data and stroke data, a variable-speed character drawing unit 37b, and a character drawing operation control unit 85c comprising the variable-speed character drawing unit 37b, a speed control unit 6 and a character pause time interval control unit 7.

A character drawing process to be carried out by this character drawing apparatus is similar to that shown in FIG. 64. In executing step St647, the stroke data is used. The character drawing apparatus uses the pattern data and stroke data shown in FIGS. 13(A), 13(B), 14(A), 14(B) and 14(C). Accordingly, the character drawing operation of this character drawing apparatus is the same as that of the character drawing apparatus in the fifth embodiment shown in FIGS. 16 to 18. Thus, a character drawing time interval to be assigned to each character can automatically be set, the drawing speed can be varied in drawing each character, and the characters can be drawing at appropriate time intervals.

As is apparent from the foregoing description, in a first aspect of the present invention, at least pattern data representing the patterns of characters and character drawing time data are used as character drawing data, the timing operation of the character drawing unit and the speed control unit for drawing a dot pattern represented by the pattern data is controlled on the basis of the character drawing time data. Accordingly, a time interval required for drawing a character can simply be changed by changing the character drawing time data, and hence a plurality of characters can be drawn respectively at different drawing speeds, which attracts the attention of persons looking at the characters being drawn and impresses the information expressed by the characters on persons. Thus, the character drawing apparatus functions satisfactorily as means for presentation, for example, for educational or commercial purposes.

In a second aspect of the present invention a character drawing apparatus comprises a character drawing data storage unit for storing stroke data, a variable-speed character drawing unit and an image memory, and the operating speed of the variable-speed character drawing unit in loading character patterns represented by the pattern data in the image memory is controlled on the basis of the stroke data. Therefore, the character drawing speed can be regulated so as to vary in drawing each stroke of a character and so as to suspend the character drawing operation for a stroke pause time interval between the end of drawing a stroke and the start of drawing the next stroke, so that a character can be drawn in a drawing mode similar to handwriting, which relieves a person looking at the characters being drawn from mental load.

In a third aspect of the present invention, the character drawing unit and the character pause time interval control unit of a character drawing apparatus draw a character string by using character pause time data stored in its character drawing time data storage unit, so that the character drawing operation can be suspended for a given character pause time interval between the end of drawing a character of the character string and the start of drawing the next character of the same and the character pause time interval can be changed simply by changing the character pause time data stored in the character drawing time data storage unit, so that the character string can be drawn at a desired tempo by using a short character pause time interval for quick drawing or by using a long character pause time interval for slow drawing, which attracts the attention of persons looking at the characters being drawn or impresses the information expressed by the characters on the persons.

In a fourth aspect of the present invention, a character drawing apparatus is capable, in addition to being capable of functioning similarly to tile character drawing apparatus in the third aspect of the present invention, of varying the drawing speed in drawing one character, so that the characters of a character string can be drawn at different drawing speeds, respectively.

In a fifth aspect of the present invention, a character drawing apparatus is capable, in addition to being capable of functioning similarly to tile character drawing apparatus in the third aspect of the present invention, of drawing a character making reference to stroke data, so that the strokes of the character can be drawn at different drawing speeds, respectively.

In a sixth aspect of the present invention, a character drawing apparatus comprises a character drawing time data storage unit storing character pause time data and character drawing time data, a variable-speed character drawing unit which operates making reference to stroke data, a speed control unit for regulating the character drawing time interval for each character, and a character pause time interval control unit for determining the character pause time interval, so that the character drawing speed and the character string drawing speed can readily be changed.

In a seventh aspect of the present invention, a character drawing apparatus comprises a character drawing unit, a character drawing time data storage unit, and a character drawing time interval allotment unit which receives a character string and character string drawing time data for controlling time in drawing the character string, so that a character drawing time interval and a character pause time interval for each character of the character string can automatically be calculated and can be stored in the character drawing time data storage unit, and the character drawing unit draws the character string by using the character drawing time intervals and the character pause time intervals stored in the character drawing time data storage unit without calculating character drawing time intervals separately for the characters in drawing the character string. Accordingly, different character strings can be drawn at different drawing speeds, respectively, by optionally determining character string drawing time intervals, which attracts the attention of persons looking at characters being drawn and impresses the information expressed by the characters on the persons.

In an eighth aspect of the present invention, a character drawing apparatus comprises a character drawing time interval allotment unit which receives a character string, and character string drawing time data for controlling a time interval required for drawing the character string, a character drawing time data storage unit for storing character drawing time intervals respectively for the characters of the character string calculated automatically in conformity to a give rule, and a character drawing unit for drawing the character string by using the character string drawing time data and the character drawing time intervals, so that the character drawing time intervals required for drawing the characters of the character string can individually be controlled in drawing the characters, and the character drawing time intervals can automatically be changed by changing the character string drawing time interval, so that it is possible to regulate the character drawing time intervals simply by regulating the character string drawing time interval. Furthermore, the character drawing operation of the character drawing apparatus can be suspended after a character has been drawn for a given character pause time interval before starting the character drawing operation for drawing the next character. Since the character drawing time intervals and the character pause time intervals can automatically be changed simply by changing the character string drawing time interval, the character drawing time intervals and the character pause time intervals need not be calculated individually. Accordingly, different character strings can be drawn at different character drawing speeds, respectively, which attracts the attention of persons looking at the characters being drawn and impresses the information expressed by the characters on the persons.

In a ninth aspect of the present invention, a character drawing apparatus draws a character making reference to stroke data to draw the strokes of the character in correct order of stroke at different stroke speeds, respectively, so that the character can be drawn at a desired tempo.

What is claimed is:

1. A character drawing apparatus for drawing characters and displaying the same as they are drawn at a preselected speed comprising:
   a character drawing storage unit for storing pattern data which represents the patterns of characters which are to be drawn;
   a character drawing time data storage unit for storing character drawing time data specifying time intervals between the start of drawing a character and the end of drawing a character required for drawing the characters in accordance with the stored pattern data;
   an image memory for storing the pattern data in the form of dot patterns of the characters;
   a character drawing unit for reading pattern data from the character drawing data storage unit and loading the dot patterns of the characters represented by the pattern data into the image memory;
   a speed control unit for controlling a character drawing time interval required for drawing the characters and for loading the dot pattern of each character into the contents of the image memory by the character drawing unit on the basis of the character drawing time data for the characters; and
   a display for displaying the contents of the image memory, whereby the characters are displayed on the display as they are drawn in accordance with the pattern data and the character drawing time data.

2. A character drawing apparatus for drawing characters and displaying the same as they are drawn at a preselected speed comprising:
   a character drawing data storage unit for storing pattern data which represents patterns of character forming strokes which form the characters which are to be drawn and which includes stroke data including stroke order data representing a selected order of displaying the character forming strokes of each character, stroke direction data representing selected directions of the character forming strokes of each character, and stroke speed data representing selected stroke speeds for drawing the character forming strokes of each character as it is displayed;
   an image memory for storing the pattern data;
   a variable-speed character drawing unit for reading the pattern data from the character drawing data storage unit and for loading a character pattern represented by the pattern data into the contents of the image memory in the order represented by the stroke order data and in the directions represented by the stroke direction data and at stroke speeds represented by the stroke speed data; and
   a display for displaying the contents of the image memory, whereby the characters are displayed on the display as they are drawn in accordance with the pattern data in the order represented by the stroke order data and in the directions represented by the stroke direction data and at stroke speeds represented by the stroke speed data.

3. A character drawing apparatus for drawing characters and displaying the same as they are drawn in sequence at a preselected speed comprising:
   a character drawing data storage unit storing character drawing data including pattern data in the form of dot patterns representing the patterns of characters which are to be drawn;
   a character drawing time data storage unit storing character pause time data representing character pause time intervals between the completion of the drawing of a character and the start of the drawing of the next character in the sequence;
   an image memory for storing the pattern data representing the patterns of characters to be drawn;
   a character drawing unit for reading the pattern data of the characters from the character drawing data storage unit and for loading the dot patterns of the characters represented by the pattern data into the contents of the image memory;
   a character pause time interval control for suspending character drawing after completing loading the dot pattern of a character in the image memory for a character pause time interval represented by the character pause time data stored in the character drawing time data storage unit before starting loading the dot pattern of the next character; and
   a display for displaying the contents of the image memory, whereby the characters are displayed on the display as they are drawn in accordance with the pattern data and the character pause time data.

4. A character drawing apparatus according to claim 3, wherein the character drawing time data storage unit stores further character drawing time data representing character drawing time intervals assigned to the characters, said character drawing apparatus further including a speed control unit for regulating the character drawing time interval required for loading the dot pattern of each character into the image memory on the basis of the character drawing time data.

5. A character drawing apparatus according to claim 2 further comprising:
   a character drawing time data storage unit storing character pause time data including character pause time intervals between the end of drawing each character and the start of drawing the next character; and
   a character pause time interval control unit for suspending character drawing of the variable-speed character drawing unit after completing loading the dot pattern of a character into the image memory for the character pause time interval represented by the character pause before starting the character drawing operation for the next character.

6. A character drawing apparatus according to claim 5 further comprising a speed control unit for regulating a character drawing time interval required for loading the dot pattern of each character into the image memory by the variable-speed character drawing unit, on the basis of the character drawing time data, wherein the character drawing time data storage unit stores further character drawing time data representing a character drawing time interval assigned to each character.

7. A character drawing apparatus for drawing characters and displaying the same as they are drawn in sequence at a preselected speed comprising:
 a character string storage unit for storing a character string to be drawn in sequence;
 a character string drawing time storage unit for storing character string drawing time data including a character string drawing time interval assigned to the character string;
 a character drawing time data storage unit for storing character drawing time data for the time between the start of the drawing of a character and the completion of the drawing of a character for the characters to be used in the character string;
 a character drawing data storage unit for storing pattern data representing the pattern of each character to be used in the character string;
 a character drawing time interval allotment unit for calculating character drawing time intervals required for drawing the characters of the character string on the basis of the character string stored in the character string storage unit, and the character string drawing time data stored in character string drawing time data storage unit, and for storing the calculated character drawing time intervals in the character drawing time data storage unit as character drawing time data;
 an image memory for storing in the form of dot patterns the patterns of the characters represented by the pattern data;
 a character drawing unit for loading the dot patterns of the characters in the image memory;
 a speed control unit for regulating the character drawing time interval to the time interval calculated by said character drawing time interval allotment unit and for loading the dot pattern of each character in the contents of the image memory by the character drawing unit; and
 a display for displaying the contents of the image memory, whereby the characters are displayed on the display as they are drawn in accordance with the pattern data and the character drawing time data.

8. A character drawing apparatus according to claim 7, wherein the character drawing time data storage unit stores further character pause time data including character pause time intervals between the completion of drawing one character and the start of drawing the next character of two successive characters, said character drawing apparatus further including a character pause time interval control unit which suspends the character drawing of the character drawing unit for a character pause time interval represented by the character drawing time data stored in the character drawing time data storage unit.

9. A character drawing apparatus for drawing characters and displaying the same as they are drawn at a preselected speed comprising:
 a character string storage unit for storing a character string to be drawn;
 a character string drawing time data storage unit for storing character string drawing time data representing the time between the start of the drawing of a character string and the completion of the drawing of a character string;
 a character drawing time data storage unit for storing character drawing time data including character drawing time intervals between the start of drawing a character and the completion of drawing a character assigned to the individual characters of the character string;
 a character drawing time interval allotment unit for calculating character drawing time intervals for the characters of the character string on the basis of the character string stored in the character string storage unit and the character string drawing time data stored in the character string drawing time data storage unit and for storing the calculated character drawing time intervals in the character drawing time data storage unit as the character drawing time data;
 a character drawing time storage unit storing pattern data representing the patterns of the character forming strokes of each character which is to be drawn, stroke order data representing a selected order of displaying the character forming strokes of each character, stroke direction data representing selected directions of displaying the character forming strokes of each character, and stroke speed data representing selected speeds of drawing the character forming strokes of each character as it is displayed;
 an image memory for storing the pattern data read from the character drawing data storage unit;
 a variable-speed character drawing unit for loading the pattern data representing the characters, read from the character drawing data storage unit into the image memory in the order specified in the stroke order data, in directions specified in the stroke direction data at drawing speeds specified in the stroke speed data;
 a speed control unit for regulating the character drawing time interval required for loading the dot pattern of each character into the contents of the image memory by the variable-speed character drawing unit on the basis of the character drawing time data; and
 a display for displaying the contents of the image memory, whereby the characters are displayed on the display as they are drawn in accordance with the pattern data in the order represented by the stroke order data and in the directions represented by the stroke direction data and at stroke speeds represented by the stroke speed data.

10. A character drawing apparatus according to claim 9, wherein the character drawing time data storage unit further stores selected character pause time data including character pause time intervals between the completion of drawing each character and the start of drawing the next character, and wherein said character drawing apparatus further includes a character pause time interval control unit which suspends the character drawing operation of the variable-speed character drawing unit for time intervals represented by the character pause time data stored in the character drawing time data storage unit.

* * * * *

UNITED STATES PATENT AND TRADEMARK OFFICE
CERTIFICATE OF CORRECTION

PATENT NO. : 5,426,726
DATED : June 20, 1995
INVENTOR(S) : Kaoru Horiuchi et al.

It is certified that error appears in the above-indentified patent and that said Letters Patent is hereby corrected as shown below:

Col. 8, line 31, "reviews" should be -- are views --; Col. 11, line 5, "ill" should be -- in --; Col. 14, line 63, "xS" should be -- x8 --; Col. 19, line 18, after "$R_1$," insert -- $L_0$ --; Col. 30, line 49, "(xS, yS)" should be -- (x8, y8) --; Col. 35, line 50, "arid" should be -- and --; Col. 44, line 41, delete the comma;
<u>In the Claims:</u> Col. 51, line 24 (claim 1), delete "the".

Signed and Sealed this

Ninteenth Day of December, 1995

Attest:

BRUCE LEHMAN

*Attesting Officer*   *Commissioner of Patents and Trademarks*